(12) United States Patent
Carbonaro et al.

(10) Patent No.: US 8,943,761 B2
(45) Date of Patent: *Feb. 3, 2015

(54) BUILDING CONSTRUCTION WRAPPED WITH REINFORCEMENT FABRIC TO RESIST WIND LOADING

(71) Applicant: Windwrap, Inc., Chicago, IL (US)

(72) Inventors: Peter Carbonaro, Chicago, IL (US); Mark H. Smith, Newark, OH (US); Haydn B. Taylor, Windham, NH (US)

(73) Assignee: Windwrap, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,848

(22) Filed: Feb. 4, 2014

(65) Prior Publication Data
US 2014/0165479 A1    Jun. 19, 2014

Related U.S. Application Data

(63) Continuation of application No. 13/050,879, filed on Mar. 17, 2011, now Pat. No. 8,646,222.

(60) Provisional application No. 61/315,219, filed on Mar. 18, 2010.

(51) Int. Cl.
*E04B 7/02* (2006.01)
*E04B 1/38* (2006.01)
*E04B 1/26* (2006.01)
*E04B 7/04* (2006.01)
*E04H 9/14* (2006.01)

(52) U.S. Cl.
CPC .... *E04B 1/38* (2013.01); *E04B 1/26* (2013.01); *E04B 7/045* (2013.01); *E04H 9/14* (2013.01); *E04B 1/2604* (2013.01); *E04B 2001/268* (2013.01)

USPC .......... 52/92.2; 52/92.1; 52/93.1; 52/222; 52/223.14

(58) Field of Classification Search
USPC ............ 52/92.2, 222, 167.1, 223.14, 506.05, 52/92.1, 93.1, 93.2
See application file for complete search history.

(56) References Cited

U.S. PATENT DOCUMENTS

| 1,657,441 A | 1/1928 | Huovinen ............... 52/293.2 |
| 3,805,873 A | 4/1974 | Bloomfield ............. 160/392 |

(Continued)

OTHER PUBLICATIONS

Red Head Concrete Anchoring Specialists, Product and Resource Catalog, Redi-Drive Anchors, pp. 79-82 (2009).

(Continued)

*Primary Examiner* — Joshua J Michener
*Assistant Examiner* — Matthew Gitlin
(74) *Attorney, Agent, or Firm* — Winston & Strawn LLP

(57) ABSTRACT

A building construction has a foundation, walls and a roof structure, the walls being wrapped by a reinforcement fabric, with the reinforcement fabric being connected to the foundation and the roof structure to tie the roof structure to the foundation for increased resistance to natural disasters. The connection of the reinforcement fabric to the roof structure includes a top rail having a connector plate attached to the roof structure and having an upwardly oriented opening, and a wrapping member about which the reinforcement fabric can be wrapped, the wrapping member having a geometry corresponding with the geometry of the upwardly oriented opening in such a manner that the wrapping member is prevented from rotating in the opening.

20 Claims, 50 Drawing Sheets

(56) References Cited

U.S. PATENT DOCUMENTS

| | | | |
|---|---|---|---|
| 3,830,024 A | 8/1974 | Warnke | 52/23 |
| 4,053,008 A | 10/1977 | Baslow | 160/327 |
| 4,757,854 A | 7/1988 | Rippberger | 160/391 |
| 4,763,452 A | 8/1988 | Harvey | 52/96 |
| 5,148,640 A | 9/1992 | Reilly, Sr. | 52/74 |
| 5,214,891 A | 6/1993 | Edlin | 52/222 |
| 5,303,520 A | 4/1994 | Gozdziak | 52/92.2 |
| 5,311,712 A | 5/1994 | Accousti | 52/259 |
| 5,333,425 A | 8/1994 | Nickerson et al. | 52/222 |
| 5,355,640 A | 10/1994 | Frye | 52/23 |
| 5,448,861 A | 9/1995 | Lawson | 52/92.2 |
| 5,531,054 A | 7/1996 | Ramirez | 52/741.1 |
| 5,537,786 A | 7/1996 | Lozier et al. | 12/23 |
| 5,603,186 A | 2/1997 | Zaffino | 52/23 |
| 5,870,861 A | 2/1999 | Gnaedinger | 52/93.1 |
| 6,164,364 A | 12/2000 | Morris | 160/327 |
| 6,176,050 B1 | 1/2001 | Gower | 52/222 |
| 6,256,951 B1 | 7/2001 | Findleton | 52/250 |
| 6,412,540 B2 | 7/2002 | Hendee | 160/327 |
| 6,684,584 B1 | 2/2004 | Goldwitz | 52/222 |
| 6,760,990 B2 | 7/2004 | Lowndes | 40/603 |
| 6,843,027 B2 | 1/2005 | Gaddie et al. | 52/92.1 |
| 7,650,923 B2 | 1/2010 | Morris | 160/327 |
| 7,726,081 B1 | 6/2010 | Bennardo et al. | 52/222 |
| 7,963,313 B1 | 6/2011 | Bennett et al. | 160/368.1 |
| 8,215,073 B2 | 7/2012 | Gorman et al. | 52/202 |
| 2007/0234658 A1 | 10/2007 | Rawdon et al. | 52/222 |
| 2007/0281562 A1 | 12/2007 | Kohlman et al. | 442/32 |
| 2008/0110583 A1 | 5/2008 | Lallemand | 160/371 |
| 2008/0148655 A1 | 6/2008 | Posey | 52/92.2 |
| 2009/0019797 A1 | 1/2009 | Gunn | 52/202 |
| 2009/0042471 A1 | 2/2009 | Cashin et al. | 442/182 |
| 2009/0049765 A1 | 2/2009 | Grant | 52/105 |
| 2010/0126091 A1 | 5/2010 | Meyer | 52/222 |
| 2010/0236158 A1 | 9/2010 | Carbonaro | 52/92.1 |

OTHER PUBLICATIONS

ES Report, ESR-2020, ICC Evaluation Service, Inc., Bostitch Sheather Plus™ (Hurriquake™) Nails, pp. 1-6, Apr. 1, 2006.

ITW Buildex 2008 Product Catalog, Maxi-Set Tapcon Masonry Fastening System, Light-to-Medium Duty Masonry Applications, Product Report No. 02718, pp. 45-46.

Simpson Strong-Tie Company Inc., Wood Construction Connectors 2011-2012 catalog, www.strongtie.com and www.strongtie.com/literature/c-2011.html?source+promo (expires Dec. 31, 2012).

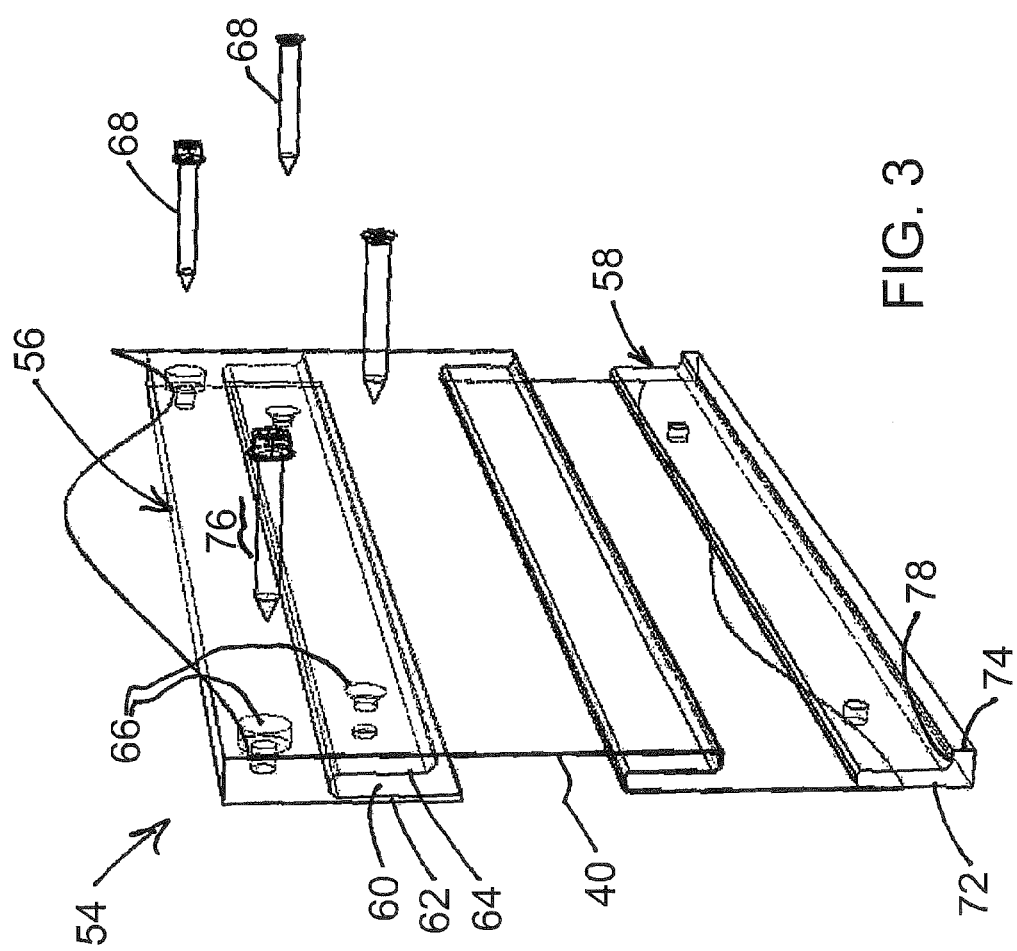

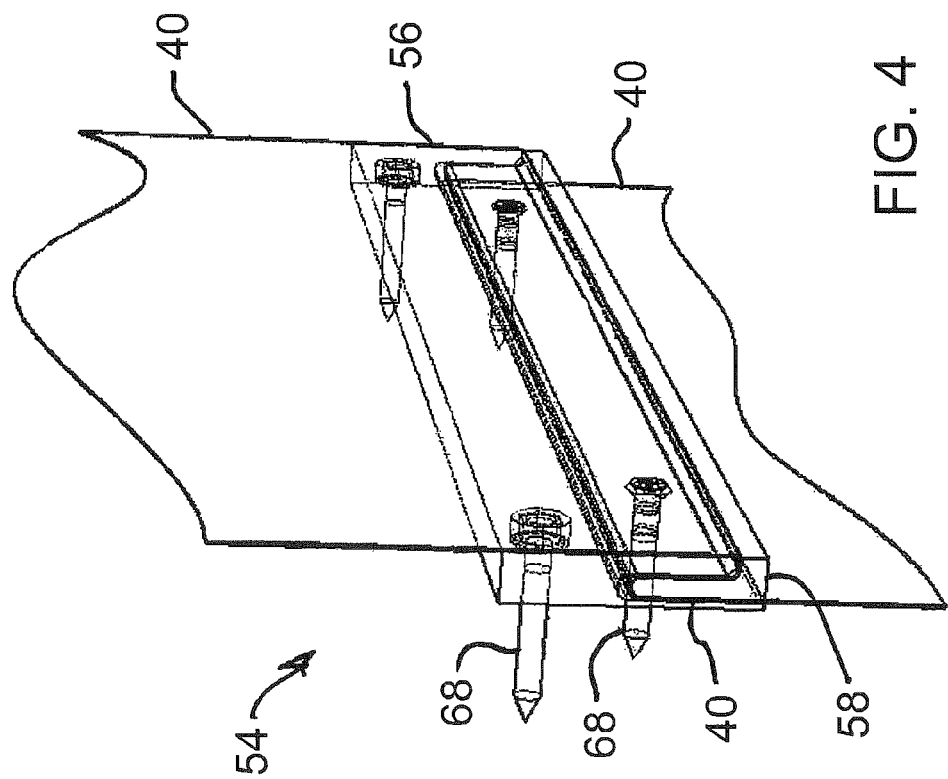

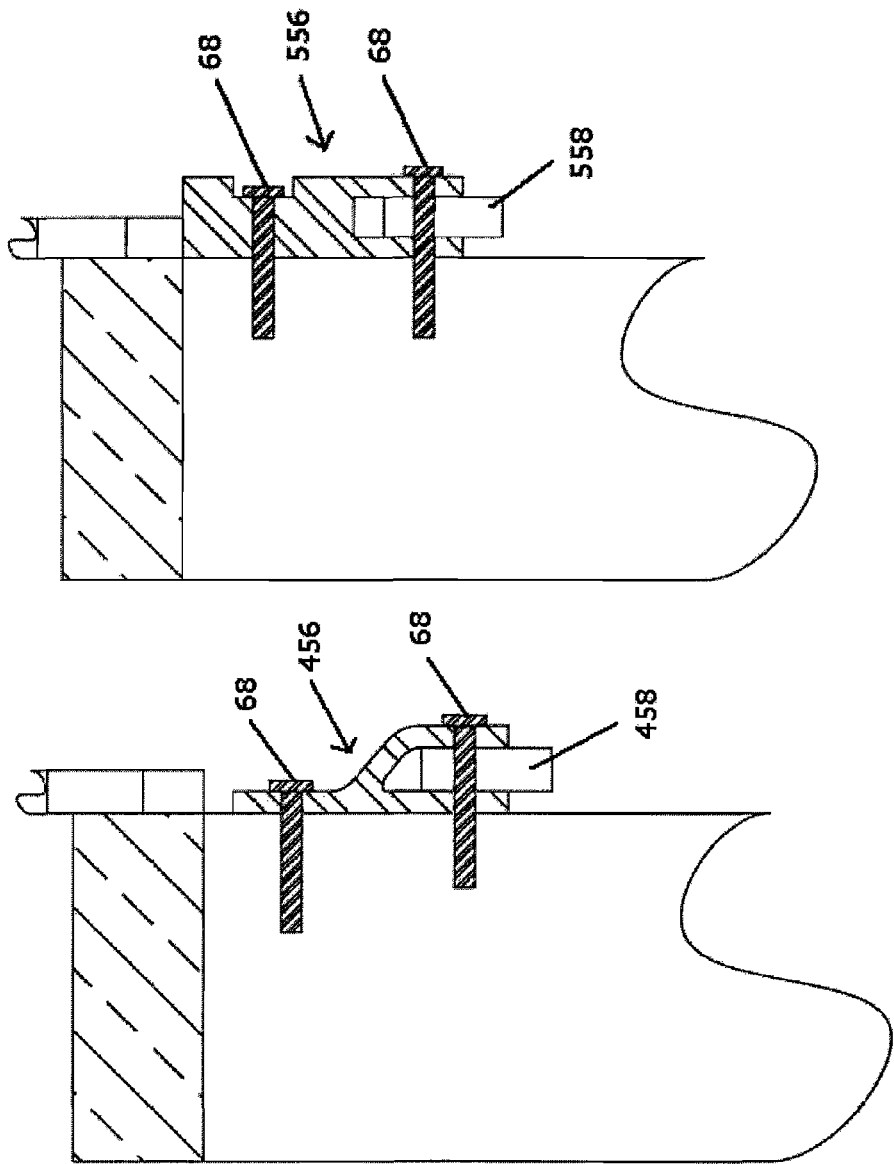

BUILDING CONSTRUCTION WRAPPED WITH REINFORCEMENT FABRIC TO RESIST WIND LOADING

CROSS-REFERENCE TO RELATED APPLICATION

This application is a continuation of U.S. application Ser. No. 13/050,879 filed Mar. 17, 2011 which claims the benefit of U.S. application No. 61/315,219 filed Mar. 18, 2010, the entire content of each of which is expressly incorporated herein by reference.

TECHNICAL FIELD

This invention relates to building structures having increased strength to resist the forces of high wind events including hurricanes and tornadoes, as well as the forces from earthquake and blast loadings.

BACKGROUND OF THE INVENTION

Residential buildings and other similar buildings are often comprised of a foundation, a plurality of vertically oriented walls, and a roof structure. A very common wood frame construction method uses wood or steel for studs and other framing members. The framing members are covered with plywood, Oriented Strand Board (OSB), sheathing panels or stucco sheathing to form the building walls. The framing/sheathing combination forms shear walls and horizontal diaphragms which resist horizontal and vertical loads applied to the structure. This form of construction is used in the majority of single family homes in the United States, as well as a significant portion of multi-family, commercial and industrial facilities. Roof structures commonly consist of joists, rafters and trusses covered by plywood, OSB or other sheathing applied as a roof deck.

Natural disasters, such as hurricanes, tornadoes and earthquakes, can result in the loss of the roof sheathing under the force of hurricane or tornado winds, and earthquake stresses, and consequent increased likelihood of collapse of the building. Loss of the roof deck or sheathing resulting from such forces weakens the roof structure and can lead to roof failures. The water damage resulting from a loss of roof sheathing or roof failures has been a major contributor to economic losses from hurricanes and other natural disasters.

One approach to providing a building structure that is more resistant to high winds and other natural disasters is the use of tie strips that are connected from the roof, down the wall, and anchored to the building foundation. Such tie strips apply a tensile strength that significantly resists the separation of the roof from the remainder of the building. Such tie strips, in the form of elongated metal straps populated with nail holes for fastening, are available from Simpson Strong-Tie®, Pleasanton, Calif.

Another system available to tie the roof structure to the foundation of a building is the use of structural fabric connected to both the roof and the building foundation. Such a product is disclosed in U.S. Pat. No. 5,870,861 to Gnaedinger which is hereby incorporated by reference, in its entirety.

It would be advantageous if improvements could be made to the use of structural fabrics that are used to reinforce buildings.

SUMMARY OF THE INVENTION

The present invention relates to a structural reinforcement apparatus comprising; flexible elongated reinforcement material having first and second ends, a first connecting member associated with the first end of the flexible reinforcement material, a second connecting member associated with the second end of the flexible reinforcement material, first means for engaging the first connecting member, and second means for engaging the second connecting member, wherein the connecting members and engaging means are configured, dimensioned and operatively associated to provide tension to flexible elongated reinforcing material, and wherein the first and second connecting members associated with edge portions of the flexible elongated reinforcement material and the first and second engaging means each comprises a connector housing that includes a slot for receiving the respective connecting member. Furthermore, either one or both of the slots of the first or second holding members can be a U-shaped slot.

The invention may further comprise a means for securing one or more roofing members to either the first or second connector housing, and wherein either the first or second connector housing comprises an attachment plate for securing the engaging means to a frame structure, and a means for securing one or more roofing members to the first or second connector housing, wherein the means for securing one or more roofing members to the first or second connector housing comprises a horizontal flange extending approximately perpendicularly from the connector housing and has access holes along the length of the flange; and a roof member tie-down. Furthermore, the spacing between the access holes in the horizontal flange are configured and dimensioned to accept a roof member tie-down, and suitably spaced to provide an access hole located on each side of a roof member. The horizontal flange can be a hollow boss with the hollow opening configured and dimensioned to receive an elongated clip having access holes with the same spacing as the horizontal flange access holes and a slot configured and dimensioned to grip a tension rod and thereby secure roof members to the first or second connector housing.

The means for securing one or more roofing members to the first or second connector housing may comprise an upper vertical flange extending approximately parallel from the upper portion of the connector housing attachment plate having one or more openings configured and dimensioned to accept a roof member tie-down. The roof member tie-down may comprise one or more tension rods and a saddle connector, wherein the roof member tie-down secures a roof member to the connector housing horizontal flange in a manner that resists upward movement of the roof rafter, and a tension rod having a swivel portion is inserted through an opening in a strap portion on either side of the saddle connector and locked in an access hole in the connector housing flange and elongated clip.

The means for securing one or more roofing members to the first or second connector housing comprises a T-slot extending along the length of the upper portion of either connector housing; and a roof member tie-down, which comprises, a securing block, a T-slot coupling, which is configured and dimensioned to fit within the connector housing T-slot, extending from the back face of the securing block, a zip-tie extending from an edge of the securing block, and a zip-tie ratchet case positioned along an edge of the securing block opposite the zip tie, wherein the roof member tie-down is coupled to the connector housing by the T-slot coupling and the zip tie can be looped over a roof member and secured in the receiving case.

The invention may further comprise a first or second connector housing configured and dimensioned to hold a wrapped batten, wherein either the first or second connector housing further comprises a downwardly oriented slot formed by the attachment plate portion and a front face, and configured and dimensioned to receive the batten housing, and a retainer clip extending partially into the downwardly oriented slot opening from the front face opposite the attachment plate portion that prevents the batten housing from being withdrawn from the slot once it has been inserted.

The first connector housing can be a rectangular bar configured and dimensioned to be usable as a top plate and the second connector housing is a rectangular bar configured and dimensioned to be usable as a sill plate.

The invention also relates to a frame structure having at least a roofing member and one or more wall members erected upon a foundation, the structure comprising; the structural reinforcement apparatuses described above for providing a continuous tensile load path between the roofing member and the structure's foundation, wherein the flexible reinforcement material is attached to the first and second connecting members along a first and second edge respectively, the first means for engaging the first connecting member is mechanically affixed to the foundation of the frame structure, the first connecting member is operatively associated with first engaging means, the second means for engaging the second connecting member is mechanically affixed to an upper portion of a wall member, the second connecting member is connectively associated with the second engaging means, the roofing member is secured to the second engaging means with a roof member tie-down; and the second means for engaging the second connecting member is operatively associated with the first means for engaging the first connecting member by the flexible reinforcement material attached to the first and second connecting members to form a continuous tensile load path from the roof member to the structure's foundation.

The flexible reinforcement material can be a high strength material that also imparts resistance to seismic events, explosive blasts, and projectiles fired from small arms weapons.

The invention also relates to a frame structure having at least a roofing member and one or more wall members erected upon a foundation, the structure comprising, a structural reinforcement apparatus as described above for providing a continuous tensile load path between the roofing member and the structure's foundation, wherein, the first means for engaging the first connecting member is mechanically affixed to the to an upper portion of a wall member, wherein the first means is a first connector housing, the second means for engaging the second connecting member is mechanically affixed to the foundation of the frame structure, wherein the second means is a second connector housing, the flexible reinforcement material is attached to the first and second connecting members along a first and second edge respectively, the first connecting member is operatively associated with first engaging means, the second connecting member is operatively associated with the second engaging means, the roofing member is secured to the second engaging means with a roof member tie-down to form a continuous tensile load path from the roof member to the structure's foundation; and the first engaging means is operatively associated with the second engaging means by the flexible reinforcement material attached to the first and second connecting members to form a continuous tensile load path from upper portion of the wall member to the structure's foundation.

The roof member tie-down may include tension rods, which are inserted into the access holes in the second engaging means, which can be a connector housing, and wherein the saddle connector can comprise two webs, each tapering to a tension rod.

The invention also relates to a frame structure having at least a roofing member and one or more wall members erected upon a foundation, the structure comprising; a structural reinforcement apparatus, for providing a continuous tensile load path between the roofing member and the structure's foundation, wherein, the first connector housing is used as a top plate forming a wall member, the second connector housing is used as a sill plate forming the same wall member as the first connector housing, the first connecting member is received by the first connector housing, the second connecting member is received by the second connector housing, and the second connector housing is thereby operatively associated with the first connector housing by the flexible reinforcement material attached to the first and second connecting members to form a continuous tensile load path from the roof member to the structure's foundation.

The invention also relates to a method of securing a the frame structure to the foundation which supports it, which comprises; affixing the first connector housing to the foundation of the frame structure, wherein the first connector housing is affixed to the foundation of the frame structure with anchor bolts, affixing the second connector housing to the upper portion of a wall member above the first connector housing, wrapping the first edge portion of the flexible reinforcement material around the second connecting member, connectively associating the second connecting member with the second connector housing, draping the flexible reinforcement material over the wall member down to the first connector housing, connectively associating the first connecting member with the second edge of the flexible reinforcement material and with the first connector housing, wherein at least a portion of the second edge of the flexible reinforcement material is constrained between the first connecting member and first connector housing such that connectively associating the first connecting member and first connector housing applies a tension to the flexible reinforcement material, connectively associating a roofing member tie-down with the second connector housing; and securing the roof member to the second connector housing with the roofing member tie-down, such that the first connector housing is operatively associated with the second connector housing by the flexible reinforcement material attached to the first and second connecting members, and the second connector housing is operatively associated with the roof member to form a single continuous tensile load path from the roof member to the structure's foundation.

The flexible reinforcement material can be wrapped around the second connecting member, the second connecting member is connectively associated with the second connector housing by inserting the wrapped second connecting member into a slot in the connector housing, and the roofing member tie-down is one or more roof strap(s) connectively associated with the second connector housing and securing each of one or more roof member(s) to the second connector housing by looping the strap over the roof member and securing both ends to the second connector housing.

The invention also relates to a method of securing a the frame structure to the foundation which supports it, which comprises; affixing the first connector housing to the upper portion of a wall member of the frame structure, affixing the second connector housing to the foundation below the first connector housing, wrapping the first edge portion of the flexible reinforcement material around the first connecting member, connectively associating the first connecting member with the first connector housing, draping the flexible reinforcement material over the wall member down to the second connector housing, connectively associating the second connecting member with the second edge of the flexible reinforcement material and with the first connector housing, wherein at least a portion of the second edge of the flexible reinforcement material is constrained between the second connecting member and second connector housing such that connectively associating the second connecting member and second connector housing applies a tension to the flexible reinforcement material, connectively associating a roofing member tie-down with the second connector housing to thereby secure the roof member to the second connector housing with the roofing member tie-down, such that the first connector housing is operatively associated with the second connector housing by the flexible reinforcement material attached to the first and second connecting members to form a first continuous tensile load path, and the second connector housing is operatively associated with the roof member to form a second separate continuous tensile load path from the roof member to the structure's foundation.

The invention also relates to a method of making a structural reinforcement apparatus kit, which comprises; providing a first and a second connector housing, wherein the first and second connector housings are different, providing a first and a second connecting member, wherein the first and second connecting members are different, providing a flexible reinforcement material sheet having a top and a bottom edge that is pre-cut to a predetermined length, and attaching at least a first edge of the flexible sheeting to either the first or second connecting member; and providing one or more roof member tie-down(s) that can be connectively associated with either the first or second connector housing.

Furthermore, according to this invention there is also provided a building construction having a foundation, walls and a roof structure, the walls being wrapped by a reinforcement fabric. The reinforcement fabric is connected to the foundation and the roof structure to tie the roof structure to the foundation for increased resistance to natural disasters. The connection of the reinforcement fabric to the roof structure includes a top rail having a connector plate attached to the roof structure and having an upwardly oriented opening. A wrapping member, about which the reinforcement fabric can be wrapped, has a geometry corresponding with the geometry of the upwardly oriented opening in such a manner that the wrapping member is prevented from rotating in the opening.

According to this invention there is also provided a building construction having a foundation, walls and a roof structure, the walls being wrapped by a reinforcement fabric, with the reinforcement fabric being connected to the foundation and the roof structure to tie the roof structure to the foundation for increased resistance to natural disasters. The connection of the reinforcement fabric to the roof structure includes a connector plate that can be attached to the roof structure and having a downwardly oriented slot defined by a vertical web and an inwardly projecting retainer flange. A housing is comprised of top and bottom edges and a front face, the housing being configured to fit into the downwardly oriented slot. There is also provided a batten that can be wrapped with the reinforcement fabric and placed in the housing to connect the reinforcement fabric to the roof structure.

According to this invention there is also provided a building construction having a foundation, walls and a roof structure, the walls being wrapped by a reinforcement fabric, with the reinforcement fabric being connected to the foundation and the roof structure to tie the roof structure to the foundation for increased resistance to natural disasters. The connection of the reinforcement fabric to the roof structure includes a top rail having a connector plate attached to the foundation and having a downwardly oriented opening. There is also provided a wrapping member about which the reinforcement fabric can be wrapped, the wrapping member having a geometry corresponding with the geometry of the downwardly oriented opening in such a manner that the wrapping member is prevented from rotating in the opening.

According to this invention there is also provided a building construction having a foundation, walls and a roof structure, the walls being wrapped by a reinforcement fabric, with the reinforcement fabric being connected to the foundation and the roof structure to tie the roof structure to the foundation for increased resistance to natural disasters. The connection of the reinforcement fabric to the roof structure includes a top rail having a connector plate that is attached to the reinforcement fabric, and further includes a reinforcement link that connects the connector plate to the roof structure.

According to this invention there is also provided a connector between a building reinforcement fabric and a building roof structure, the connector including a rail having a connector plate that can be attached to the reinforcement fabric, and further including a reinforcement link that connects the connector plate to the roof structure.

According to this invention there is also provided a building construction having a foundation, walls and a roof structure, the walls being wrapped by a reinforcement fabric, with the reinforcement fabric being connected to the foundation and the roof structure to tie the roof structure to the foundation for increased resistance to natural disasters. The connection of the reinforcement fabric to the roof structure includes a top rail having a connector plate that is attached to the reinforcement fabric, and the top rail further has an elongated clip with clip openings and a slot configured to receive and secure tension rods connected to the roof structure, thereby connecting the fabric to the roof structure.

Various advantages of this invention will become apparent to those skilled in the art from the following detailed description of the preferred embodiment, when read in light of the accompanying drawings.

Additional related embodiments are disclosed in co-pending U.S. patent application Ser. No. 12/726,116 (Publication No. US 2010/0236158), which was filed on Mar. 17, 2010, the entire contents of which is expressly incorporated herein by reference.

BRIEF DESCRIPTION OF THE DRAWINGS

Preferred embodiments of the present invention, which are also illustrative of the best mode contemplated by the applicants, is presented in the drawings and detailed description that follows herein:

FIG. 3 is a schematic exploded view in perspective of the lower rail used to connect the reinforcement fabric to the foundation.

FIG. 4 is a schematic view of the assembled lower rail.

FIG. 24A is a view of the claim shell arrangement of FIG. 24 in an assembled condition.

FIG. 42A is a view of wall system with a lower rail.

FIG. 42B is a view of another lower rail.

DETAILED DESCRIPTION OF THE INVENTION

It is understood that these drawings only illustrate some of the preferred embodiments, and do not represent the full scope of the invention for which reference should be made to the accompanying claims.

Figure 1:
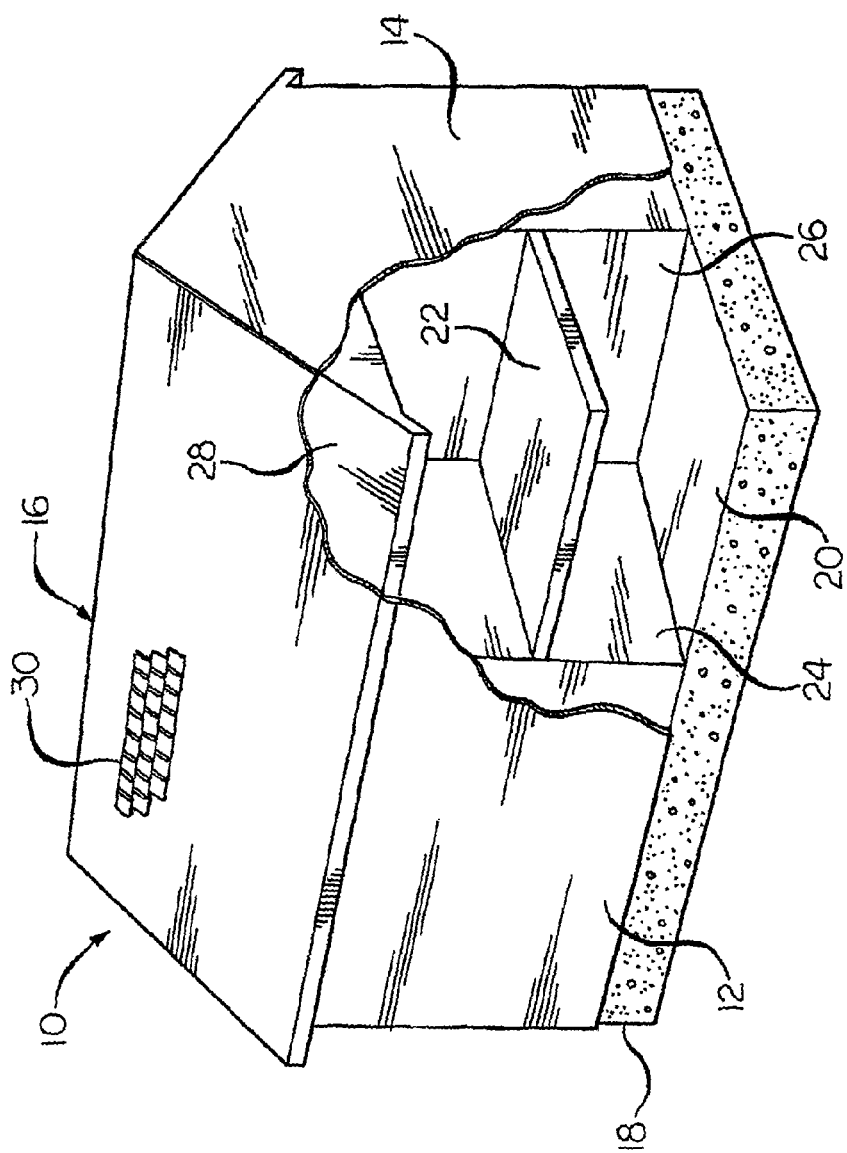
FIG. 1 is a schematic, perspective view of a building, the building being cutaway for illustrative purposes.

As shown in FIG. 1, a building or typical frame structure, indicated generally as 10, is comprised of longitudinal wall members 12, end wall members 14, roof structure 16 comprised of one or more roof members, and a foundation 18. The longitudinal walls 12 and end walls 14 are exterior shear walls that typically support the downward load of the roof structure 16. The cutaway portion of FIG. 1 reveals representative horizontal floor diaphragms 20 and 22, and interior shear walls 24 and 26. The cutaway also shows that the roof structure 16 is comprised of roof diaphragms 28. The roof structure 16 is covered with an exterior roof covering 30 in the form of shingles. Other roof coverings can be used, such as, for example, tile, slate or metal decking (not shown).

Figure 2:
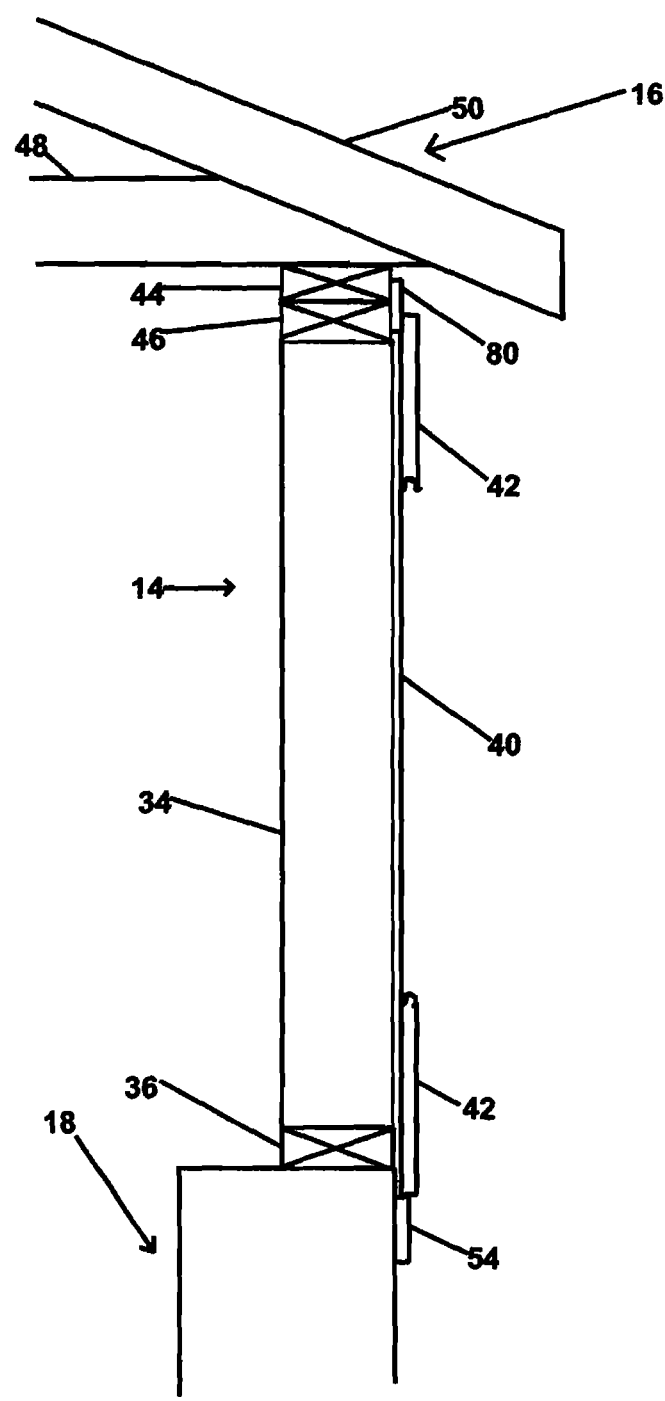
FIG. 2 is a schematic cross-sectional view in elevation of a wall of the building, showing portions of the roof structure and foundation.

As shown in FIG. 2, a wall 12 or 14 is comprised of studs 34 resting on sill plate or foundation plate 36. A flexible reinforcement fabric 40 is stretched between the upper portion of the wall 12, 14 or roof structure 16 and the foundation 18. The reinforcement fabric 40 is a high tensile strength fabric, and in one embodiment the reinforcement fabric 40 acts as an air barrier, eliminating the need for a separate air barrier layer.

Positioned outside the reinforcement fabric 40 is the exterior wall covering or cladding 42, which can be cementitious siding, such as HardiePlank® lap siding, wood siding, or vinyl siding, as well as other exterior wall covering materials. The exterior wall panels 42 are shown partially cut away in FIG. 2. At the top of the studs 34 are positioned two top plates, and upper top plate 44 and a lower top plate 46, respectively. Typically, these are 2×4 boards. The roof structure is comprised of horizontally oriented joists 48, and angled roof rafters 50. In some embodiments, the rafters and joists are combined into a truss, not shown. The roof structure 16 can be any one of many different designs, but in general includes framing members such as joists, rafters and trusses, as well as the roof covering which can include roof deck elements applied to the framing members, and roof covering elements such as shingles, tile, slate, and metal decking.

The present invention relates to an apparatus, a structural system, and a method for creating a continuous tensile load path from the roofing members and upper wall portion to a building's foundation to resist upward and lateral forces from lifting or otherwise removing the roofing members from the wall members, and the wall members from the foundation. The invention in some embodiments also relates to providing a frame structure with blast resistance and added resistance to penetration by small arms fire when particular types of flexible reinforcement materials are implemented, such as one or more plies of a ballistic fabric.

The invention generally relates to a means for providing a continuous load path from one or more roofing members of a structure to a foundation of that same structure. This comprises the use of a flexible elongated reinforcement material having first and second edges to which a first connecting member is associated with the first edge and a second connecting member is associated with the second edge opposite the first edge. There is a first means for engaging the first connecting member and for securing the first connecting member to a building structure, and a second means for engaging the second connecting member and for securing the second connecting member to a building structure, wherein the connecting members and engaging means can be configured, dimensioned and operatively associated to provide tension to the flexible elongated reinforcement material. The means for securing the connecting member to a building structure is with a connector housing as described in further detail below and illustrated in the figures. The connector housing has an attachment plate that is secured to the structure by fasteners known to those skilled in the art, such as anchor bolts, lag screws, etc. The means for engaging the connecting member is a structural feature of the connector housing, which may be with a bent or flange or U-shaped slot that retains the connecting member under either the force of gravity or due to tensioning of the reinforcement material. The invention also further relates to a means for securing a roofing member to the means for securing a connecting member to the building structure. The means for securing a roof member is a roof member tie-down that can be a strap, belt, cord, rope, zip-tie, saddle connector and tie-rod, or other elongated web of material that can be looped over a roof member and provide resistance to upward forces, and may further comprise a securing feature that operatively associates the means for securing a roof member to connector housing, such as a hook, clip, toggle, stay, or other attachment coupling known to those in the art.

In one embodiment, the invention comprises an upper or top rail that is affixed latitudinally to the upper portion of a wall member and a lower or bottom rail that is affixed to the building's foundation. The upper rail is typically fastened to the top plates forming the wall using standard fasteners known to those in the construction arts, such as nails. The lower rail is fastened to the foundation using standard fasteners known to those in the construction arts, such as anchoring bolts.

The upper and lower rails each comprise at least two components that can include a connector housing and a connecting member, where the connecting member is held by or within a portion of the connector housing. This portion of the connector housing can be a U-shaped slot formed by extruding the profile or creating a bend in the connector housing attachment plate, or a rectangular slot formed by a front and a back web of material.

The reinforcement apparatus generally comprises an upper rail and a lower rail, two connecting members, and a flexible reinforcement material typically in the form of sheeting having at least two edges opposite each other, where one of the connecting members is attached to the reinforcement material along a first edge and the other connecting member is attached to the reinforcement material along the second, opposite edge. One of the connecting members is then inserted into and held by the first connector housing and the second connecting member is inserted and held by the second connector housing to create a continuous tensile load path with the flexible reinforcement material. The different embodiments of the connector housings can be attached either along an upper portion of a wall member to thereby form part of an upper rail, or along the foundation to thereby form a part of the lower rail without deviating from the spirit and scope of the invention.

Additional features of the connector housings allow the roofing members, such as the roof joists, trusses, and rafters, to be secured to a connector housing with a roof member tie-down to provide a continuous tensile load path all the way from the roof through the flexible reinforcement fabric to the foundation.

It should be noted that the structural reinforcement apparatus to which the present invention relates, would typically comprise at least two connector housings, two connecting members, and a length or pre-cut section of flexible reinforcement material. The first and second connector housings could have different designs or be of the same design depending upon the particular structure and application. Similarly, the first and second connecting members and associated connector housing slots could be of the same or different designs. In this manner, a variety of different embodiments of each of the components can be mixed and matched to best suit the particular application and implementation of the invention. The terms first connector housing and second connector housing also do not necessarily distinguish the positioning and orientation of a particular connector housing design described herein, and while there are preferable arrangements for fastening the different designs to the foundation or wall members, the actual positioning of the components should be considered interchangeable. A combination of a connector housing and a wedge could therefore be used along the upper portion of a wall as well as along the foundation. Similarly, a roof member tie-down could be secured to a first connector housing fastened along the upper portion of the wall, or to a first connector housing fastened to the foundation without deviating from the spirit or scope of the present invention. The examples of the different embodiments are described having preferred orientation, but this should not be considered to limit the scope of the present invention.

A feature of the lower connector housing is that it is thin enough that it does not protrude out past the back plane of any wall covering, such as for example, vinyl siding, cedar shakes, stucco, plaster or brick-face exterior wall covering. This avoids interference with the final form of the exterior walls, and does not require additional engineering and/or framing to cover or compensate for the extra thickness.

In some of the embodiments described herein, a matched pair of components having mating convoluted faces can be used to retain the flexible reinforcement material instead of wrapping or inserting in a slot and retaining with a spline or wedge. Such mating convoluted faces can be utilized for associating the flexible material with either a connecting member or for engagement with a connector housing as described in more detail in reference to the particular embodiments.

Adhesives or double faced tape may also be utilized to further improve the connection between the flexible reinforcement material and other apparatus components, or between the different components themselves.

The best mode of the present invention also contemplates minimizing any interference with the actual construction and building cycle by allowing the reinforcement apparatus to be installed independently from any of the other framing or construction stages.

Examples of different embodiments of each of the mentioned components as well as different embodiments of the apparatus will now be described in more detail with reference to the figures.

As shown in FIG. 2, the reinforcement fabric 40 is connected to the foundation 18 by means of an attachment structure in the form of a lower rail 54. This attachment structure connects the reinforcement fabric 40 to the foundation 18 in a secure manner. The reinforcement fabric 40 is attached to the roof structure 16 by means of an attachment structure in the form of an upper or top rail 80.

The flexible elongated reinforcement material 40 is preferably a high strength material that imparts resistance to high wind events, seismic events, and may also impart resistance to explosive blasts, and projectiles fired from small arms weapons depending on the actual material used. The flexible material 40 can be a woven ballistic fabric that includes nylon or aramid (i.e., Kevlar®) fibers that can assist a structure to withstand vertical and horizontal forces, where the vertical forces can be lifting forces caused by high wind events, and the horizontal forces can be lateral or parallel to the wall members such as those possibly caused by seismic events, or perpendicular to the face of the wall members such as that caused by an explosive blast and high winds. In one embodiment, one or more sheets of ballistic fabric such as Kevlar® can be used as the flexible material to provide improved resistance to penetration of the wall by projectiles due to for example debris carried by high winds or small arms fire.

When a plurality of flexible reinforcement sheets are used to provide improved blast protection or improved resistance to penetration by projectiles, the multiple layers of material can be wrapped around or otherwise attached to the same connecting member. The connecting member and means for engaging the connecting member may required reconfiguring and redimensioning to accommodate the increased thickness of the added plies of flexible material. Adhesives may also be utilized to improve the connection between individual sheets and with the connecting member to prevent slippage.

Figure 4A:
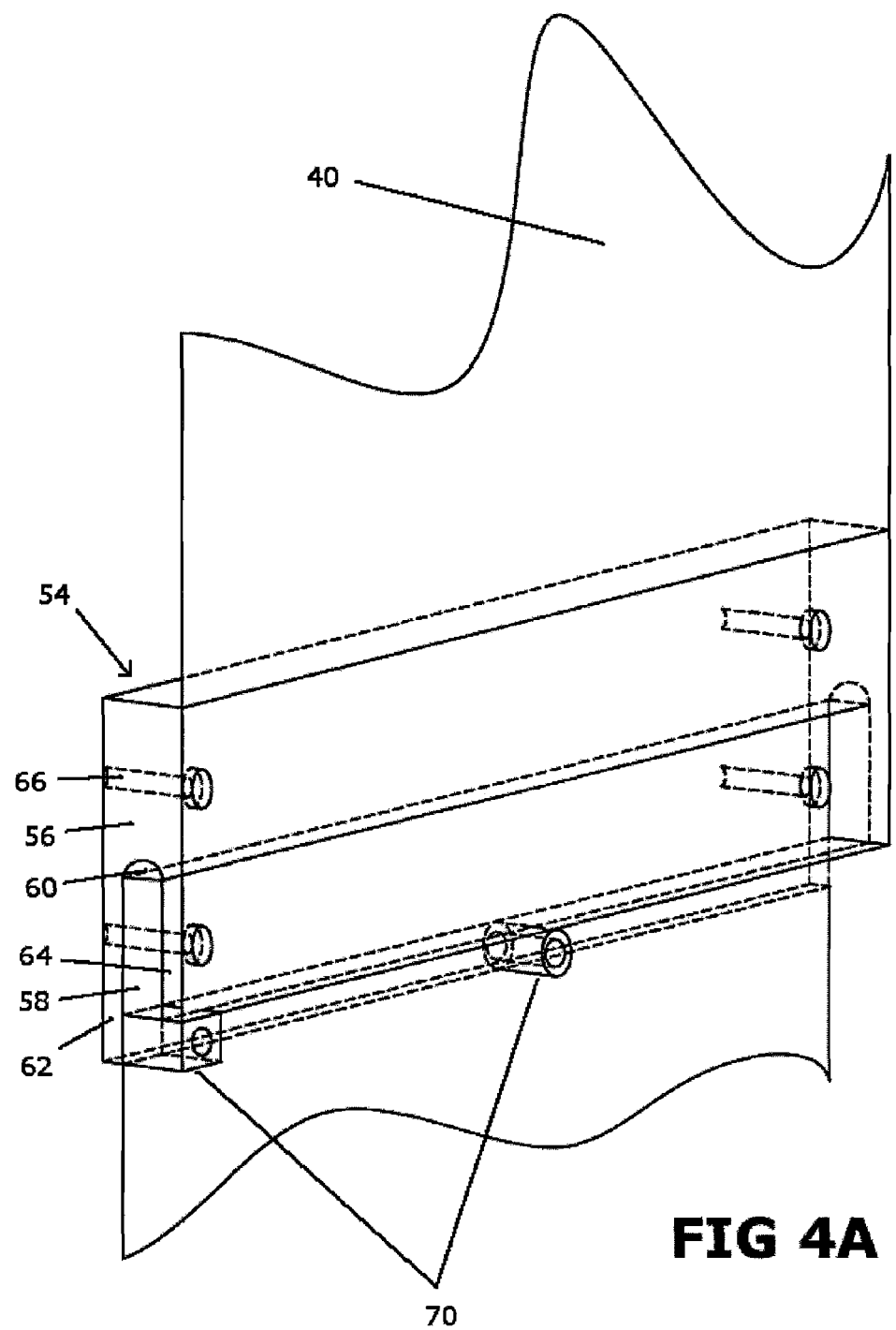
FIG. 4A is a schematic view of the assembled lower rail.
Figure 5:
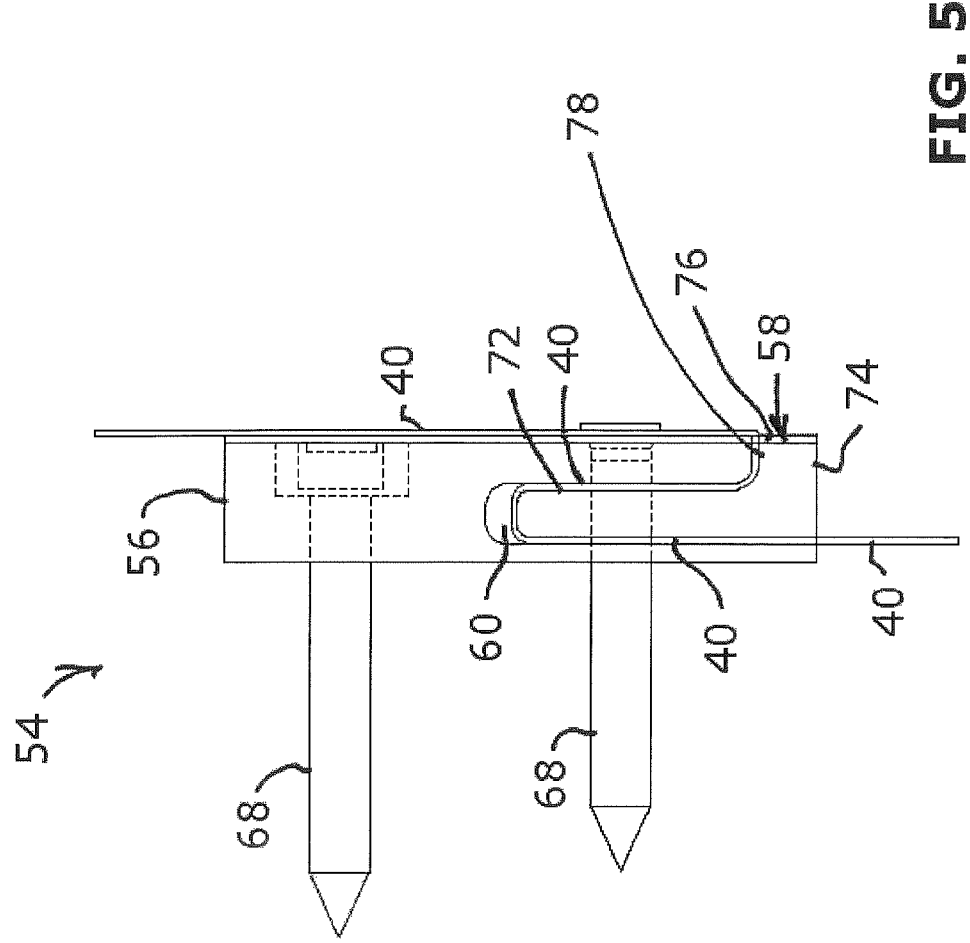
FIG. 5 is the lower rail in cross-section.

As shown in FIGS. 3-5, the lower rail 54 is an elongated member that is intended to be affixed latitudinally to the outside face of a structure's foundation 18, and is comprised of a connector housing 56, which is also called the foundation connector, when attached to the foundation, and a connecting member 58, also referred to as a wedge when L-shaped.

The lower portion of the connector housing or foundation connector 56 has a downwardly oriented slot 60 defined by inner 62, and outer 64 flanges, as shown in FIG. 3. The slot is preferably a U-shaped slot configured and dimensioned to receive a connecting member. Such a slot 60 can be between $3/16$-$5/16$ wide and 1-2 inches deep, but is preferably $1/4$ inch wide and approximately 1.5 inches deep.

The foundation connector 56 is provided with bolt holes 66 in both the upper and lower portions to enable the foundation connector 56 to be anchored to the foundation 18 with fasteners, such as anchoring bolts 68, and to secure the connecting member 58 in place as shown in FIGS. 4 and 5. Any suitable type of and number of anchoring bolts 68 can be used. For example, the anchoring bolts can be spaced laterally at a spacing of approximately 6 inches. In other embodiments, the spacing is larger or smaller than 6 inches. The foundation connector 56 is fastened horizontally along the face of the foundation 18 with the slot 60 aligned in a vertical direction. The slot 60 functions as a means for engaging a connecting member 58, and the connector housing 56 is a means for securing the connecting member 58 to a building structure. The connecting member 58 is a means for operatively associating the flexible reinforcement material 40 with the connector housing 56.

The connector housing 56 in the preferred embodiment shown has a cross-section that is approximately 2½ inches tall and approximately ½ inches in thickness, although the connector housing could be between approximately 2 and 3½ inches tall and $3/8$-$3/4$ inches thick. As mentioned above, the thickness of the connector housing should be approximately the same as the thickness of the exterior wall board to avoid sticking out past the back plane of the exterior wall covering so it does not flex or bulge outwards at the foundation. The lower rail can be supplied in lengths such as 6 or 8 feet in length, or any other suitable lengths.

In a preferred embodiment, the connecting member, which is referred to as a wedge 58 when it is in the form of an L-shape and comprised of an upwardly extending flange 72 and a bottom lip 74. The connecting member or wedge 58 is configured and dimensioned to be inserted into the slot 60 in the foundation connector 56 for a tight, slip, interference, or push fit when wrapped with the reinforcement material 40. Prior to inserting the wedge 58 into the slot 60, the reinforcement fabric 40 is arranged over or wrapped over the wedge so that when the wedge is inserted into the slot 60, the fabric is gripped and held in place around the wedge. The wedge is preferably secured in place within the slot 60. The connecting member can be fastened in place with a fastener, such as a screw or anchoring bolt, although in some embodiments a fastener may not be necessary, or held in place within the connector housing with a retaining block that is fastened to the foundation with a suitable fastener such as an anchoring bolt, as shown in FIG. 4A. The retaining block may be fastened directly to the foundation with an anchor bolt, directly to the bottom portion of the attachment plate of the connector housing with a fastener, or through the bottom portion to the foundation with an anchor bolt. The connecting member 58 can be referred to as a batten when it is a straight bar without a lip.

The bottom lip 74 of the wedge can extend horizontally to be flush with the front face 76 of the connector 56. In another embodiment, the bottom lip 74 can extend beyond the front face 76 of the connector housing 56 in order to provide an outwardly extending and upwardly facing edge 78. This upwardly facing edge 78 can be used as a support surface for the wall panels or exterior wall covering 42. Alternatively, the upwardly facing edge can be used as a starter strip or an alignment guide for the installation of the wall panels or exterior wall covering 42. As an example, the upwardly facing flange can be a ¼ inch spacer to provide alignment for Hardy Board siding. In another embodiment, the upwardly facing edge acts as a starter lip for vinyl siding.

In another preferred embodiment, the connecting member 58 can be a straight batten without the bottom lip 74, which is configured and dimensioned to fit within the slot 60 of the connector housing and extends downward, such that it is flush with the inner flange 62 of the connector housing 56. The connecting member is then secured within the slot 60 using a retaining block that is fastened to the foundation just below the batten so that it presses the batten snuggly into the slot of the connector housing. A retaining block is preferably square or circular, although any shape that can press against the lower edge of the batten could be used to hold it in place.

Figure 5A:
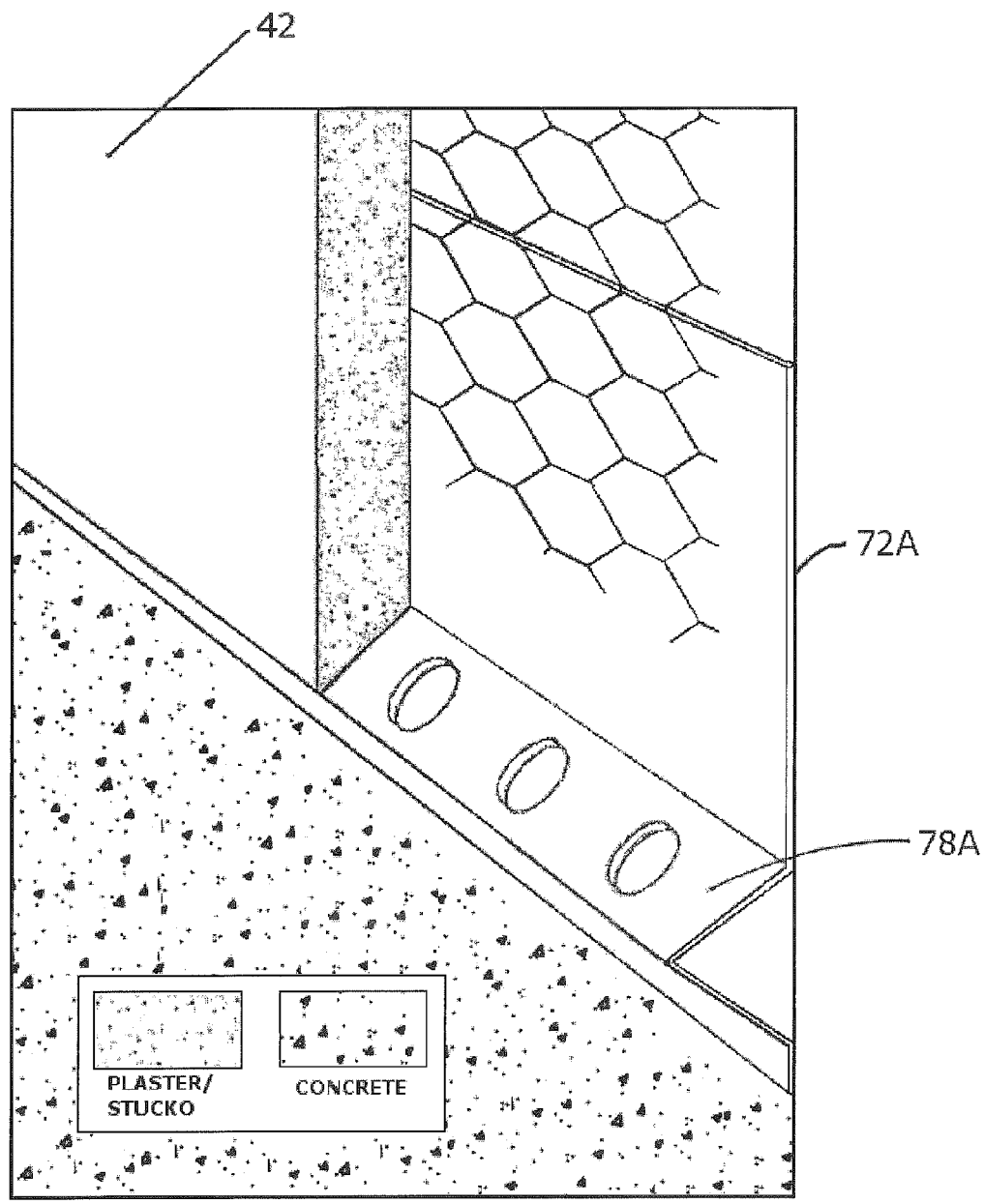
FIG. 5A is partially a cut away perspective view illustrating an alternate embodiment of the lower rail, with the wedge including a vented screed.

In yet another embodiment, as shown in FIG. 5A, the upwardly facing edge 78 of a connecting member 58A of an alternate wedge design is a vented screed plaster stop 78A with weep holes 79A. The vented screed 78A is connected to or integral with the wedge variant 58A, and the vented screed 78A provides support to the exterior wall covering 42. In addition, one or more layers of kraft paper can be placed between the plaster or stucco and the flexible reinforcing material to prevent the flexible material from being damaged by the alkalinity of the water and moisture from the wet concrete, plaster or stucco before it can exit through the weep holes.

It can be seen in FIG. 4, that with the wedge 58 inserted into the slot 60, and the reinforcement fabric 40 wrapped around the wedge 58, the fabric will be secured and prevented from being pulled up and out from the slot, and thus the fabric will be secured to the foundation. To securely hold the fabric, the slot 60 and connecting member 58 must be configured and dimensioned such that the fabric-wrapped wedge can be inserted into the slot with a minimal amount of play, so that the fabric is constrained by the wedge 58 to the extent that the fabric cannot slip. More preferably, the slot 60 and wedge or batten 58 are configured and dimensioned to have a slip or push fit so the fabric-wrapped wedge 58 is firmly held within the slot 60. To assist in preventing undesired slipping of the fabric, the exterior of the wedge or batten, or the sides of the slot 60, or both, optionally can be provided with high friction surfaces, such as from knurling or coatings (not shown). In addition or in the alternative, adhesives or double-sided tape may be utilized to prevent the undesired slippage of the fabric.

In other embodiments, retaining blocks 70 can be used to secure a connecting member within the slot of a connector housing, as shown in FIG. 4A.

It can be seen in FIG. 5, that the connecting member 58 can be any flat member that can be inserted into the slot 60. In a broad sense, the function of the Connecting member 58 and slot 60 can be performed by any number of combinations of slots or openings coupled with a wrapped member. The term "wrapped member" includes not only an element about which the fabric is wrapped around like thread on a spool, but also an element that forces the reinforcement fabric 40 to follow or wrap around a non linear path that restricts the ability of the fabric to slip. In the various embodiments, the connector housing slot and wrapped member have geometries that prevent rotation of the wrapped member or slippage of the reinforcement fabric 40 once the wrapped member is inserted into the slot. This will lock or secure the fabric to the lower rail 54.

Figure 5B:
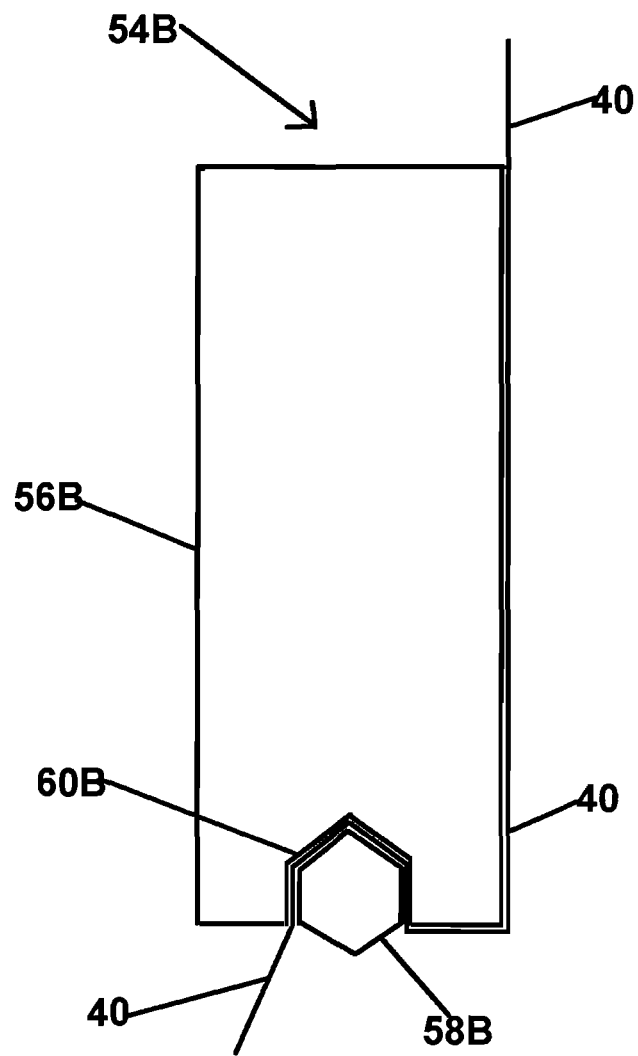
FIG. 5B is a cross-sectional view in elevation of an alternate embodiment of the lower rail having a hexagonally shaped wrapping member.

An example of an alternate opening and wrapped member is shown in FIG. 5B, where a lower rail 54B includes a foundation connector 56B and a hexagonally shaped connecting member 58B. The foundation connector 56B has a downwardly oriented opening 60B that has a mating or corresponding geometry to that of the connecting member 58B. It can be seen that once the connecting member 58B is wrapped and is inserted into the opening 60B, the wrapped member 58B will not be able to rotate within the hexagonal opening 60B due to the functionally associated shapes of the member and opening. It can be appreciated that there are advantages in having a slim opening and the wrapping member rather than bulky openings and wrapping member in order to fit in with conventional building construction designs.

As shown in FIGS. 6-9, the top rail 80 is comprised of a connector housing 82, also called a roof structure connector plate, when attached along the upper portion of a wall member or high heel truss, and a connecting member 84 or batten when shaped as a flat straight bar, around which the reinforcement fabric 40 is wrapped.

The connector housing or roof structure connector plate 82 is a substantially flat plate that has a flange or boss 86 extending perpendicular to the face of the attachment plate portion 88 of the roof structure connector plate 82. The boss 86 is preferably hollowed out to form a slot 90 extending along the length of top rail, wherein the slot 90 is preferably rectangular, but may be other shapes such as round, oval or square without deviating from the spirit and scope of the invention. The slot 90 is preferably configured and dimensioned to receive an elongated clip 98 that will provide a reinforcement for retaining the locking member of a roof member tie-down inserted into access holes in the boss, as further described below. The roof structure connector plate 82 is provided with a plurality of screw holes 92 through the attachment plate portion 88 to enable the roof structure connector plate 82 to be connected to the double headers or top plates 44 and 46. Any suitable fasteners known to those in the construction arts can be used. The slot 94 functions as a means for engaging a connecting member 84, and the connector housing 82 is a means for securing the connecting member 84 to a building structure. The connecting member 84 is a means for operatively associating the flexible reinforcement material 40 with the connector housing 82 in conjunction with the slot 90.

In an alternate embodiment, not shown, where the roof structure construction includes a raised heel truss, the roof structure connector plate or second connector housing 82 can be connected to a vertical beam connecting the angled roof rafters to the horizontal roof joists.

As further shown in FIGS. 6-9, the roof structure connector plate 82 includes an upwardly oriented slot 94 defined by the lower portion of the attachment plate 97, the curved bottom, and front flange 96, wherein the slot can be a U-shaped slot. The reinforcement fabric 40 can be wrapped around the connecting member 84, which is configured and dimensioned to be positioned in the slot 94 to anchor the reinforcement fabric 40 to the top rail 80, and hence to the roof structure. The connecting member or batten 84 can be made of any suitable material, such as plastic or wood, and is preferably sized to fit snugly into the slot 94 when wrapped by the reinforcement fabric. The fit can be either a slip fit or a push fit to provide a minimum amount of play between the wrapped batten and the slot.

In one embodiment the batten 84 can be approximately ¼ inch thick and approximately 1.5 inches high, although other dimensions can be used.

When the top rail 80 is properly positioned, it can be seen that the reinforcement fabric 40 is wrapped around the batten 84, and the batten 84 is positioned in the upwardly oriented slot 94, the reinforcement fabric 40 is thereby operatively connected to the upper portion of the wall structure through the roof structure connector plate 82. Since the slot 60 in the foundation connector 56 is oriented downwardly when the bottom rail is properly positioned, and the slot 94 in the top rail 80 is oriented upwardly when the top rail is properly positioned latitudinally across the upper portion of a wall, the reinforcement fabric 40 can be maintained in tension if desired. In various preferred embodiments the reinforcement fabric 40 is installed in a state of tension, although this is not required. The complete building construction and installed apparatus provides a continuous load path from the roof structure to the foundation. In an optional embodiment, the slot 94 of the roof structure connector plate includes drain holes to allow moisture to drain out. In another embodiment, the reinforcement fabric 40 and batten 84 are packaged and shipped with the reinforcement fabric 40 wrapped around and affixed to the batten 84.

It can be seen that with the batten 84 inserted into the upwardly oriented slot 94, and the reinforcement fabric 40 wrapped around the batten 84, the fabric will be secured and prevented from being pulled up and out from the slot, and thus the fabric will be secured to the roof structure. The fabric must be wrapped around the batten 84 to the extent that it cannot slip. To assist in preventing undesired unwrapping of the fabric, the surface of the batten and of the sides of the slot 94 optionally can be provided with high friction surfaces. In addition or in the alternative, adhesives or double-sided tapes may be utilized to prevent the undesired slippage of the fabric. In a broad sense, the function of the batten 84 and slot 94 can be performed by any number of combinations of slots or openings coupled with a wrapped member, where the opening and wrapped member have a geometry that prevents rotation and of the wrapped member once it is inserted into the opening. Further, the geometry prevents slipping of the reinforcement fabric 40 from the wrapped member.

Figure 6:
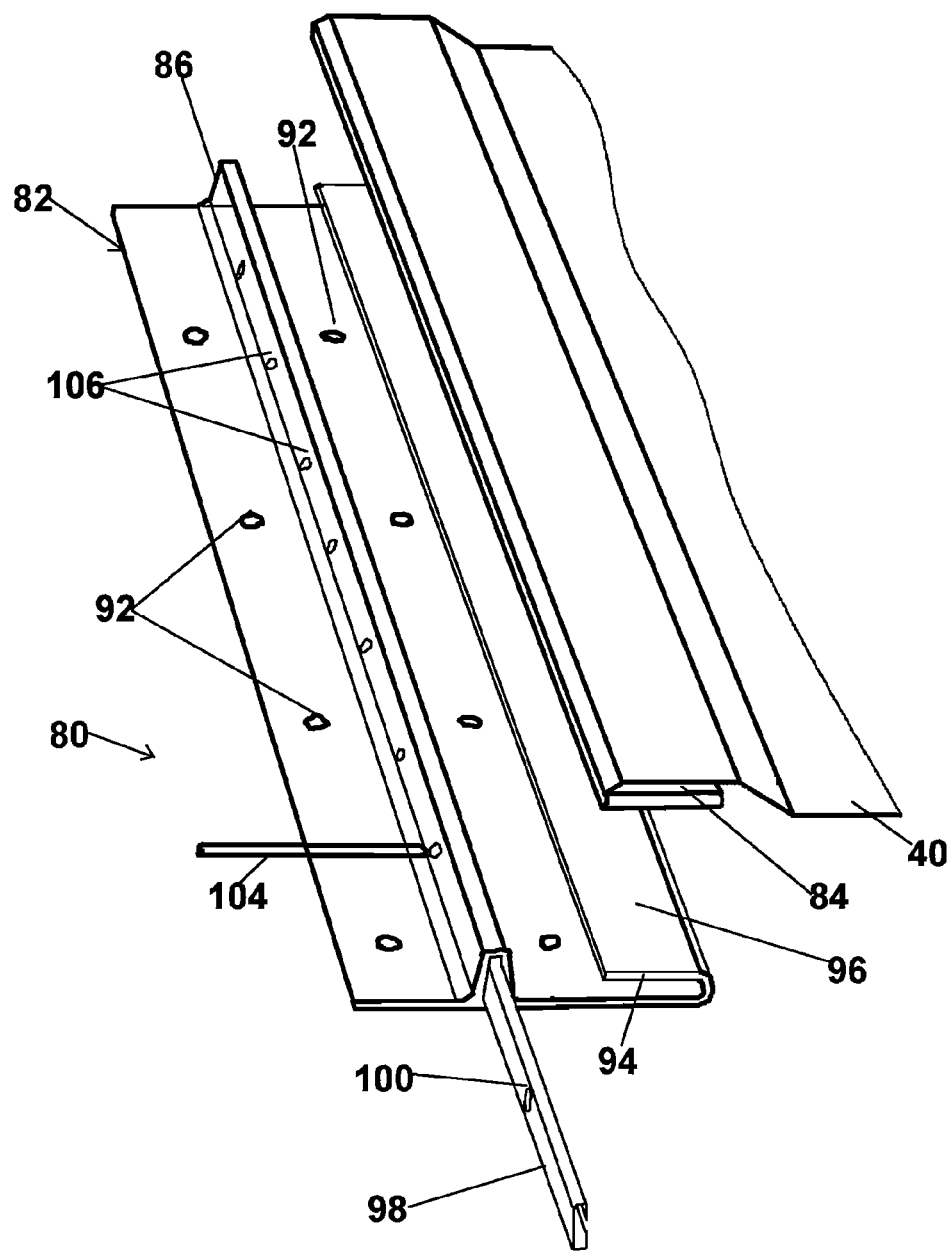
FIG. 6 is a schematic exploded view in perspective of the upper rail used to connect the reinforcement fabric to the roof structure.
Figure 7:
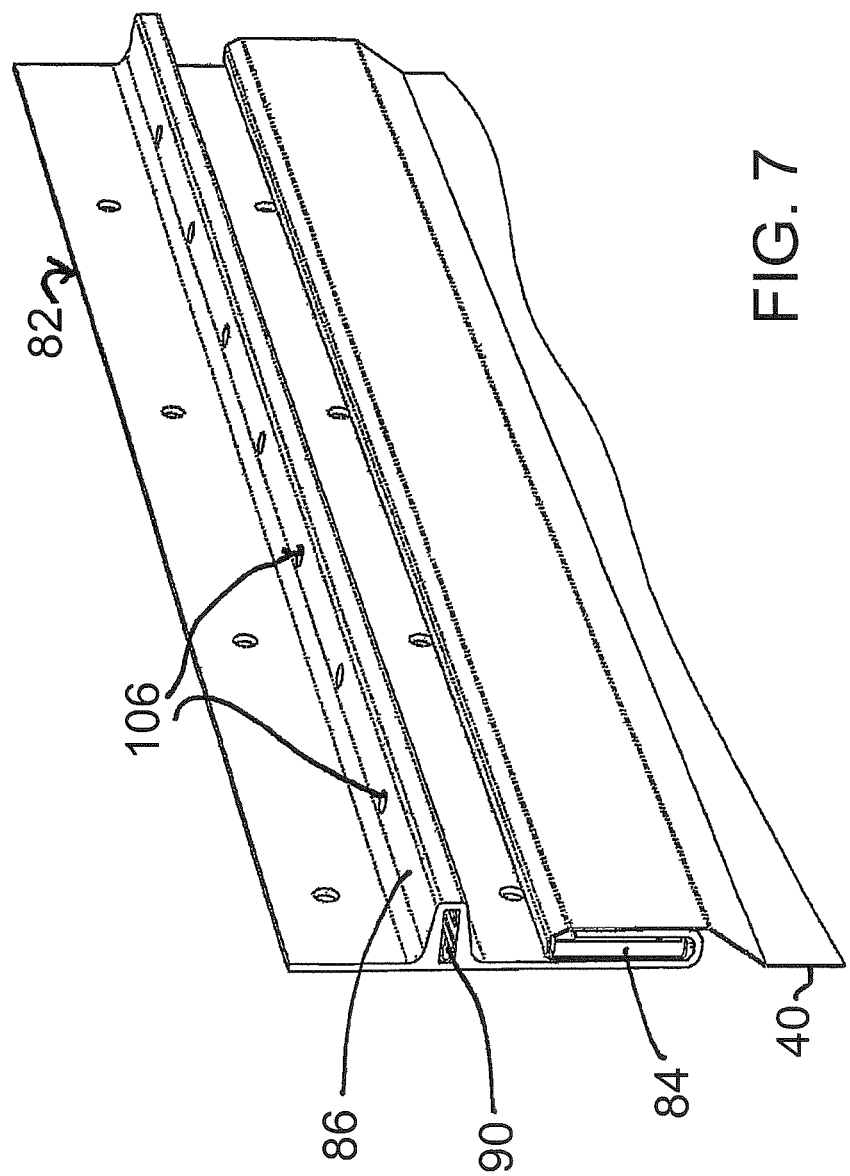
FIG. 7 is a schematic view of the assembled upper rail.

The boss 86 includes the elongated slot 90 which is configured and dimensioned to receive an elongated clip 98. As shown in FIG. 6, the clip 98 is provided with a plurality of clip openings 100 that are suitable for allowing the attachment member of a roof member tie-down, such as tension rods 104, to be inserted into and retained by the elongated clip 98. The tension rods 104 are used in conjunction with the roof member securing portion, which in this embodiment is a saddle connector 120, to form one embodiment of a roof member tie-down that secures the roof rafters to the roof structure connector plate of the top rail. The attachment members or tension rods are preferably made of nylon, but can be made of any suitable material with good tensile strength and service life, such as engineering plastics or polymer composite materials having reinforcing fibers.

The tension rods are of a length suitable to attach a saddle connector or other roof member tie-down to the boss of the connector housing. In a particular embodiment, the tension rods can have an extended length that allows them to reach from a roof member tie-down located on a roof member to a connector housing having a boss that is fastened to the foundation. In such an embodiment, access to the connector housing along a foundation and the ends of the tension rods can allow subsequent increases in tension to compensate for slack in the tension rods due to creep or relaxation of the tension rod material or shrinkage of the framing members of a structure over time. Tension rods used to secure a roof member tie-down to an upper rail will therefore be shorter than tension rods used to secure a roof member tie-down to a lower rail.

A preferred embodiment of the invention uses a roof member tie-down and tension rod made of high strength, low elongation fibers and an engineering plastic that has low creep and good oxidation and weathering resistance to thereby improve performance and service life.

Figure 10:
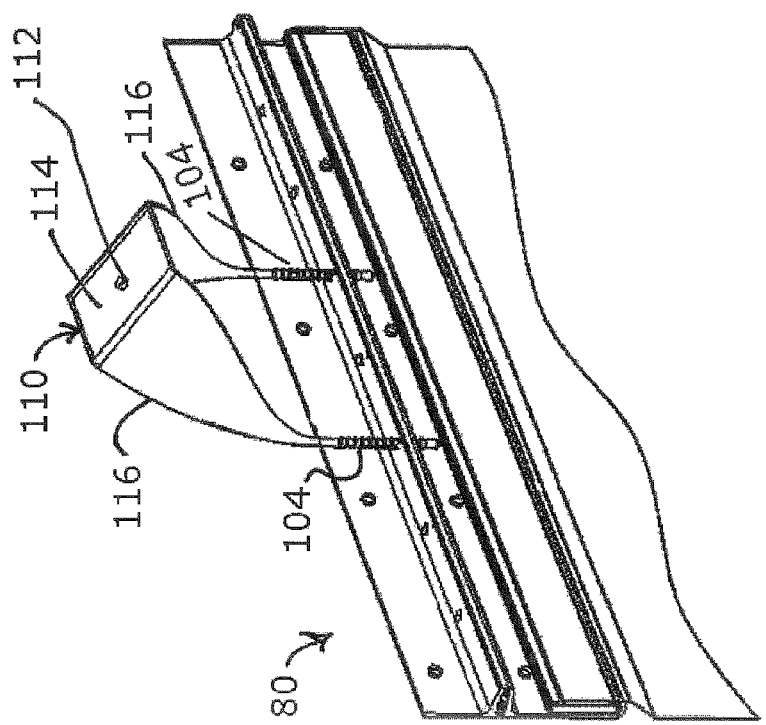
FIG. 10 is a schematic view in perspective of the top rail having a saddle connector for connection to a joist or rafter.
Figure 11:
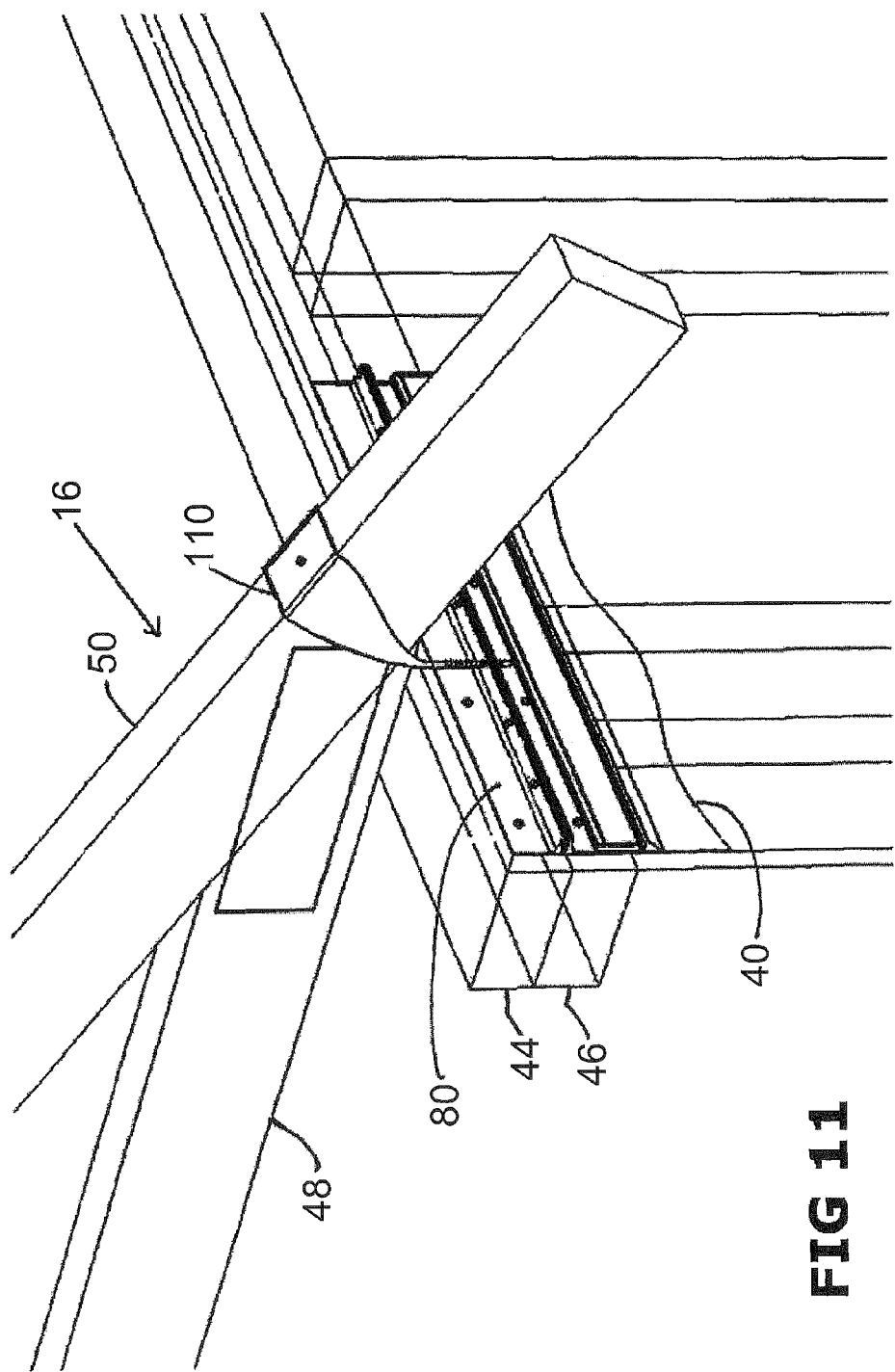
FIG. 11 is a schematic view of in perspective of the top rail connected to a joist by means of the saddle connector shown in FIG. 10
Figure 12:
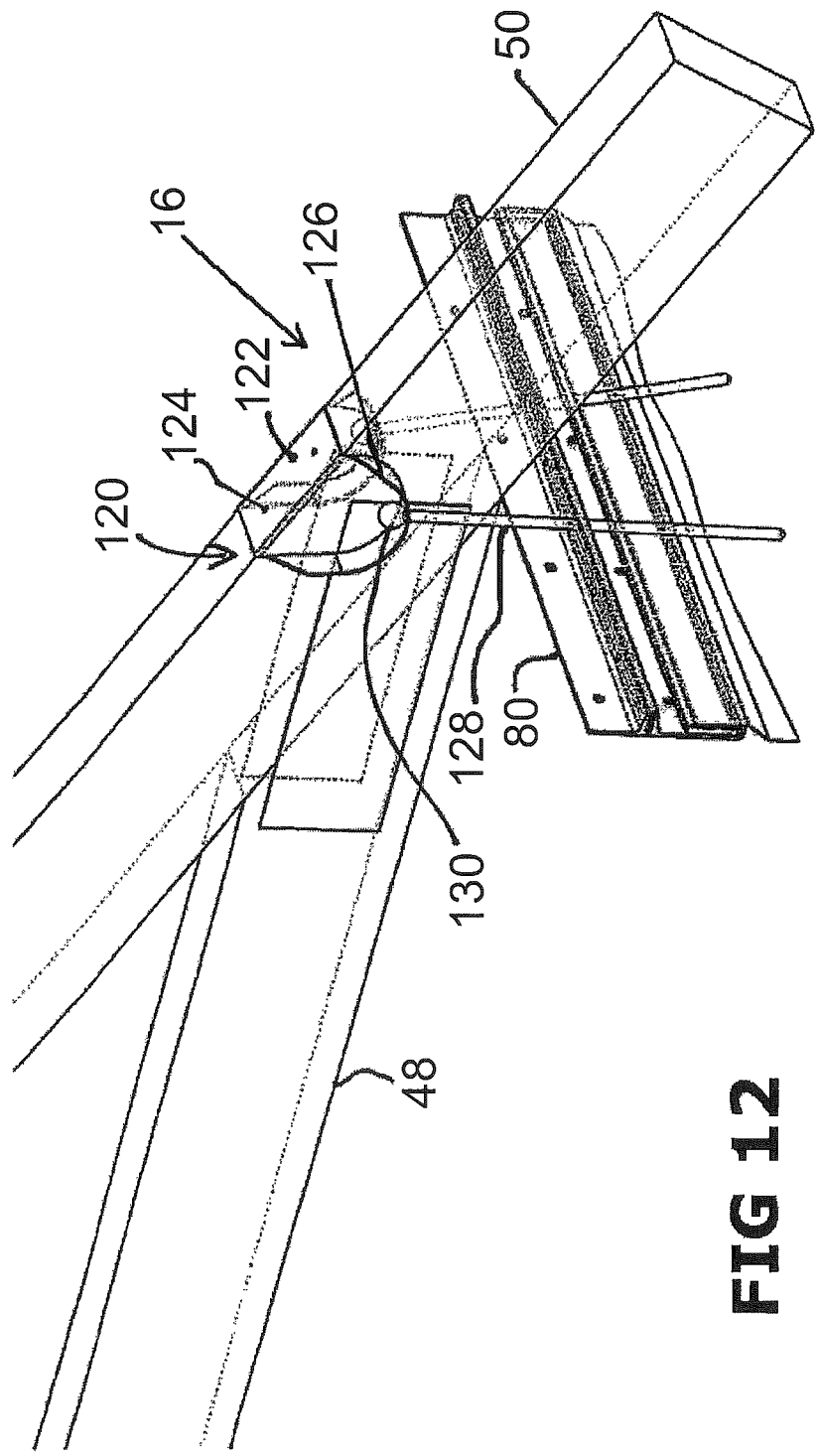
FIG. 12 is a schematic view of an alternate form of a saddle connector.

As can be seen in FIGS. 10-12, the roof tie-downs can comprise a saddle connector that is placed over the top edge of a roof rafter and one or more tie rods to secure the saddle connector to the flange or boss of the roof structure connector plate comprising the top rail.

Figure 8:
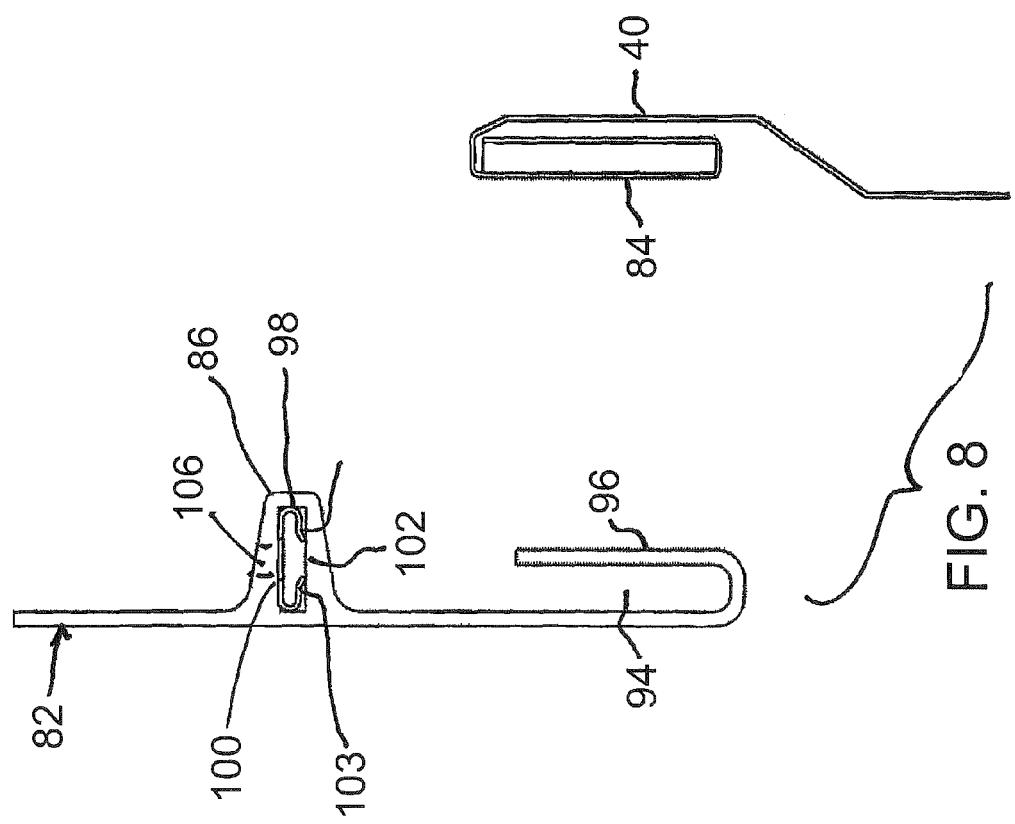
FIG. 8 is the upper rail in an exploded cross-section view.
Figure 9:
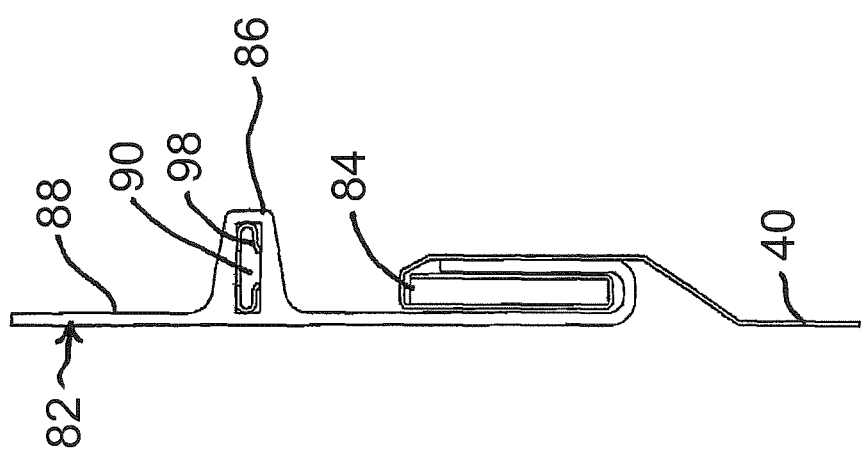
FIG. 9 is a schematic cross-sectional view of the assembled top rail.

As can be seen in FIG. 8, the clip 98 has an elongated slot 102 defined by the edges 103 of the clip 98. Edges 103 are curved (downwardly as shown in FIG. 8) to provide a one-way directionality, so that when the tension rods 104 are inserted into the slot 102, they cannot be pulled out. In an alternate embodiment, the tension rods 104 have an integrated ratcheting teeth or gear rack, such as used in a zip tie, or barbs that have a positive gripping action against the downwardly curving edges 103 of the clip 98. In that case the slot 102 would be provided with a ratchet configuration that allows the tension rods 104 to be pulled or pushed through in one direction only.

The flange or boss 86 is also provided with access holes 106 that have the same spacing as the clip openings 100. When the elongated clip 98 is inserted into the slot 90 of the flange 86, and the clip openings 100 are lined up with the access holes 106, the tension rods 104 can be inserted through the access holes 106 and captured or retained by the slot 102.

As shown in FIGS. 10-11, the tension rods 104 are useful to connect the top rail 80, and hence the reinforcement fabric 40, to the roof structure 16. The tension rods 104 can be connected to a saddle connector 110. Alternatively, the tension rods 104 can be integral with the saddle connector 110. The saddle connector 110 can include an anchor face 114 configured to rest on a rafter 50. The anchor face 114 optionally can be provided with an attachment hole, such as nail hole 112, to facilitate the placement of a nail, not shown, to secure the saddle connector to the rafter 50. Any suitable fastener can be used. The saddle connector 110 can also include side webs 116 that taper down into the tension rods 104 as shown in FIG. 11. The saddle connector 110 and all of its components are made of high tensile strength materials as described above. It can be seen that when the saddle connector 110 is placed on the top of the rafter 50, the tension rods 104 can be inserted into the clip openings 100 of the elongated clip 98 to secure a roof rafter 50 to the connector housing 82 of the top rail 80. In this manner, the top rail 80 and hence the reinforcement fabric 40 are operatively connected to the rafter 50. It is to be understood that the saddle connector 110 can just as easily be connected to the joist 48 rather than to the rafter 50. Also, other types of connectors, not shown, can be used. In a broader sense, it can be seen that the saddle connector 110 is an example of a reinforcement link that connects the connector housing 82, and hence the reinforcement fabric 40, to the roof structure 16.

It can be seen that by providing an anchoring connection using the lower rail 54 connected to the foundation 18, and the top rail 80 connected to the roof structure 16, the roof structure 16 is connected to the foundation in a manner that will substantially increase the strength of the connection between the roof structure 16 and the reminder of the building. This will increase the resistance to the forces that would separate the roof structure 16 from the remainder of the building during natural disasters, which is defined as earthquakes, blast events, high winds from hurricanes and tornadoes, and the like.

As shown in FIG. 12, an alternative embodiment of a roof member tie-down in the form of a saddle connector is shown at 120. The roof member tie-down includes a saddle connector 120 having an anchor face 122 configured to rest on the rafter 50. The anchor face 122 optionally can be provided with attachment holes 124 to enable the saddle connector 120 to be secured to the rafter 50. The saddle connector 120 includes side webs and straps 126 on each side, forming a body portion that joins the attachment portion to the securing portion. The straps 126 have holes that can accommodate tension rods having rounded or spherical heads to allow the roof member tie-down to accommodate a range of roof angles. The side webs 126 can be in the form of metal clips. An alternate embodiment of the tension rods 128 include swivel pins 130 at their upper ends. The swivel pins 130 are passed through openings in the straps 126 to provide a connection to the webs 126. The tension rods 128 are thus connected to the straps 126, and hence to the saddle connector and the rafter 50 to transfer any upward force to the upper rail, and through the connecting members and reinforcement fabric to the lower rail and foundation. The saddle connector, webbing straps, and tension rods therefore function as a means for securing a roof member to a connector housing and thereby to a building structure.

Figure 13:
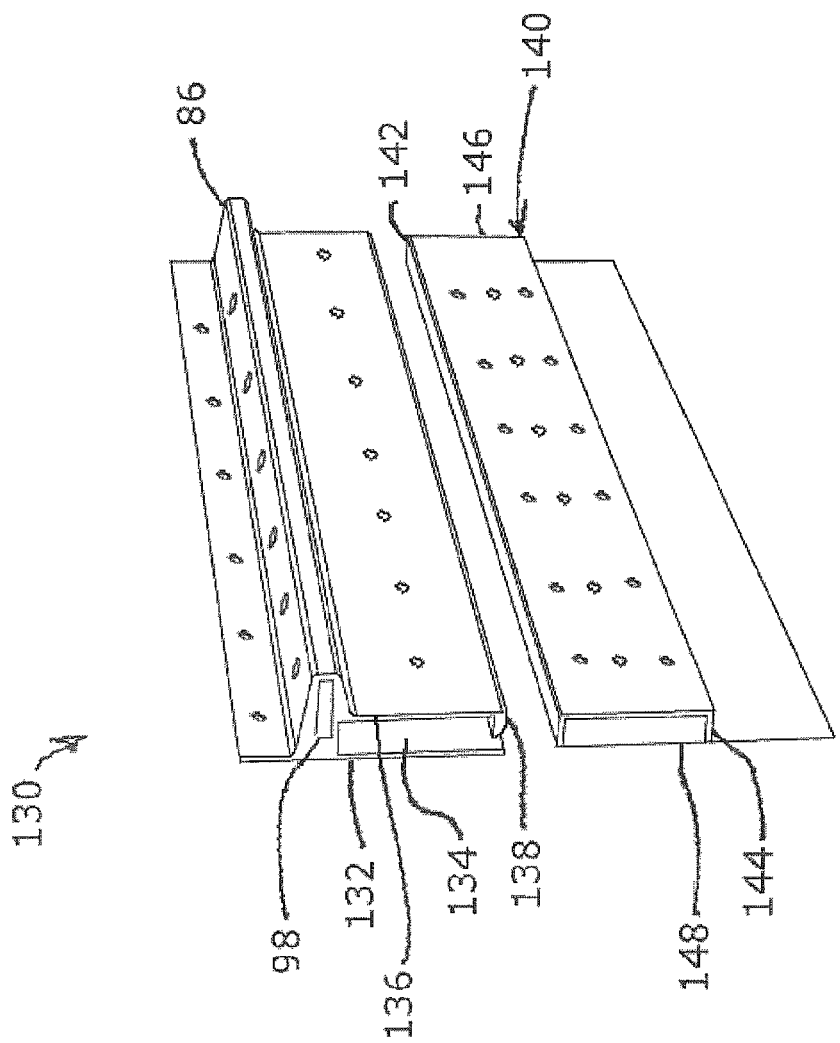
FIG. 13 is a schematic view in perspective of an alternative embodiment of the top rail.
Figure 14:
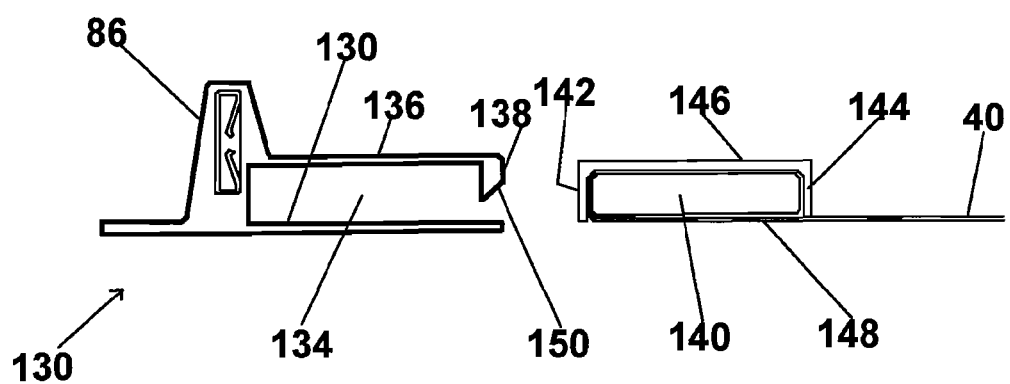
FIG. 14 is a schematic view in elevation of the top rail of FIG. 13.
Figure 15:
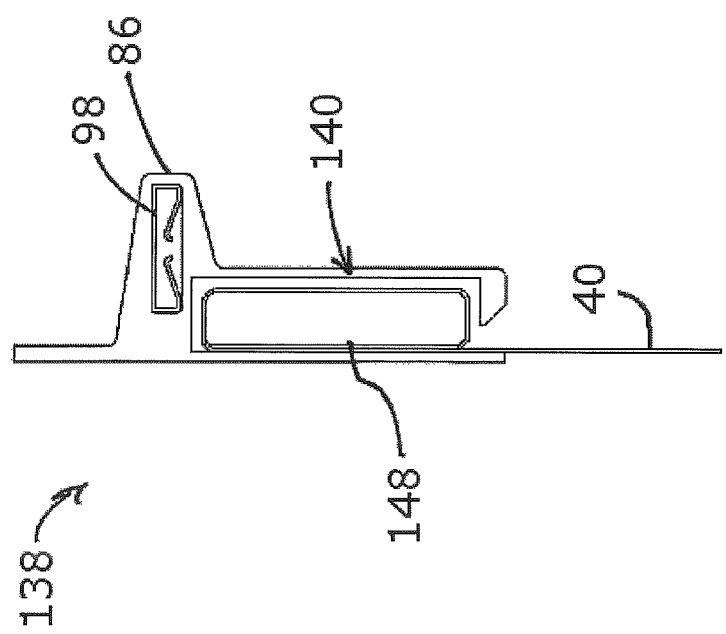
FIG. 15 is a schematic view of in elevation of the top rail of FIG. 13 in an assembled configuration.

In another preferred embodiment, an alternate top rail is configured as shown in FIGS. 13-15. The top rail 130 shown in FIG. 13 includes a flange 86 with a slot to receive the elongated clip 98, in a manner that is similar to what is shown in FIGS. 6-9. The lower portion of the top rail 130 includes a downwardly oriented slot 134, which is preferably rectangular, defined by a front face 132 and a vertical web 136. The vertical web 136 includes an inwardly projecting retainer clip 138. A separate batten housing 140 is comprised of top and bottom edges 142, 144, and a front face 146. A connecting member or batten 148 can be wrapped with the reinforcement fabric 40 to thereby affix the reinforcement fabric 40 to the batten 148. The wrapped batten 148 can be placed in the batten housing 140, and the batten housing 140 enclosing the wrapped batten can be inserted into the downwardly oriented slot 134 by springing the vertical web 136 to temporarily pull the retainer flange 138 away from the front face 132. The bottom edge of the inwardly projecting retainer flange 138 can have a chamfered or beveled edge 150 shown in FIG. 14, to more easily enable the housing 140 to be snapped into place. An advantage of this embodiment is that the reinforcement fabric 40 remains in one plane, flush along the front face 132 of the top rail 130, and the wall member, as shown in FIG. 15, thereby avoiding stress points for the fabric.

Figure 16:
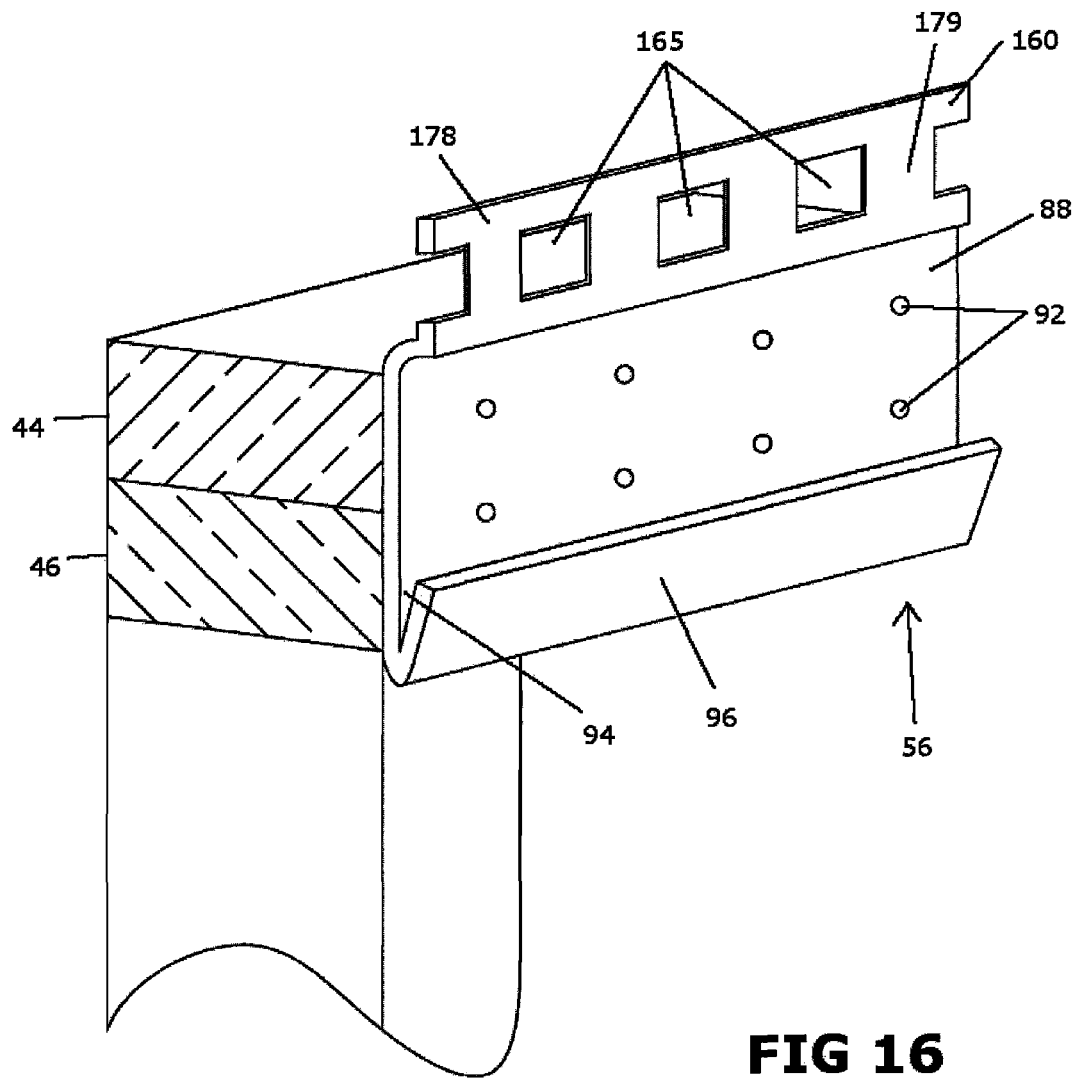
FIG. 16 is a view of an alternate top rail.
Figures 16A, 16B:
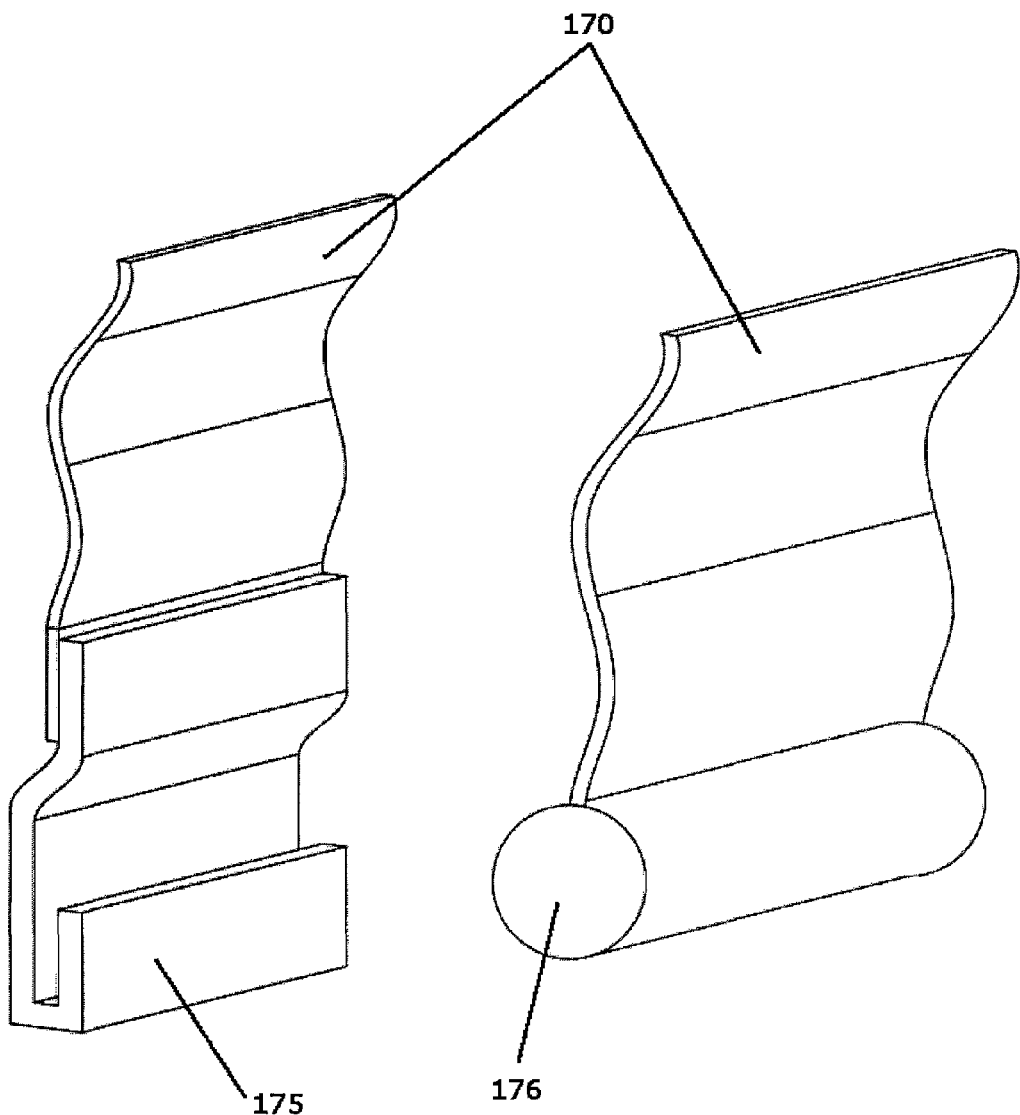
FIG. 16A is a view of a rafter strap with a hook to be used with the structure of FIG. 16.
FIG. 16B is a view of a rafter strap with a toggle used with the structure of FIG. 16.

An alternate embodiment of a top rail is shown in FIGS. 16 and 16A, comprising an upper flange 160 extending from and parallel to the attachment plate portion 88. The upper flange 160 has one or more openings 165 configured and dimensioned to allow rafter strap(s) 170, with or without an end clip 175 attached, to pass through and be secured to the material 178, 179 surrounding the opening 165. Each opening in the upper flange 160 therefore has top 178 and side 179 bars to which a rafter strap 170 can be secured. The upper flange 160 of the connector housing 56 has openings 165 that are preferable evenly spaced along its length to further allow a web of material to be looped around the rafters 50 or roof joists 48 forming the roof of a building and fastened to the connector housing 56. The rafter strap 170 may be passed through an opening and tied to the surrounding material or fastened using a clip, stay, or hook 175 suitably attached to one or both ends of the strap webbing.

The tie-down strap 170 comprises a web of flexible material that can be passed through an opening in the upper flange and tied to the side 179 or top 178 bars of the flange opening.

An alternate stay in the form of a toggle 176 is illustrated in FIG. 16A. The toggle 176 is larger than the opening to prevent the rafter strap from pulling free from the upper flange 160 when under tension. The toggle may thereby distribute the tension more evenly to the top and side bars of the upper flange than a hook or clip because it engages multiple points at the same time. With one end of the rafter strap web secured in an upper flange opening, the strap can be looped over a roof member and secured to the same or different opening. The roof strap may also have suitable additional components, as would be known in the art, to allow further tensioning of the strap once both ends were secured to the upper flange by ties, clips, hooks, or stays.

Figure 17:
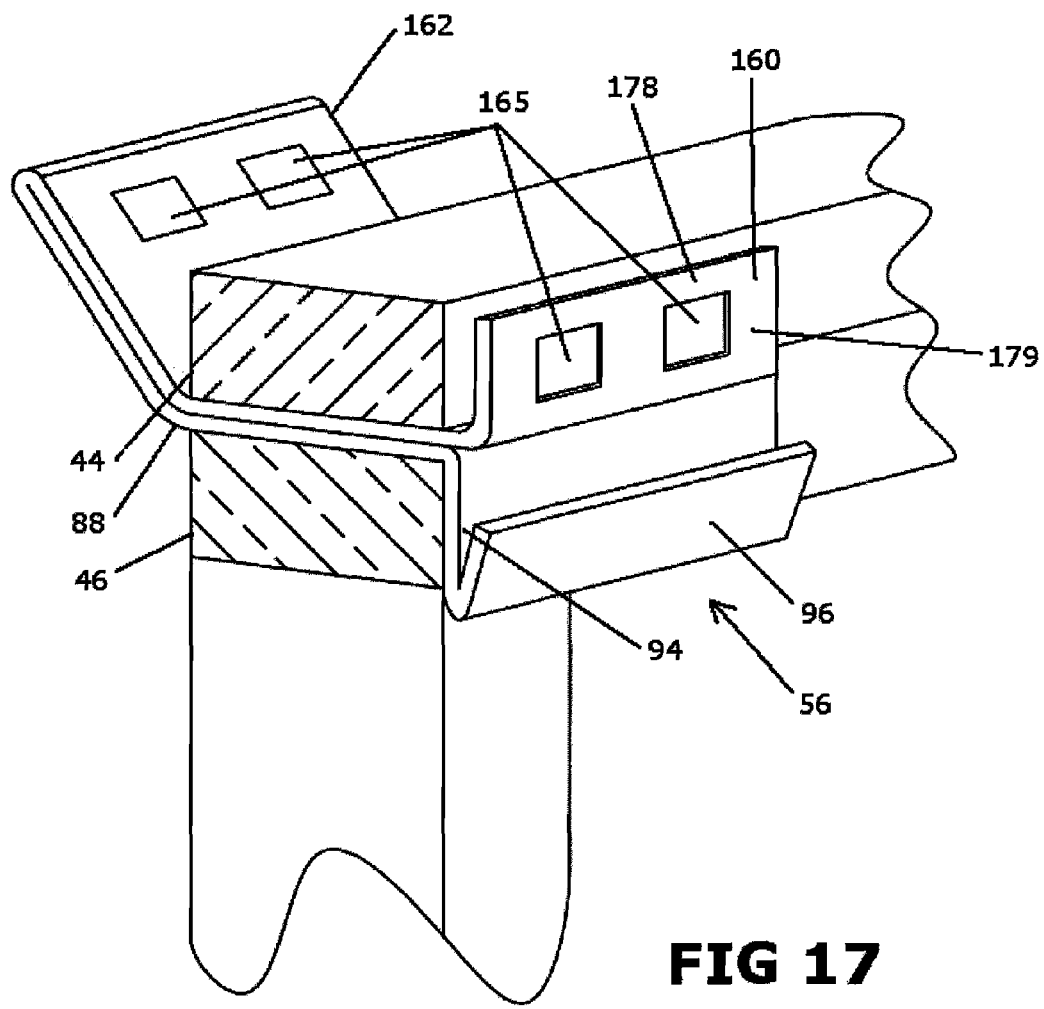
FIG. 17 is another view of a top rail and strap.

In the alternate embodiment shown in FIG. 17, the connector housing 56 can be folded over on itself to form the attachment plate 88, and secured between the two top plates 44, 46 during construction. Such a design can provide a back flange 162 with similar openings 165 to those shown in FIG. 16, so there are openings 165 to secure a rafter strap on both sides of the top plates, while still comprising a U-shaped slot that engages a wrapped connecting member. In another embodiment, shown in FIG. 29, the connector housing can have an upper portion forming a J-shaped flange, and the openings are placed in the face of the attachment plate. In this manner, the J-portion provides sufficient clearance between the wall member and the openings in the face of the attachment plate to allow the rafter straps 170, hooks, clips, etc. 175, to be inserted into the openings. Rafter straps comprising J-hooks can then be looped over a roof member 48, 50 and attached to the connector housing on either side of a roof member 48, 50 with the hooks 175 at each end of the strap 170 inserted into an opening 165.

Figure 18:
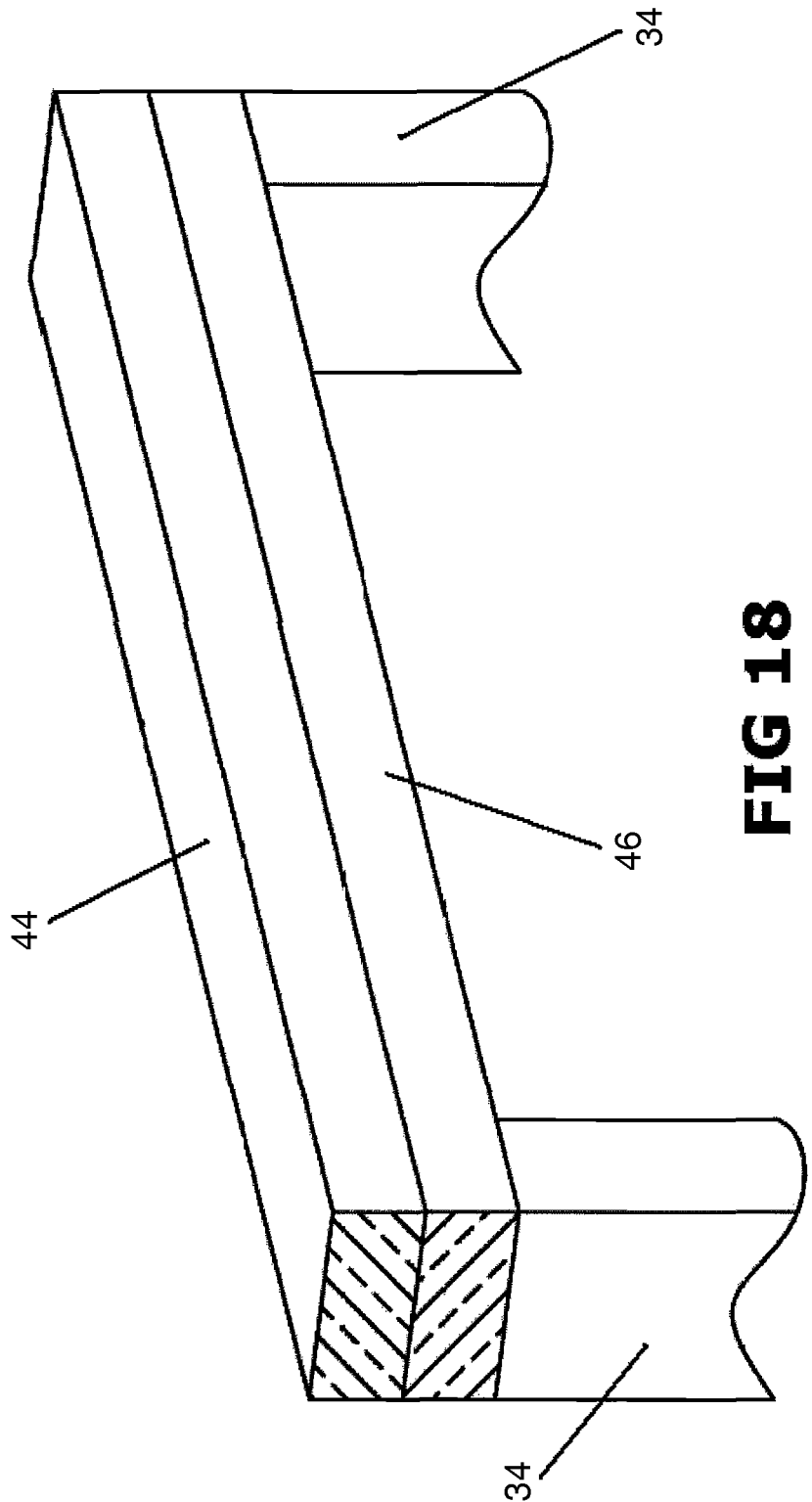
FIG. 18 is a view of a wall structure with two top plates.

FIG. 18 is a detailed view of the upper portion of a wall structure with two wall studs 34 and upper 44 and lower 46 top plates.

Figure 19:
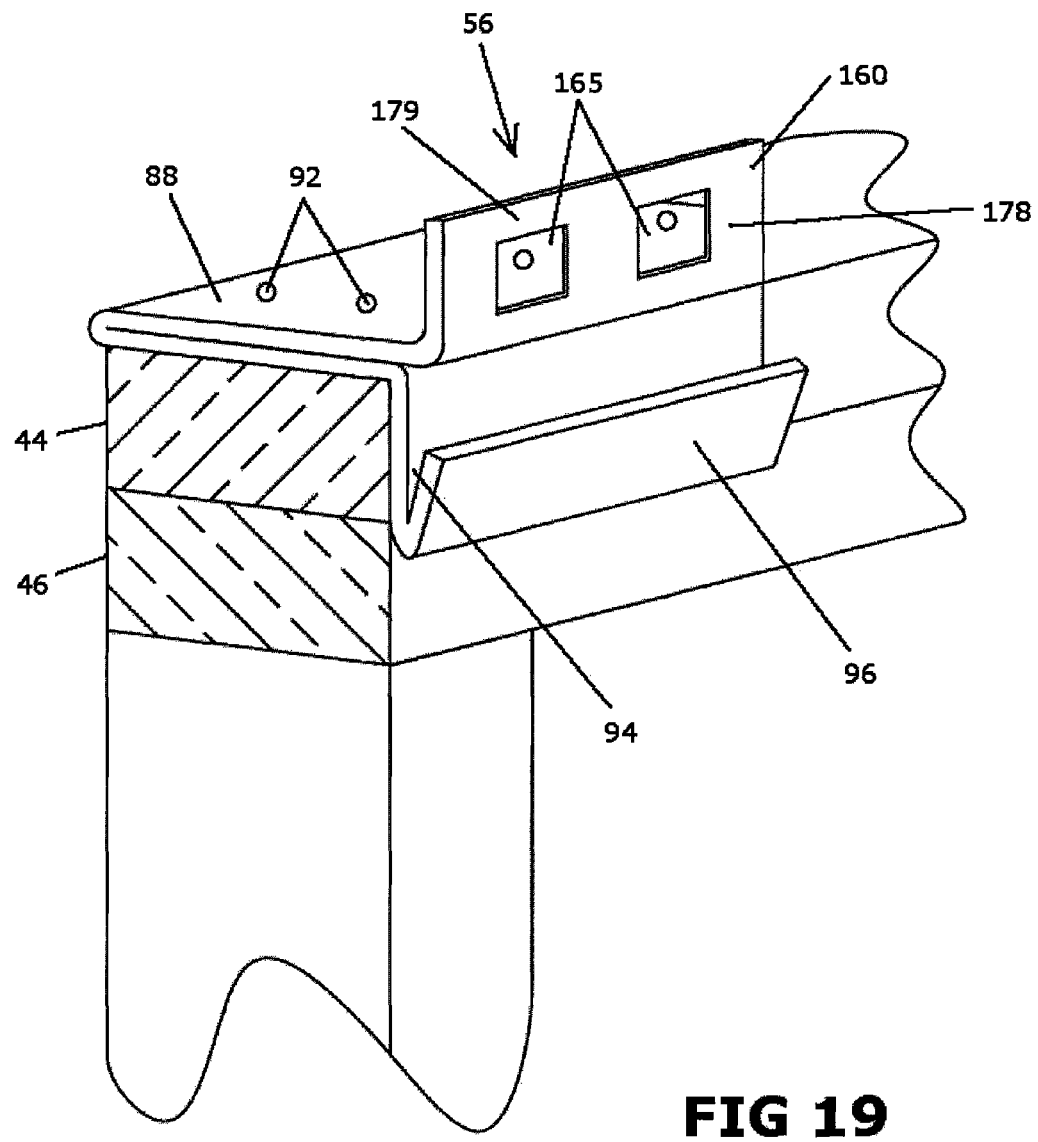
FIG. 19 is a view of a top rail on the top plates of FIG. 18.

In another alternate embodiment shown in FIG. 19, the connector housing 56 can be folded over on itself to form the attachment plate 88 having fastener openings 92, and secured to the upper top plate 46 of FIG. 18 using fasteners known to those of skill in the art. This embodiment also has an upper flange 160 with openings 165 similar to the features shown in FIG. 16 to allow rafter strap(s) 170, with or without an end clip 175 attached. The connector housing still comprises a slot 94 and front flange 96 for engaging a connecting member 84.

FIG. 19A is a view of a clip that can be used with the top rail of FIG. 19.

Figure 20:
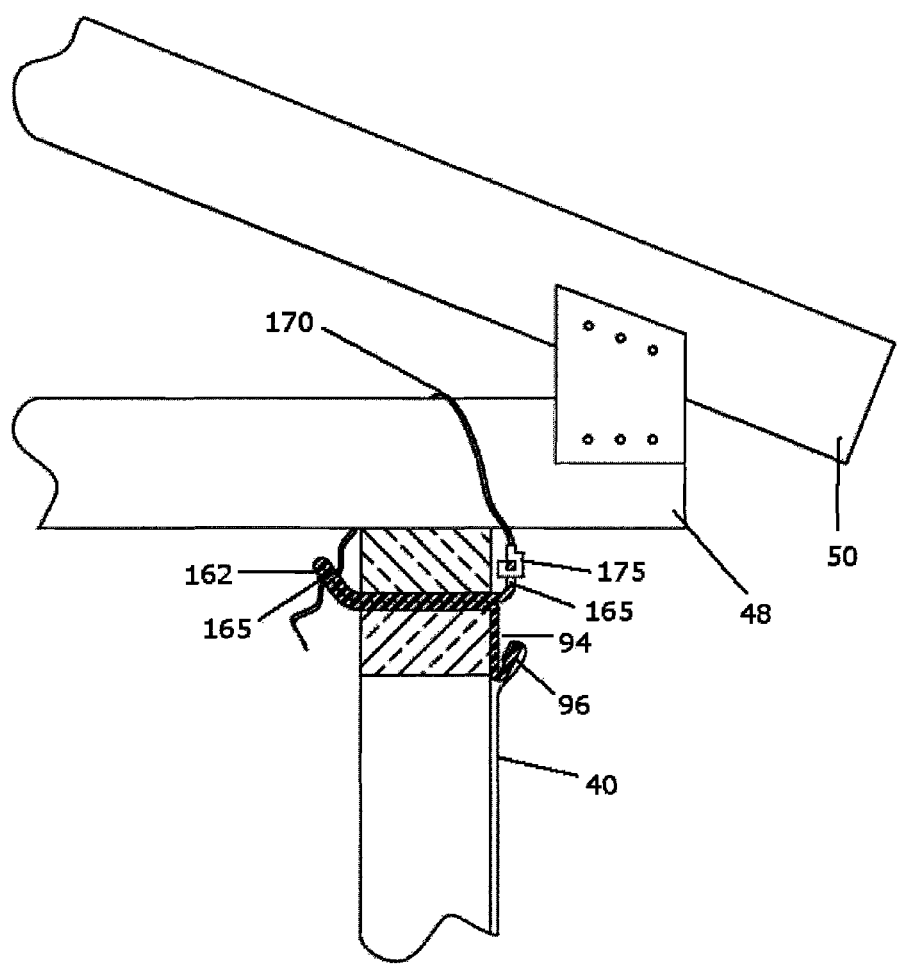
FIG. 20 is a view of yet another top rail and clips that can be used with it.

FIG. 20 illustrates one example of a connector housing, as shown in FIG. 17, installed between the upper 44 and lower 46 top plates of a wall member, and having a roof strap with a J-hook 175, attached to one end of the strap 170 that is engaged in an opening 165, looped over a roof member 50 and tied to an opening 165 in the back flange 162. The upper 160 and back 162 flanges with their respective openings function as a means for securing the roof member tie-down comprising the roof strap and J-hook.

Figure 21:
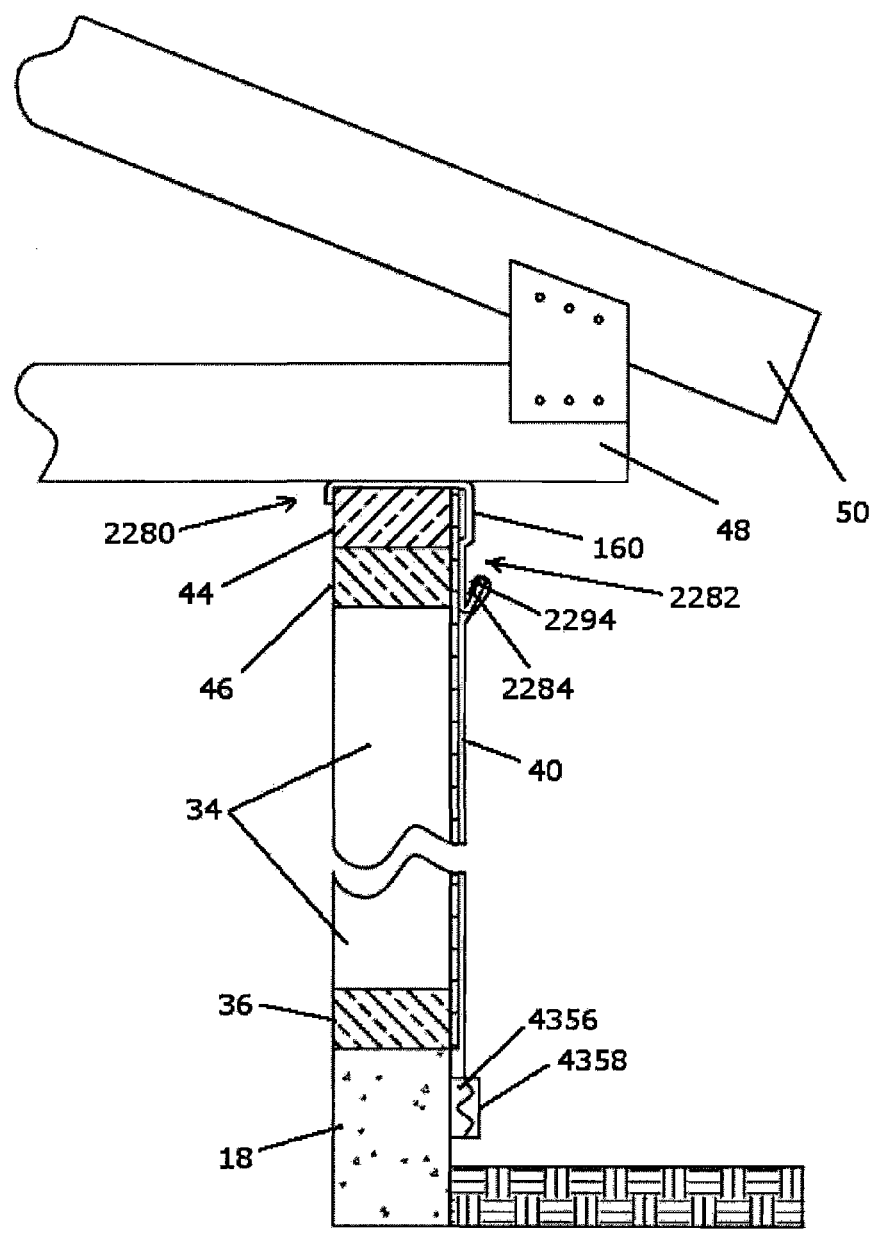
FIG. 21 is a view of a building wall system.
Figure 22:
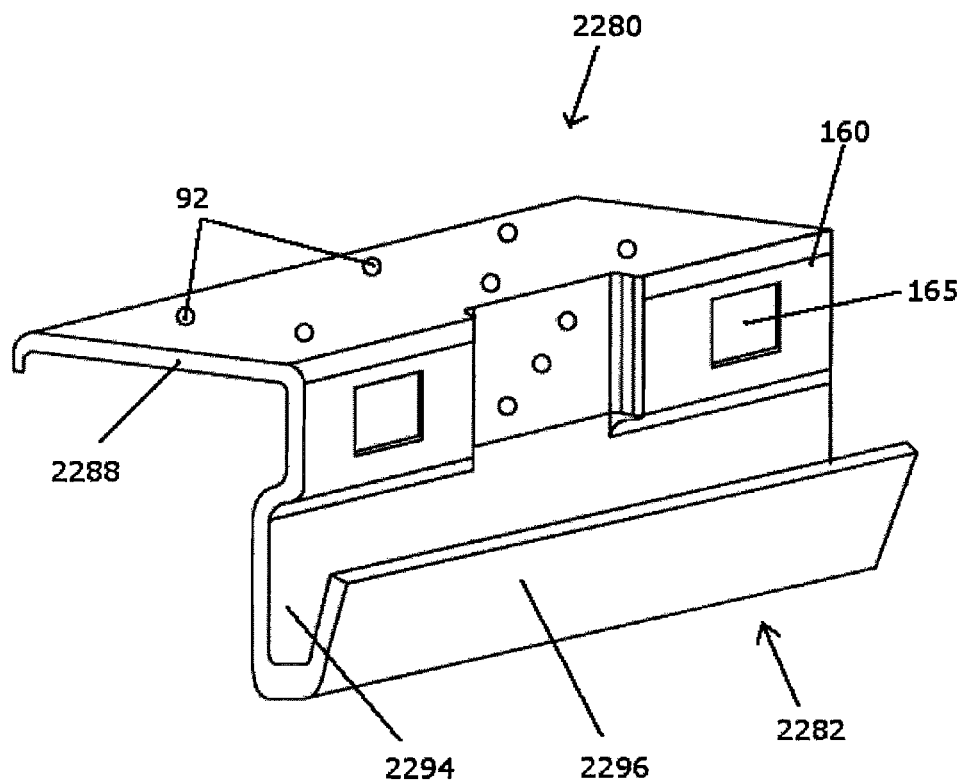
FIG. 22 is a view of different clip that can be used with a top rail.
Figure 43A:
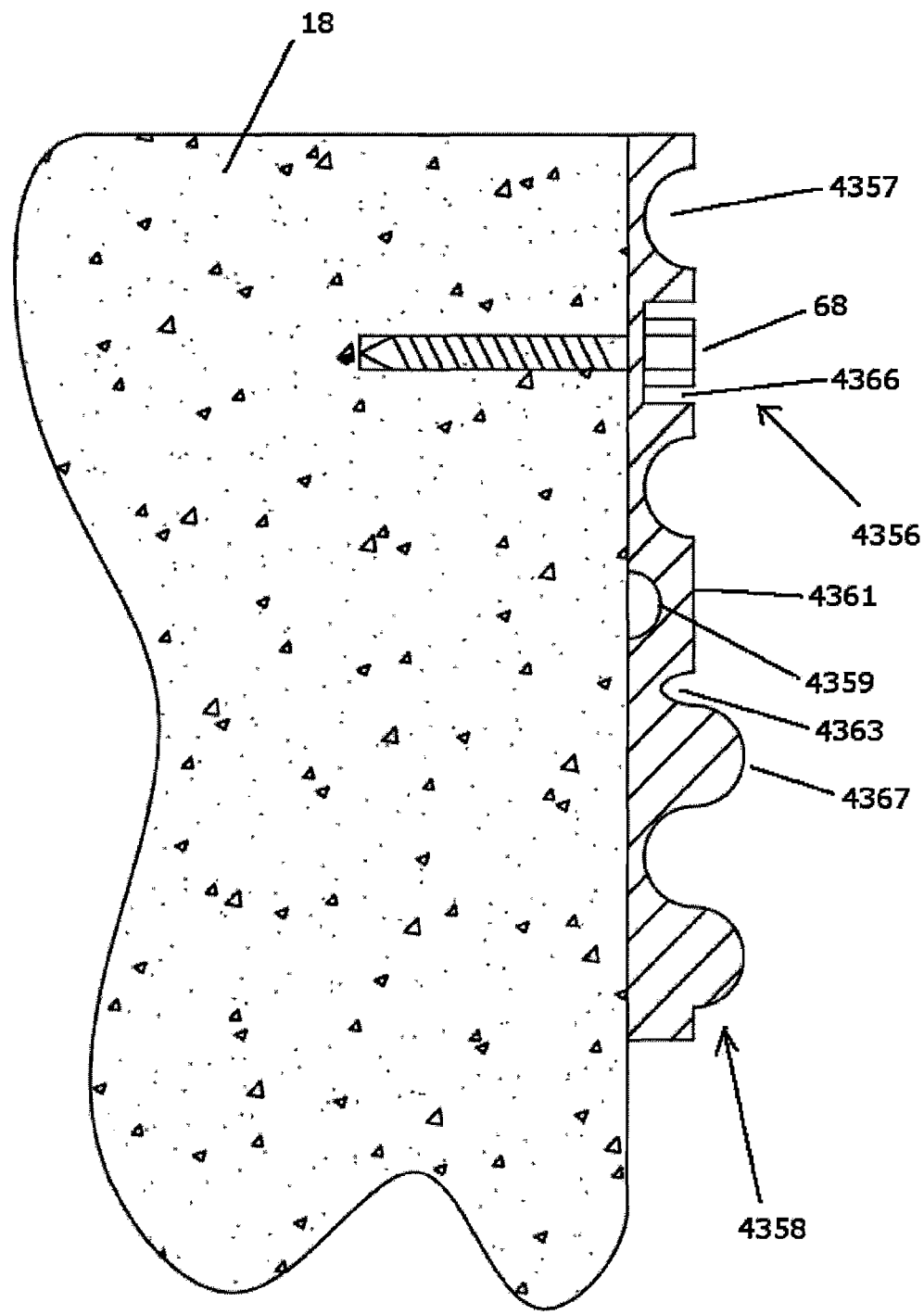
FIG. 43A is a view of a portion of a claim shell connector attached to the foundation.
Figure 43B:
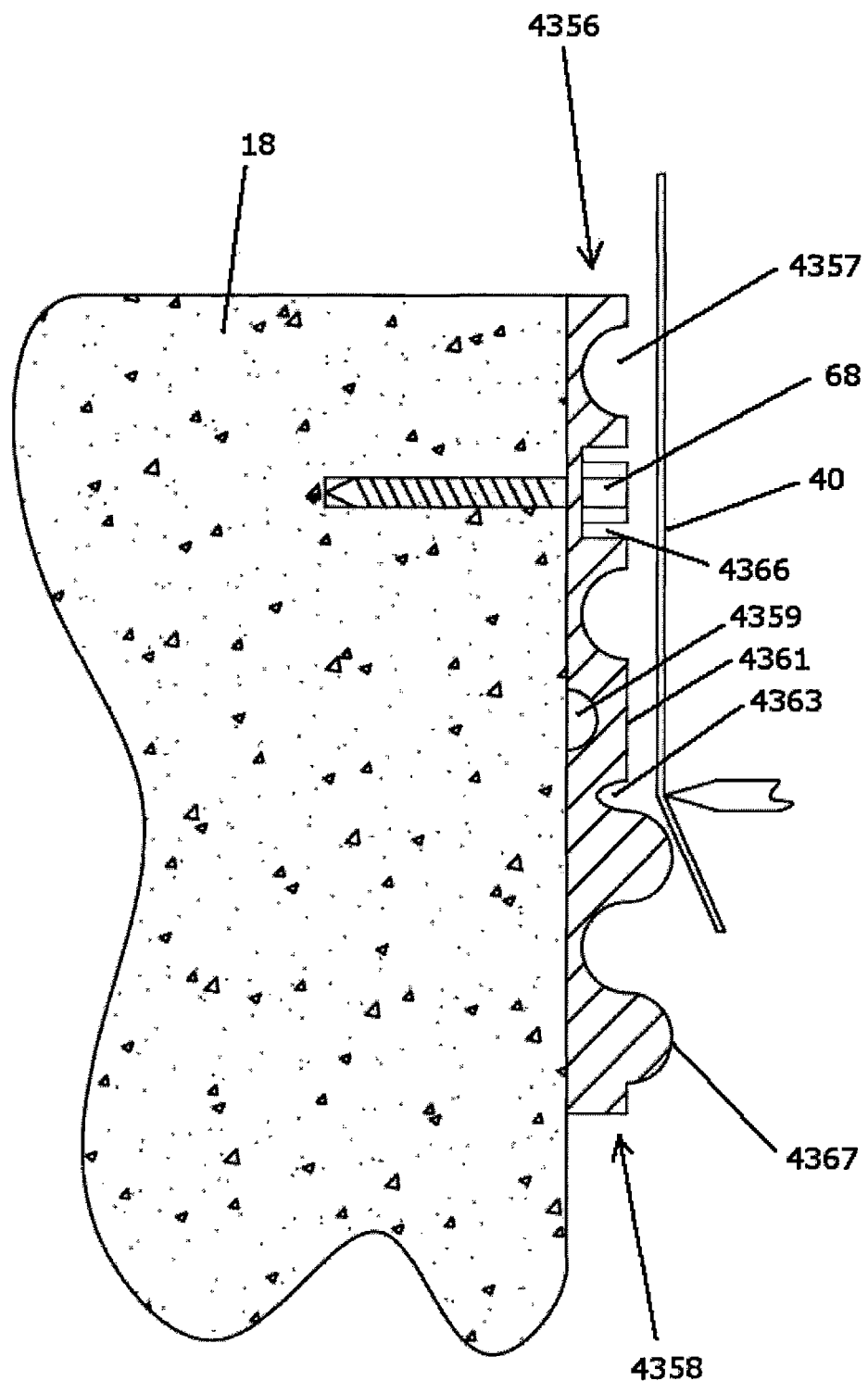
FIG. 43B is a view of the reinforcement fabric being applied to the clamshell connector of FIG. 43A.
Figure 43C:
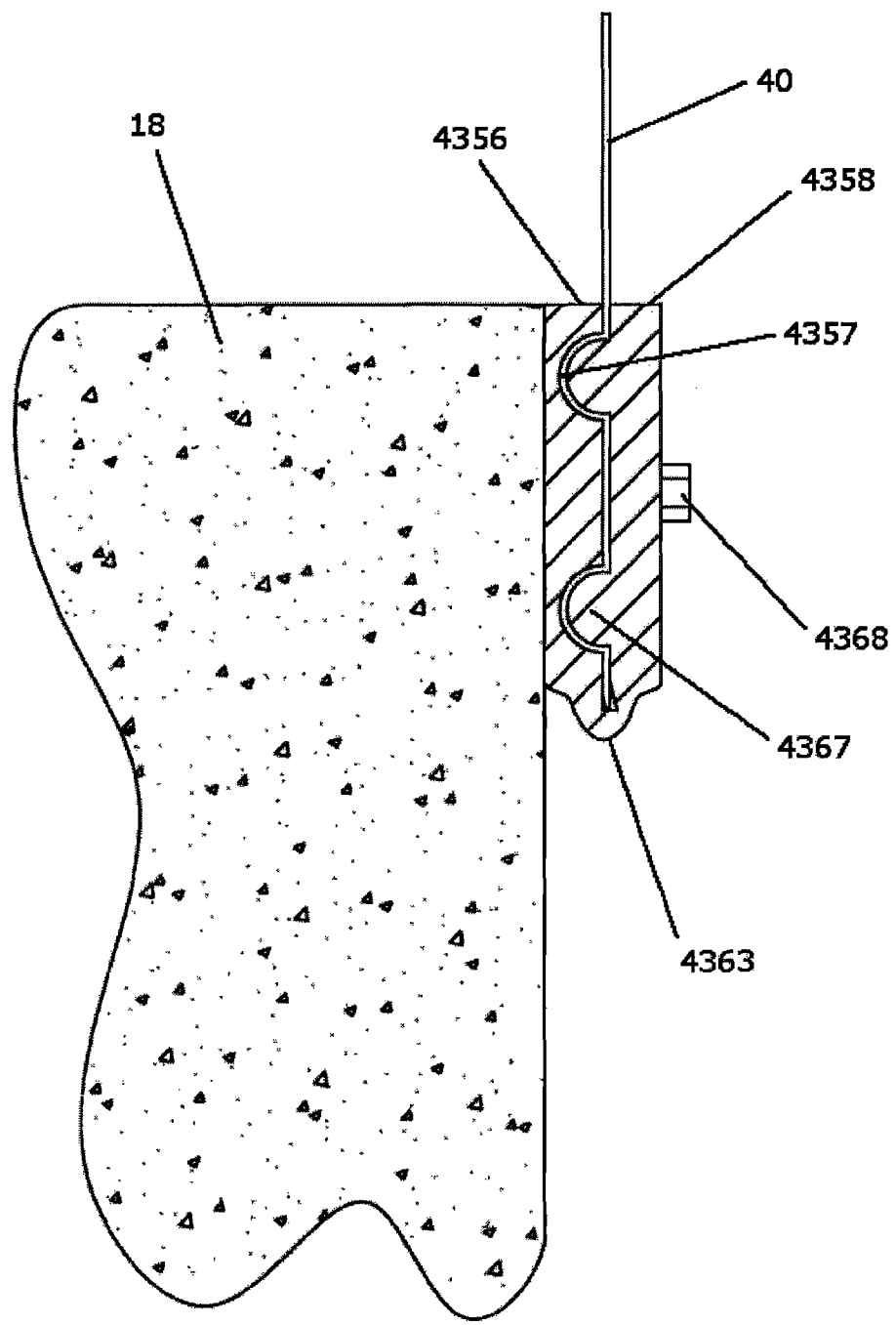
FIG. 43C is a view of the remaining portion of the clamshell being applied to the structure of FIG. 43B.

FIG. 21 illustrates an example of a structural reinforcement apparatus installed on a frame structure, in which the design of upper rail utilized is the embodiment of connector housing, connecting member and roof member tie-down depicted in FIG. 22 and the lower rail is the embodiment of clam shell style connector housing, and connecting member depicted in FIGS. 43A-C. FIG. 21 illustrates the ability to assemble a structural reinforcement apparatus comprising the various embodiments of upper and lower rails encompassed by the present invention. The frame structure having at least a roofing member and one or more wall members erected upon a foundation, the structure comprising an elongated flexible reinforcement material having a first and second end, a connecting member associated with the first end and a second connecting member associated with the second of the flexible reinforcement material. A first means for engaging the first connecting member is secured to the frame structure and a second means for engaging the second connecting member are secured to upper and lower portions of the frame structure. The means for engaging the connecting members are connector housings that have features configured and dimensioned to be operatively associated with the connecting members to provide tension to the elongated flexible reinforcement material.

In this example the means for engaging the connecting member along the upper portion of the building is top rail 2280 having a connector housing 2282 comprising slot 2294 for retaining a connecting member 2284, such as a wrapped batten. The means for engaging the other connecting member along the foundation of the building is a lower rail 4354 having a connector housing 4382 comprising a convoluted face for engaging the flexible reinforcement material 40 and connecting member 4384. The means for engaging one or more roof member tie-downs are the openings 165 in connector housing 2282 that can engage an attachment feature of the roof member tie-down, for example a J-hook connected to a roof strap.

FIG. 21A is a more detailed view of the lower rail of FIG. 21.

FIG. 22 illustrates another embodiment of a connector housing that can be installed to the upper wall members as part of a top rail. The connector housing 2282 comprises a lower portion having a front flange 2296 forming a slot 2294, and an upper flange having openings to engage a roof member tie-down. The attachment plate connects to the upper edge of the upper flange at approximately 90 degrees and may have a back lip. The attachment plate 2288 is configured and dimensioned to be installed on top of an upper top plate 44 and secured with fasteners known to those with skill in the art. The upper flange is parallel to the front face of the wall members, and configured and dimensioned to provide clearance between the openings in the flange and the top plates to allow insertion of a hook or clip into the openings. The slot is configured and dimensioned to receive a connecting member, such as wrapped batten.

Figure 23:
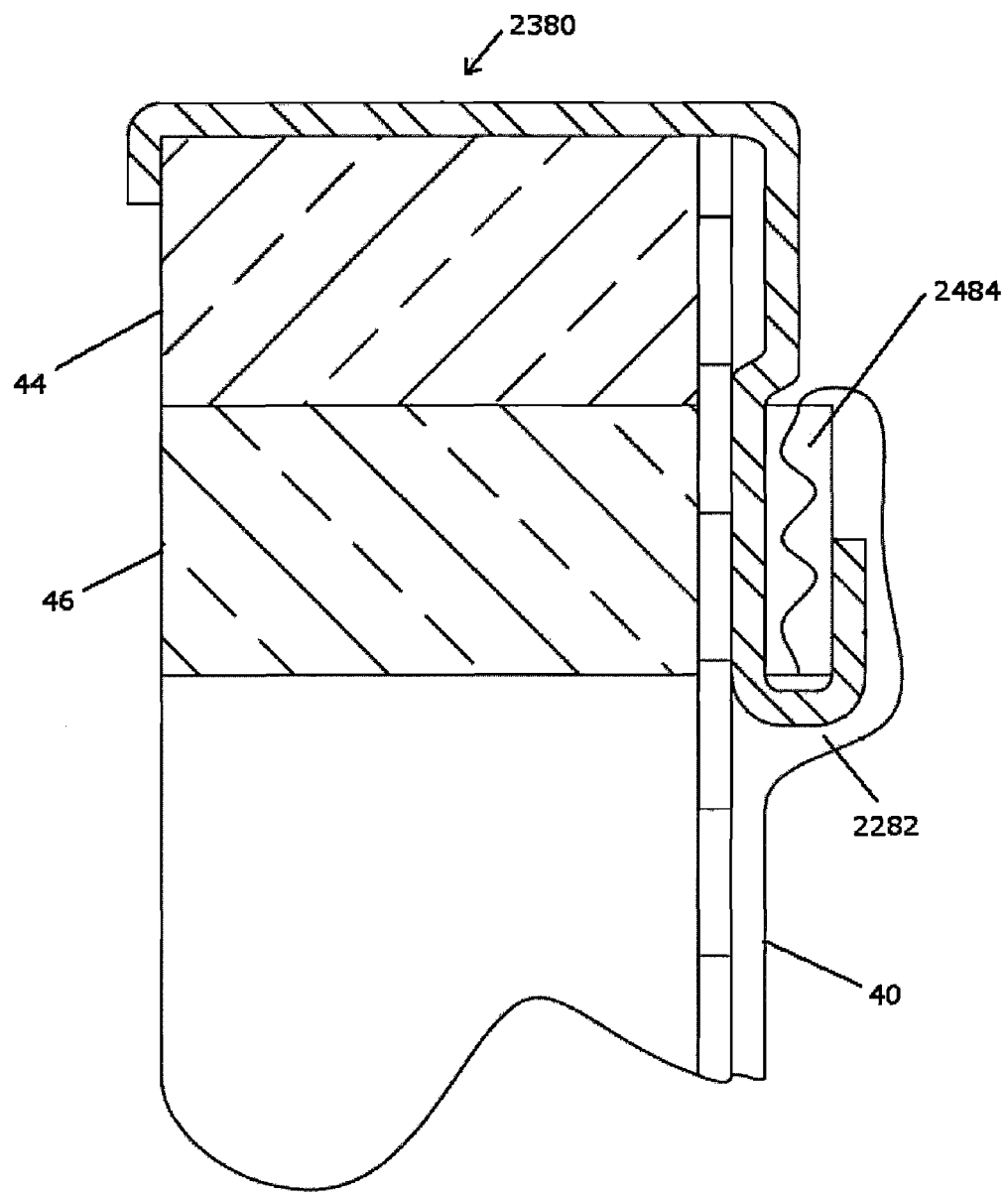
FIG. 23 is a view of different top rail configurations.
Figure 24:
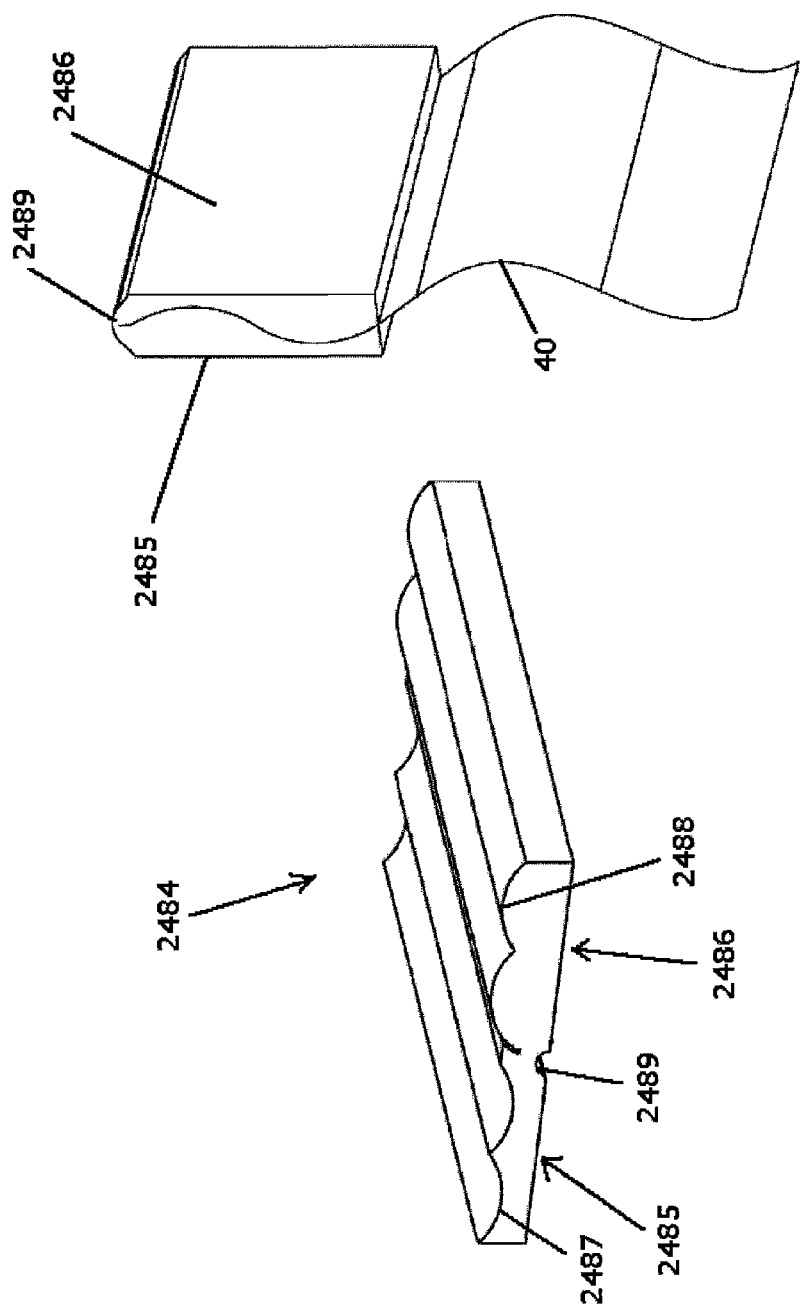
FIG. 24 is a view of a claim shell arrangement that can be used to secure the reinforcement fabric to the roof structure.

FIG. 23 shows a close-up view of a top rail 2380 comprising the connector housing 2282 depicted in FIG. 22, and a clam shell style connecting member 2484 as depicted in FIGS. 24 and 24A, installed on top of an upper top plate 44.

FIG. 24 is an illustration of another embodiment of a connecting member 2484 in the form of a claim shell arrangement that can be implemented with the various connector housing 56, 82 engaging means, such as the slots 60, 94. In this embodiment, the connecting member 2484 comprises two halves 2485 and 2486 that each have a convoluted face 2487 configured and dimensioned to mate with the convoluted face of the opposing half 2488. The convoluted faces 2487, 2488 are sufficient to restrain the flexible reinforcement fabric 40 between the two halves 2485, 2486 even under an operating load without slippage of the fabric once they are assembled. The two halves can be snapped together using molded tabs and catches or otherwise fastened together using fasteners known to those of skill in the art (not shown). In a variant of this embodiment, the clam shell halves may also comprise a hinge 2489 between the two halves. The clam shell style connecting member is configured and dimensioned to engage the connector housing in the same manner as any of the other connecting members describe herein.

FIG. 24A is a view of the claim shell connecting member 2484 arrangement of FIG. 24 in an assembled condition with reinforcement material 40.

Figure 25:
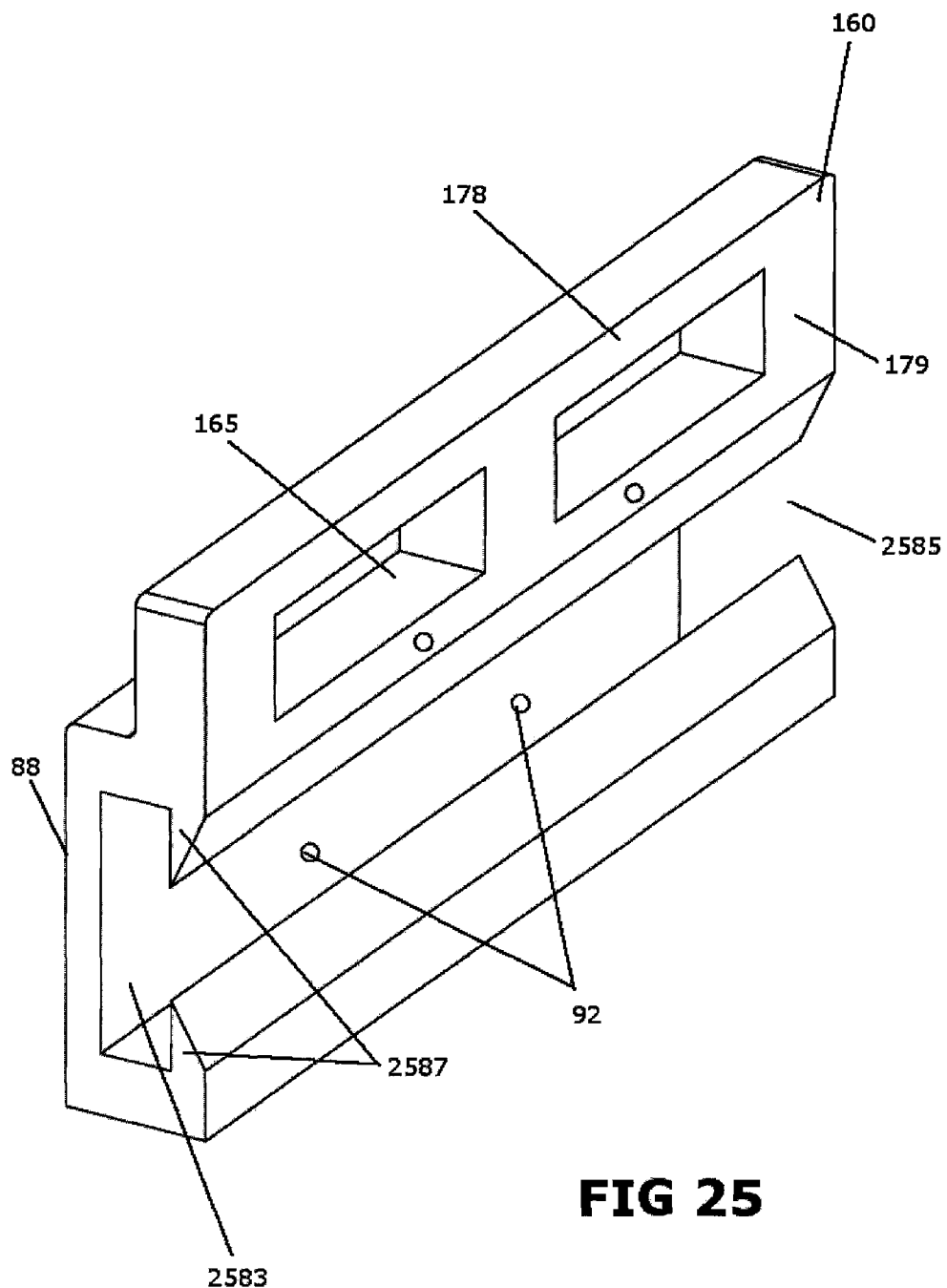
FIG. 25 is a view of the of top rail with a housing that can be inserted into the top rail.

Another embodiment of a connector housing 2582 having an alternate engaging means for a connecting member 2584 is illustrated in FIG. 25. This embodiment has a recessed slot 2583 and opening 2585 with opposing retaining clips 2587 for engaging a connecting member 2584. A connecting member 2584 can be snapped into position and retained in the slot 2583 by the opposing retaining clips 2587. This allows the flexible reinforcement material to extend essentially flush along the face of the connector housing rather than bending around a sharp corner. The embodiment further comprises an upper flange 160 for securing a roof member tie-down.

A roof member tie-down 200 connects a roof member 48, 50 to the connector housing 82 to form a continuous load path from the roof member to the connector housing and eventually to the foundation 18. A roof member tie-down comprises at least a roof member securing portion 210, and may further comprise a body portion 220 that is the intervening material and/or structure and an attachment portion 230 that allows the body portion to be secured to a connector housing 56, 82. The body portion 220 joins the attachment portion 230 to the roof member securing portion 210. The roof member tie-down 200, may also be a rope, cord, or flexible strap, with or without clips or hooks at the end(s) of the rope, cord, or flexible strap, wherein the length of material looped over a roof member is the securing portion 210. The roof member tie-down 200 functions as a means for securing a roof joist 48 or roof rafter 50 to a connector housing 56, 82.

Figure 26:
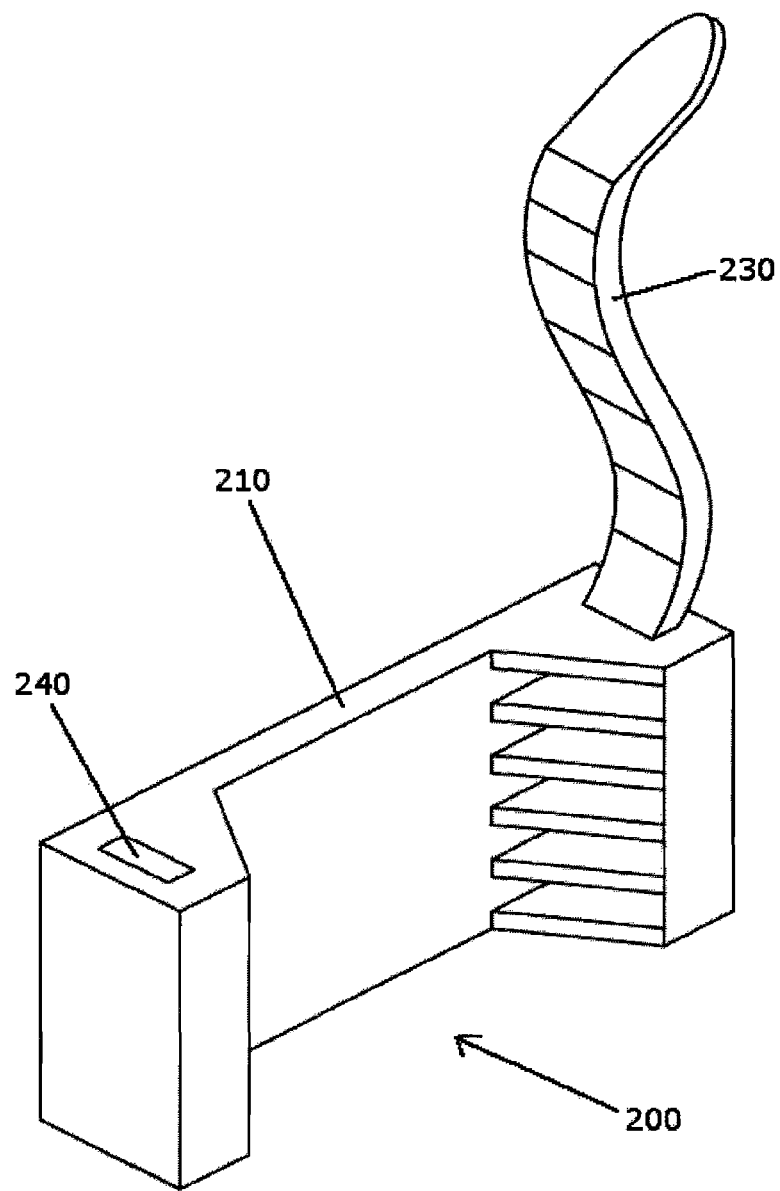
FIG. 26 is a view of a strap and connector that can be used to connect a top rail to the roof structure.

FIG. 26 illustrates another embodiment of a roof member tie-down 200 with a gear rack strap 230 and connector that can be used to connect a top rail to the roof structure. The roof member tie-down 200 comprises an attachment block 210, a T-slot coupling 220 extending from the back face of the attachment block 210, a gear rack strap 230 such as a zip tie extending from one edge of the attachment block 210, and a ratchet casing 240 located along and parallel to the edge opposite to the gear rack strap 230. The attachment block 210 is preferably rectangular, but may be other shapes. The T-slot coupling 220 is configured and dimensioned to fit securely into a T-Slot in a corresponding connector housing. A plurality of attachment block style tie-downs 200 can be separately attached to the same connector housing at different points along the T-slot. The attachment block tie-down 200 can be attached to the connector housing by sliding the T-coupling into the T-slot opening at the end of the connector housing. This arrangement allows each attachment block style tie-down to be separately positioned under individual roof members, and the gear rack strap to be looped over the roof member.

The T-slot coupling 220 is preferably rectangular, although it may be configured and dimensioned such that it is almost square. In one configuration, the mating T-slot is configured and dimensioned to match the larger dimensions of the coupling. This allows additional or replacement attachment block tie-downs 200 to be inserted into the front slot of the T-slot and rotated 90 degrees to become secured within the T-slot by the larger dimensioned portion of the coupling 220.

Figure 27:
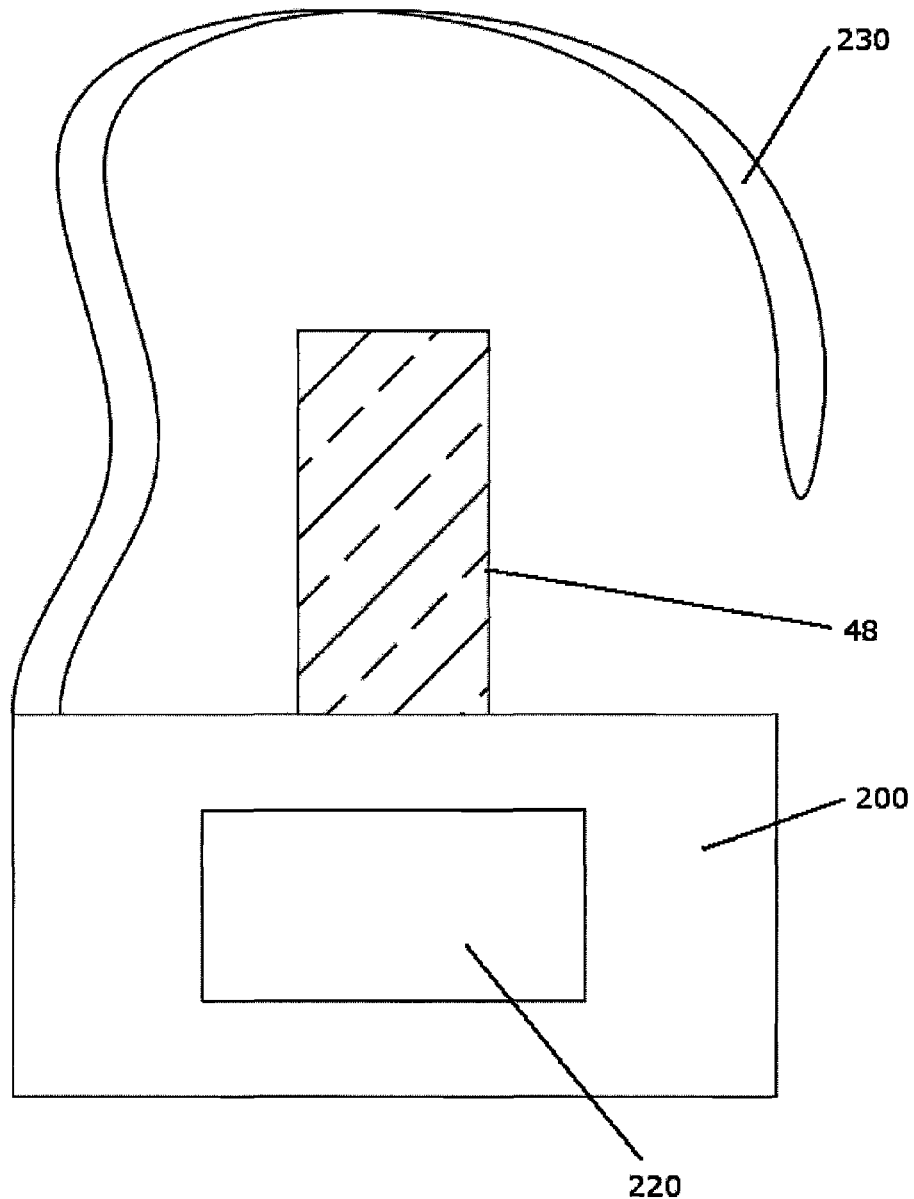
FIG. 27 is another view of the strap and connector of FIG. 26 showing a locking mechanism.
Figure 28:
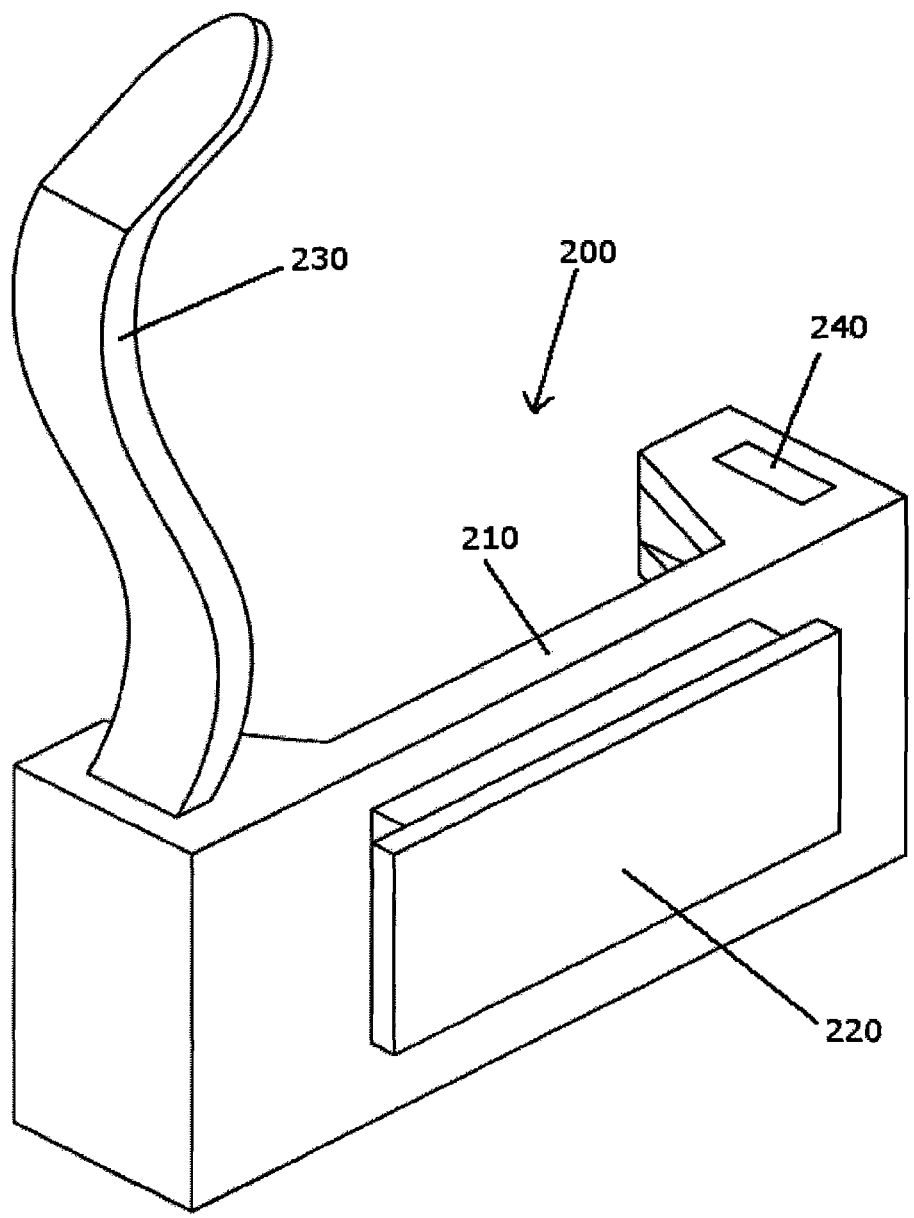
FIG. 28 is a view of the strap and connector of FIG. 27 shown in an assembled condition.

FIG. 27 is another view of the gear rack strap and attachment block style of roof member tie-down illustrated in FIG. 26. FIG. 27 shows a profile of the T-slot coupling 220 extending out from the back face of the attachment block 210 and configured to slide into a mating T-slot. An isometric view from the back of the attachment block style roof member tie-down, shown in FIG. 28, shows the T-slot coupling 220 extending out from the back face of the attachment block, and the gear rack strap 230 extending from the upper edge and flush with the side edge of the attachment block 210. The strap 230 is shown bent towards the ratchet case 240 to be received therein.

Figure 29:
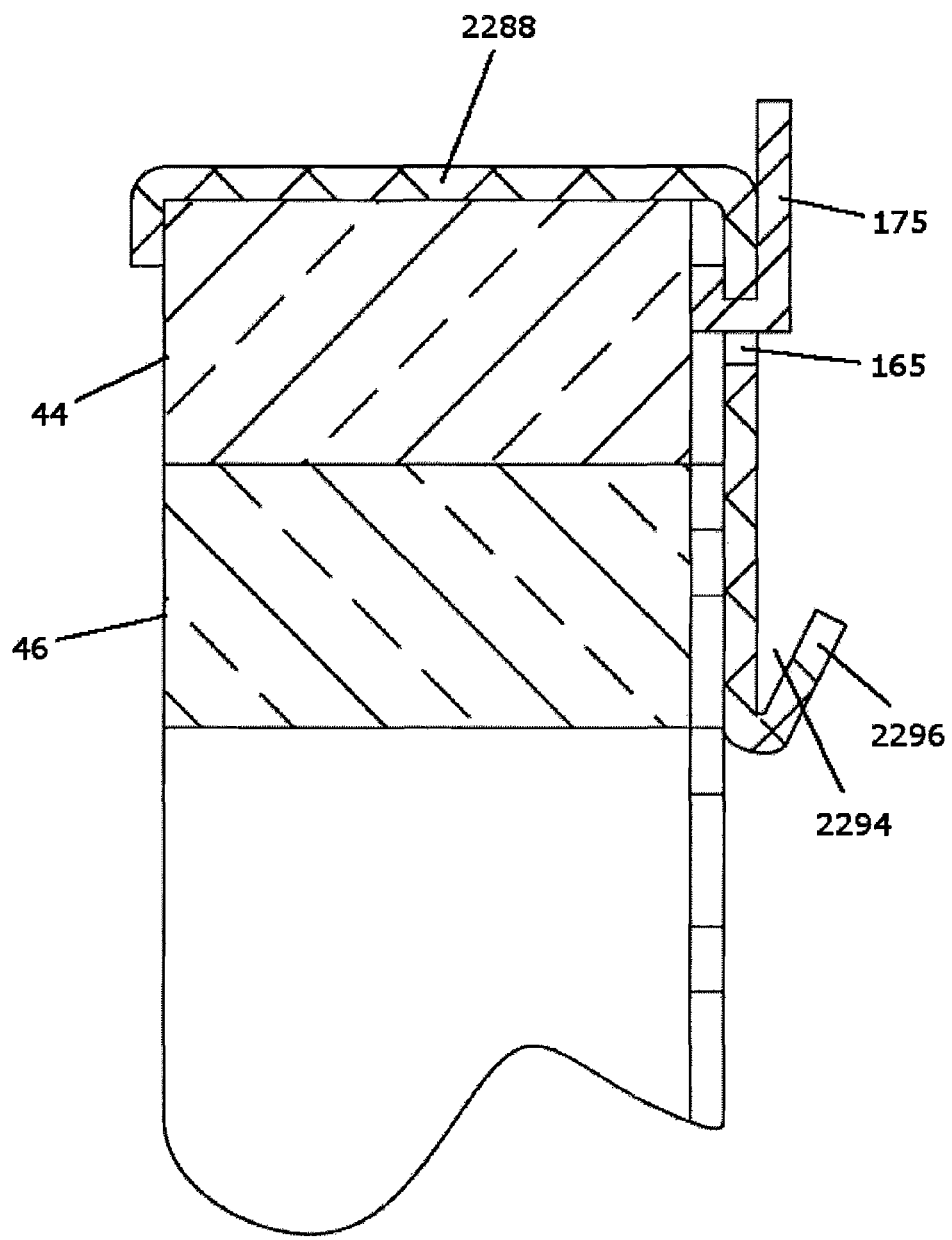
FIG. 29 is a view of another embodiment of a top rail.

FIG. 29 is a view of another embodiment of a top rail 2280 in which the upper portion of the connector housing is bent approximately 90 degrees in relation to the front face, such that the upper portion forms an attachment plate 2288 that can be fastened to the top of the upper top plate 44. The lower portion of the connector housing has a front flange 2296 forming a slot 2294 to engage a connecting member, and there are openings along the length of the connector housing below the bend that are configured and dimensioned to accept the J-hooks or clips 175 attached to the ends of a roof strap that can be looped over a roof member 48, 50.

Figure 30:
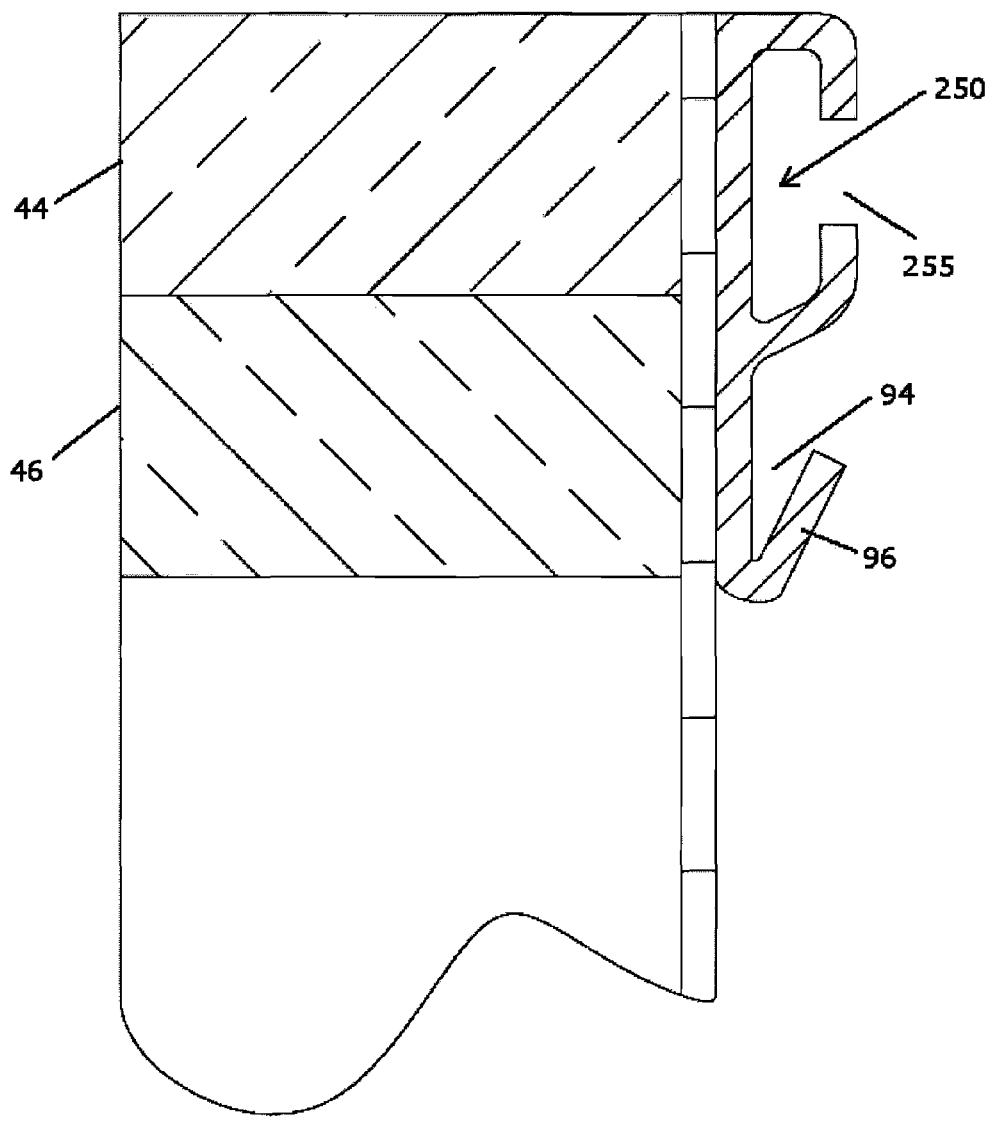
FIG. 30 is a view of another embodiment of a top rail.

FIG. 30 is a view of another embodiment of a top rail 3080 in which the upper portion of the connector housing is a box structure 250 located above the slot and providing sufficient clearance between the bottom face of the box and opening of the slot to allow engagement of a connecting member. The box structure has openings 255 that are configured and dimensioned to receive roof straps and/or clips, j-hook, etc.

Figure 31:
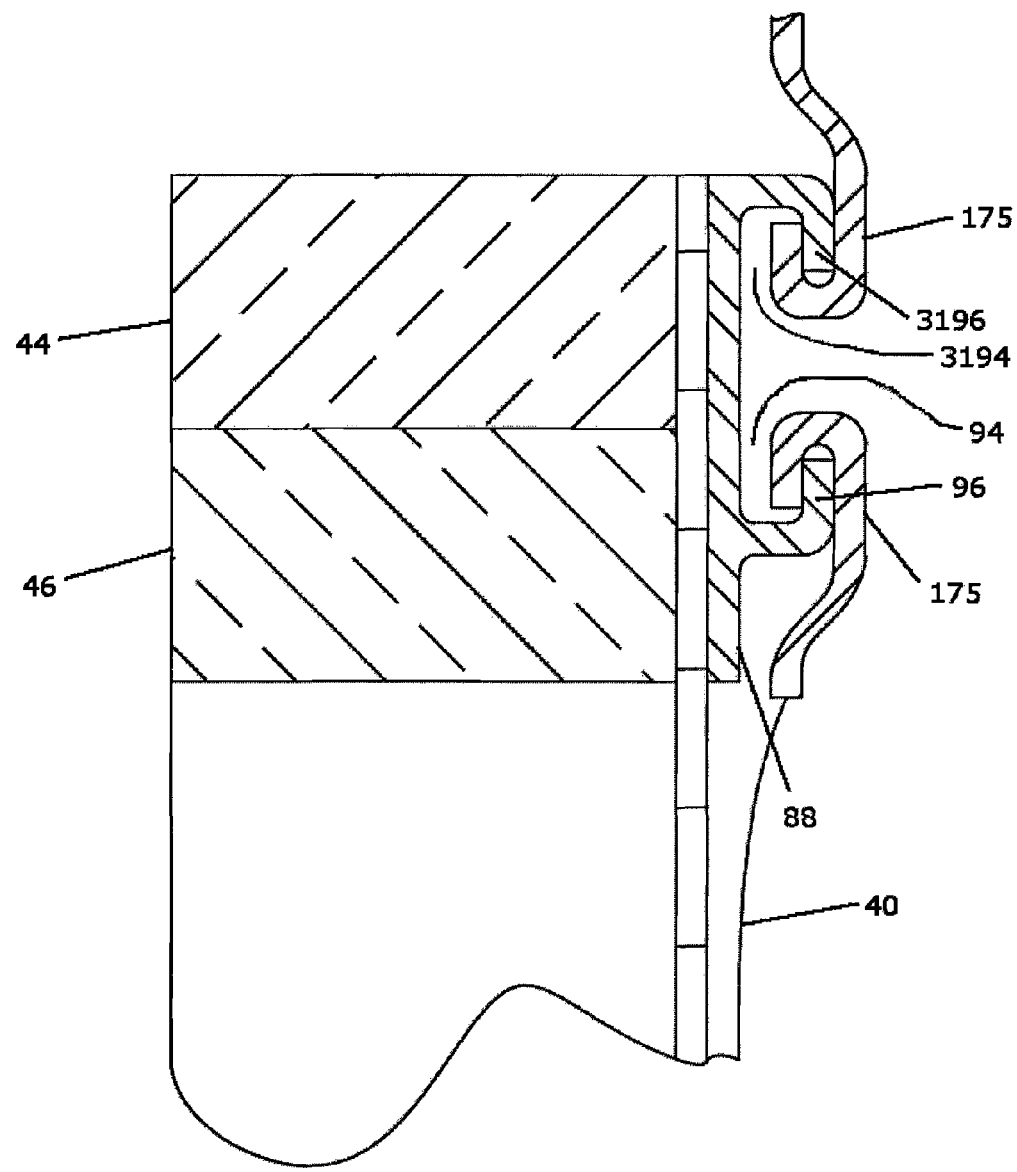
FIG. 31 is a view of another embodiment of a top rail.

FIG. 31 is a view of another embodiment of a top rail that comprises an upper 3194 and lower 94 slot, in which the upper slot 3194 formed buy flange 3196 can engage the J-hook 175 at the ends of a roof strap, and the lower slot 94 formed by front flange 96 can engage a connecting member 84.

Figure 32:
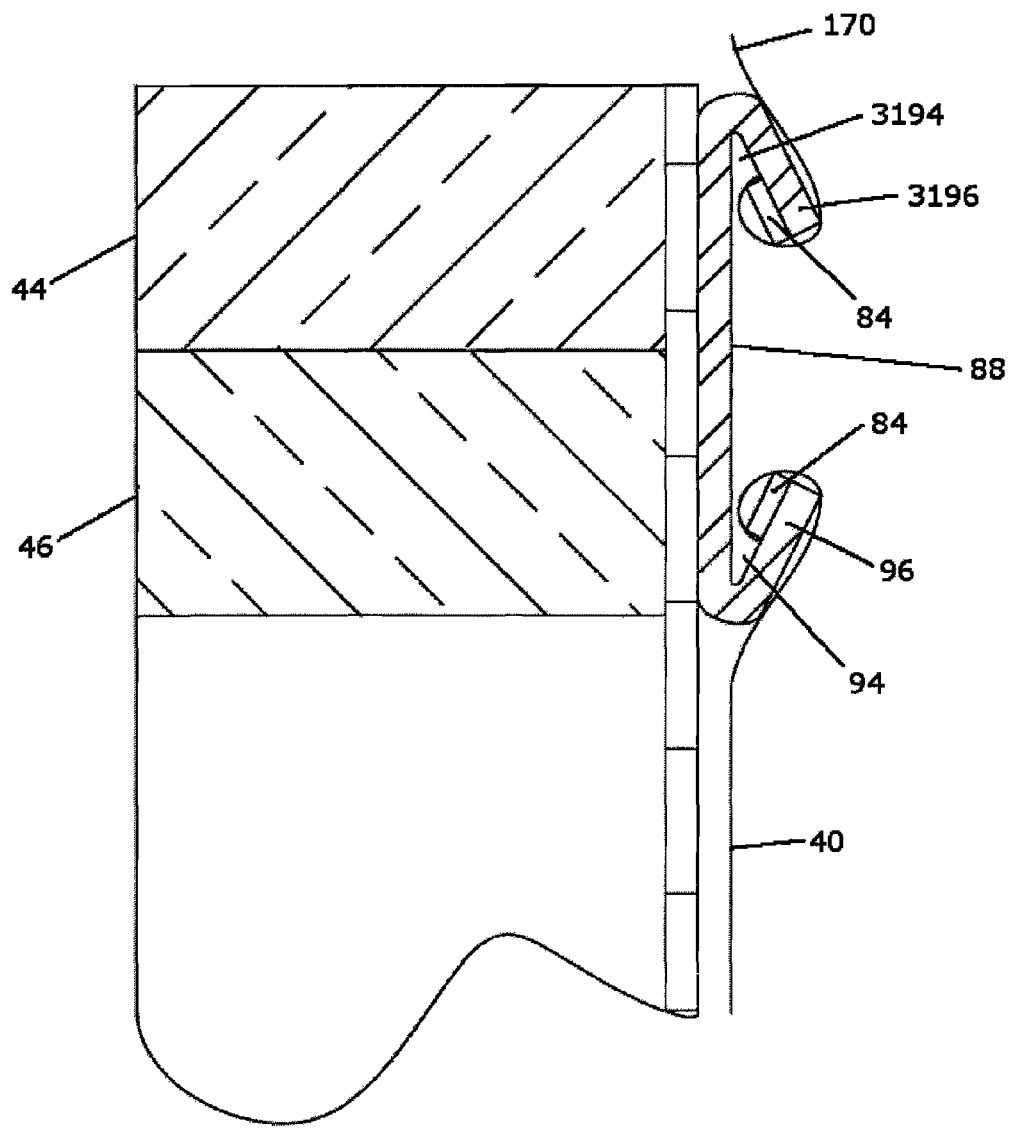
FIG. 32 is a view of another embodiment of a top rail.

FIG. 32 is a view of another embodiment of a top rail in which both the means for engaging a connecting member and the means for engaging a roof member tie-down are both slots 94, 3194 formed by angled flanges 96, 3196. The connecting member can be operatively associated with the upward facing slot, and a J-hook can be operatively associated with the downwardly facing slot.

Figures 33A, 33B:
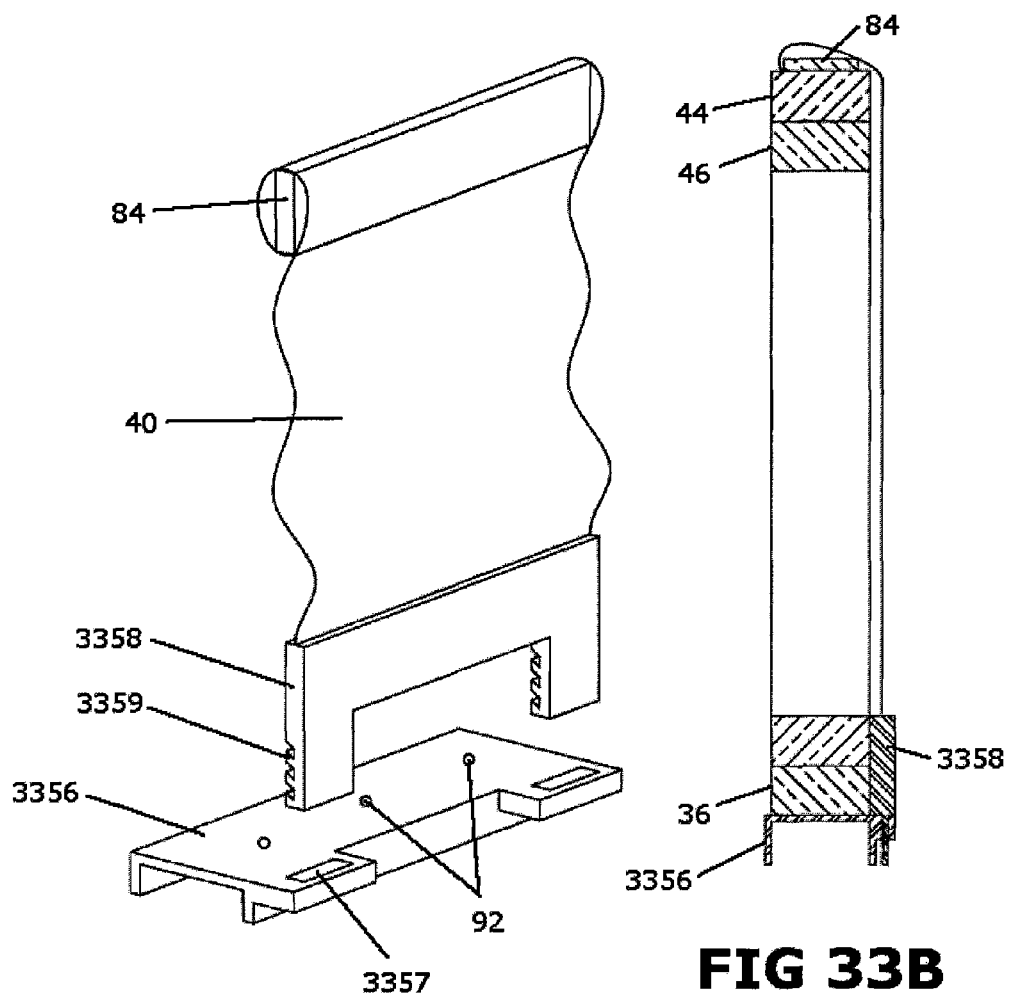
FIG. 33A is a view of a wall system with a top rail and connector to the roof structure.
FIG. 33B is a view of a wall system with a top rail and connector to the roof structure.

In another embodiment, as shown in FIG. 33A, a connecting member can comprise a batten 3358 to which the flexible reinforcement material 40 can be attached and straps 3359 extending from the batten which have a gear rack that can be secured in a ratchet case 3357 similar to a zip tie. The corresponding connector housing 3356 would comprises an attachment plate with one or more ratchet case(s) extending from the face of the attachment plate that are configured and dimensioned to accepts and secure an associated gear rack strap from the connecting member. The ratchet cases and gear rack straps would have the same spacing along the edge of the connecting member and face of connector housing respectively. The gear rack preferably faces towards the attachment plate of the connector housing and associated ratchet.

Using a connecting member having a plurality of gear rack straps evenly spaced along an edge in conjunction with a connector housing having a plurality of equally spaced ratchet cases allows the flexible reinforcement material to be quickly attached to the connector housing, and also allows post-installation re-tensioning to take up any slack introduced over time by pushing or pulling the gear rack straps further into the ratchet cases to engage gears further up the strap.

In various implementations of this embodiment, a connecting member can be attached along either or both edges of the flexible reinforcement material and a connector housing affixed to either the upper portion of a wall member or the foundation or both.

In one embodiment, the actual connecting member is formed around one or both edge portions of the flexible reinforcement material, for example by injection molding the connecting member around the flexible material edge, or by hot pressing or ultrasonic welding two halves of a connecting member together to thereby sandwich the flexible material between the halves. Other means of forming or joining polymer components are known to those in the plastic fabrication arts and can similarly be used to permanently join a connecting member to an edge of the flexible reinforcement material.

In another embodiment illustrated in FIG. 33B, the connector housing comprises a C-shaped beam that is configured and dimensioned to be installed on top of the foundation wall and beneath the sill plates 36 of a wall member. The ratchet casing(s) 3357 are located on the outside face of a side plate forming the connector housing.

Figure 34:
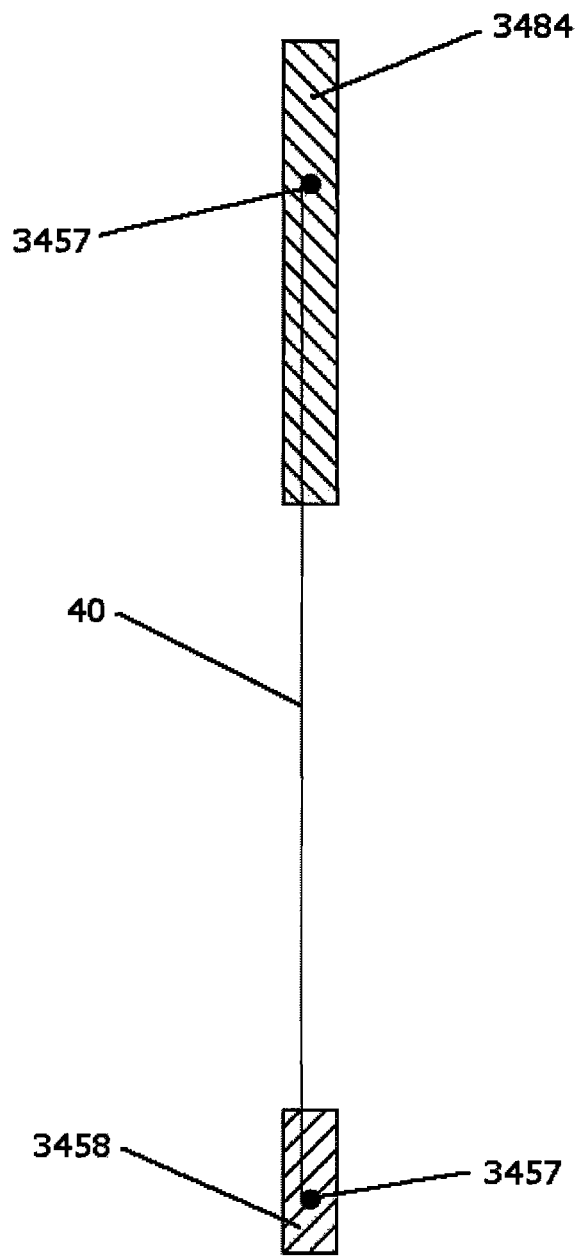
FIG. 34 is a view of a wall system with a top rail and lower rail.

FIG. 34 illustrates the use of reinforcement rods 3457 affixed to one or both edges of the flexible reinforcement fabric 40 before forming a connecting member 3454, 3484 over the edge of the fabric to distribute any tension on the fabric over a larger surface area within the connecting member 3484. This resists the fabric pulling free from the connecting member or causing the opposite sides of the connecting member to separate at a weld line. The connecting member is formed around the reinforcing rod and flexible fabric in the same way described above for FIG. 33. The flexible reinforcement material and preformed connecting member(s) can be included as components of a pre-assembled kit.

Figure 35:
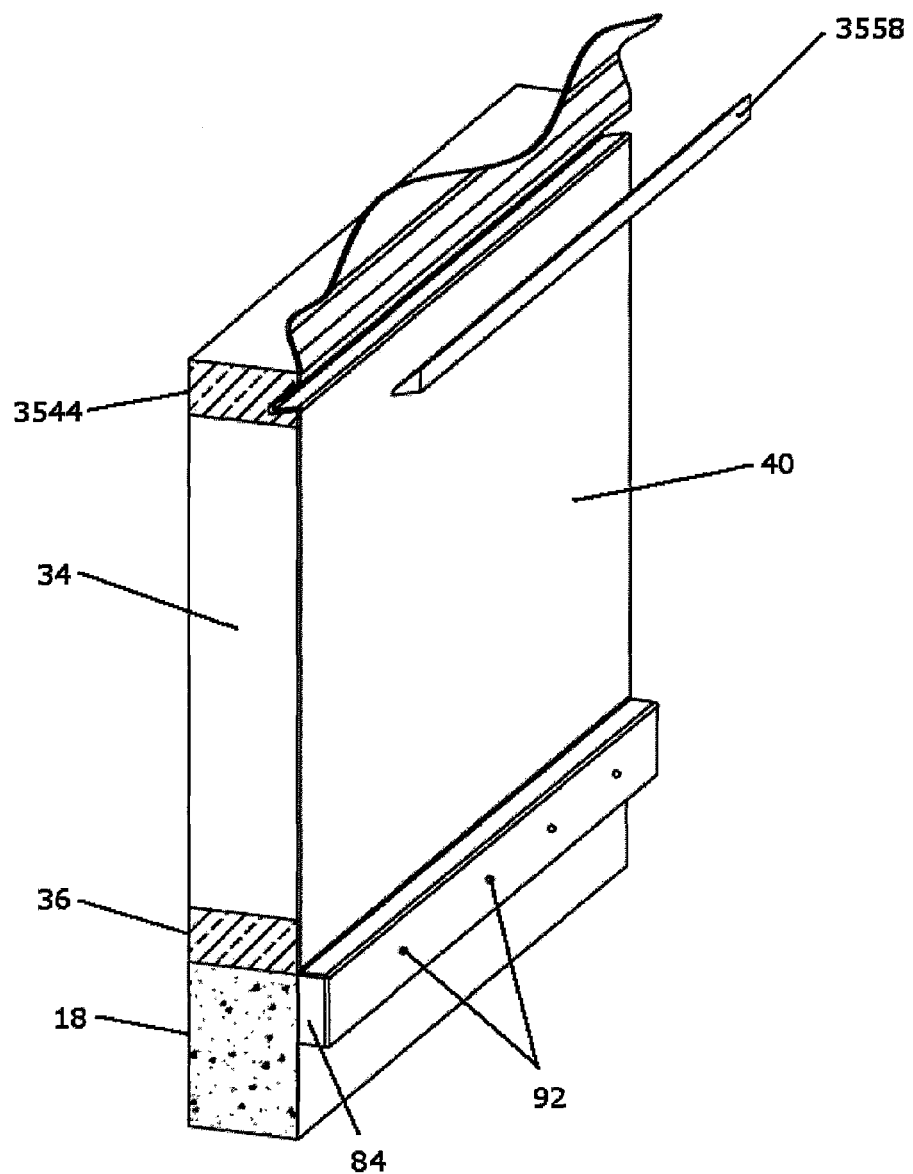
FIG. 35 is a view of a wall system with a top rail and lower rail.

FIG. 35 shows a simplified version of the invention wherein a top plate has an upward angled slot cut into the edge facing the exterior of the wall member to form a means for engaging a connecting member 3558 which can be either a batten wrapped with the reinforcing fabric that can be inserted into the slot, or a wedge or batten that can force the reinforcing fabric into the cut slot and secure it to the engaging means. A means for engaging the other end of the reinforcement fabric can be made by cutting a slot into either the sole plate or sill plate, and angled in a direction opposite the slot cut in the top plate. In the illustrated example, a wrapped batten may be anchored directly to the foundation. The flexible reinforcement fabric may also be secured to the foundation using any of the other means disclosed herein for engaging a connecting member.

Figure 36:
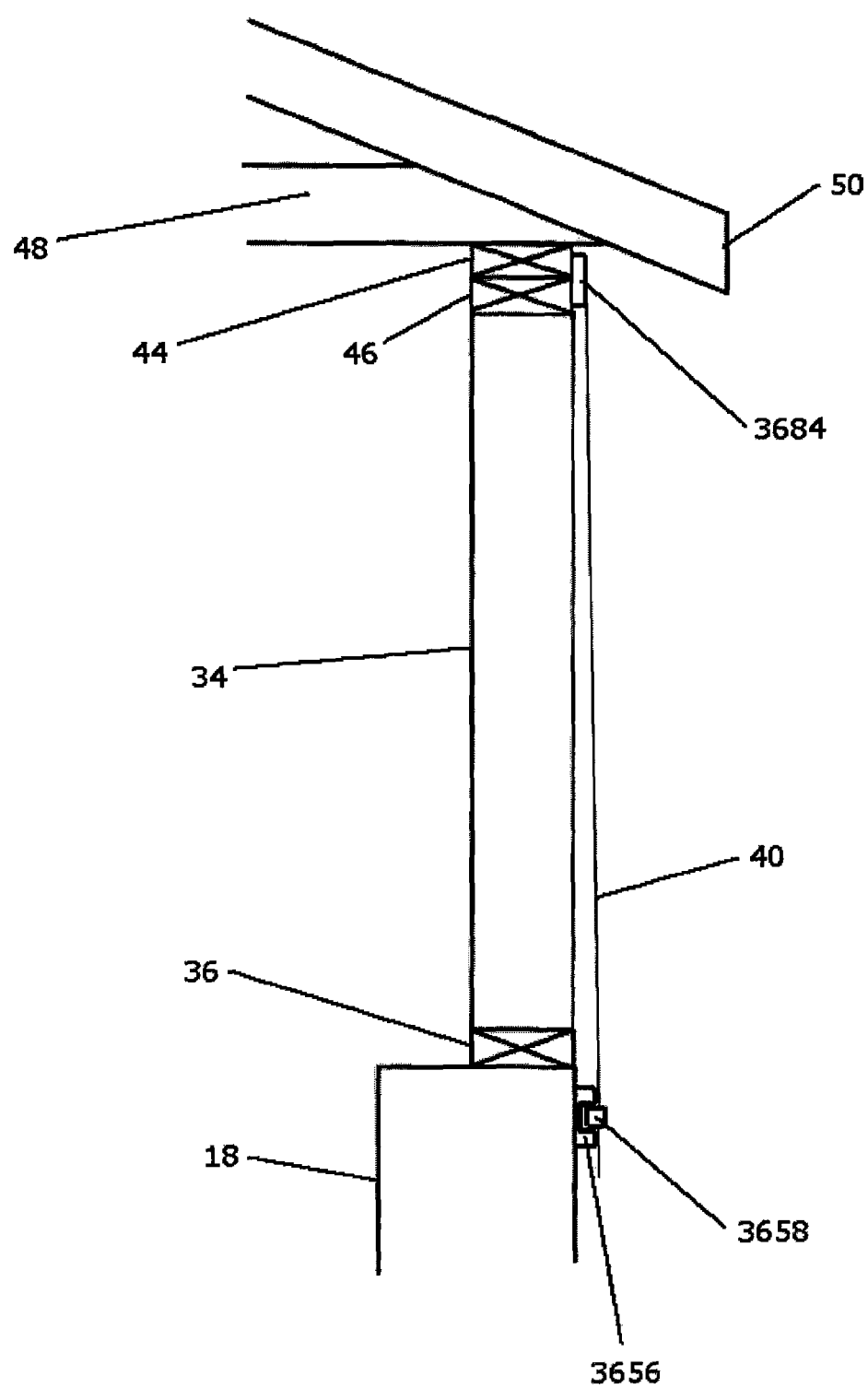
FIG. 36 is a view of lower rail using a spline to attach the reinforcement fabric to the foundation.

Another embodiment of the present invention is illustrated in FIG. 36, which is a view of lower rail using a smaller batten or spline to secure the reinforcement fabric 40 to the connector housing affixed to the foundation.

Figure 37:
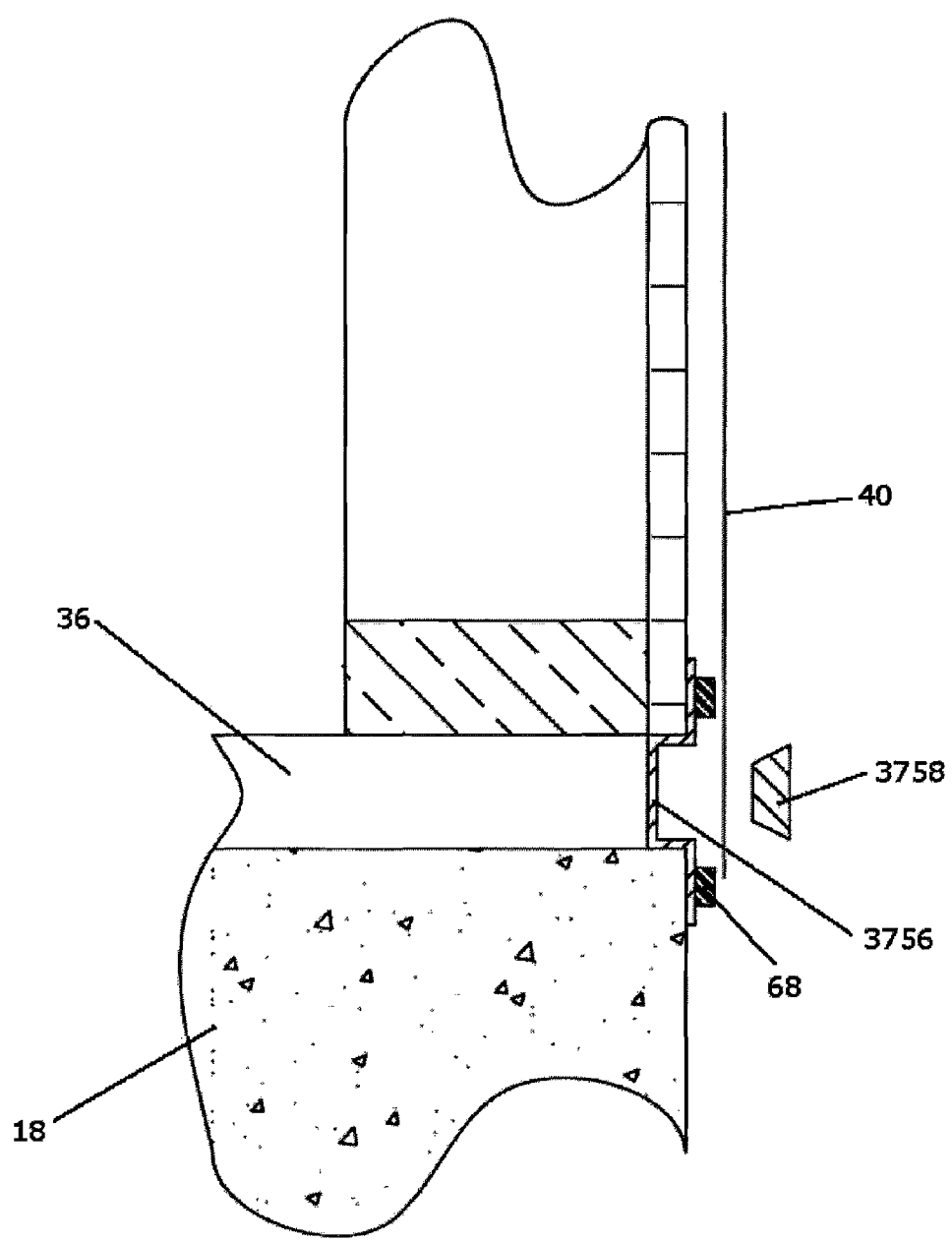
FIG. 37 is a view of another lower rail using a spline to attach the reinforcement fabric to the foundation.

FIG. 37 is a view of another lower rail using a spline 3758 to attach the reinforcement fabric to the foundation in which the connector housing 3756 sit on top of a ledge formed by the foundation and sill plate. The attachment plate is the lower portion of the connector housing that is fastened to the foundation.

Figure 38:
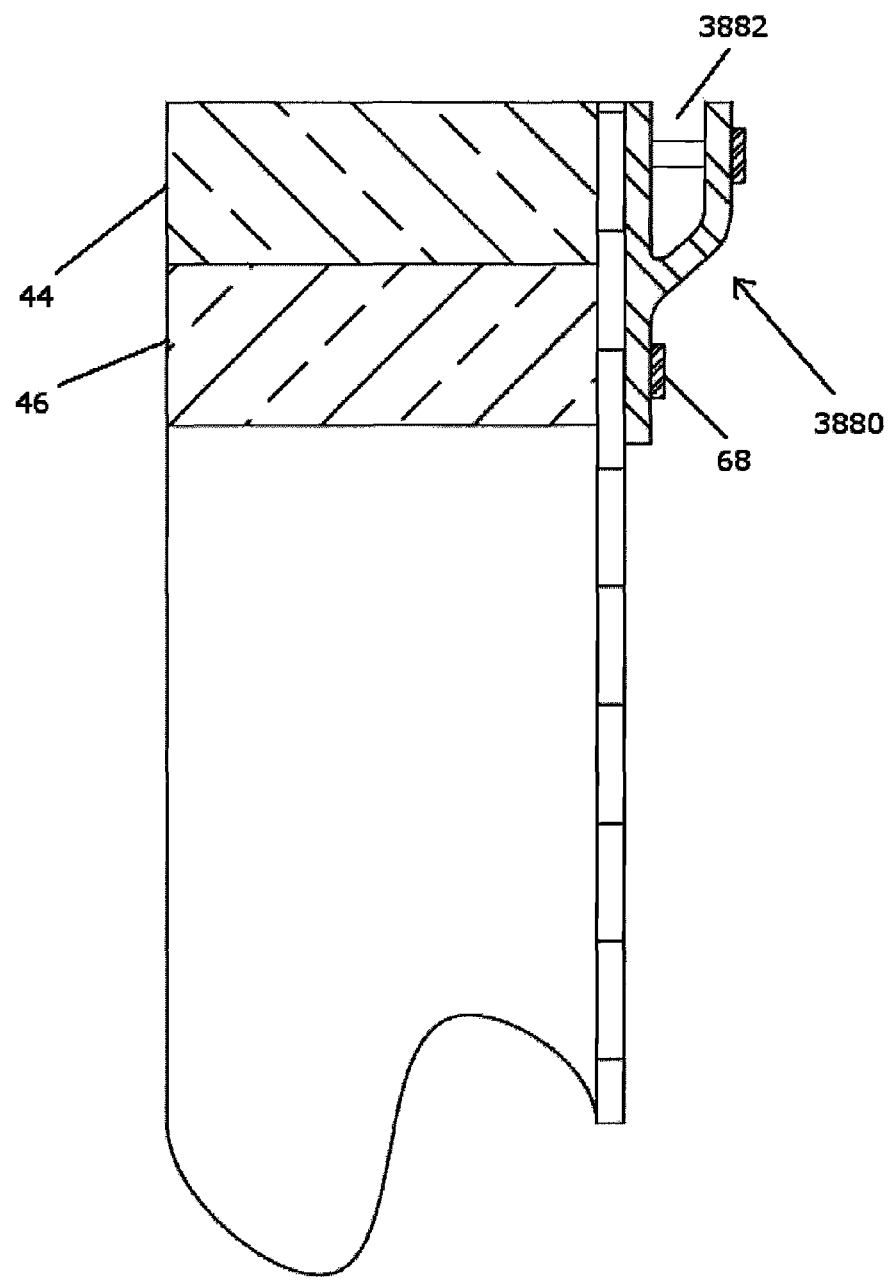
FIG. 38 is a view of a wall system and a top rail.

In the example shown in FIG. 38, a connector housing is attached to the upper portion of a wall at the top plates, and the same form of connector housing can be attached to the foundation. This approach can be implemented when attaching the same embodiment of connector housing to both the upper portion of a wall and the foundation.

Figure 39:
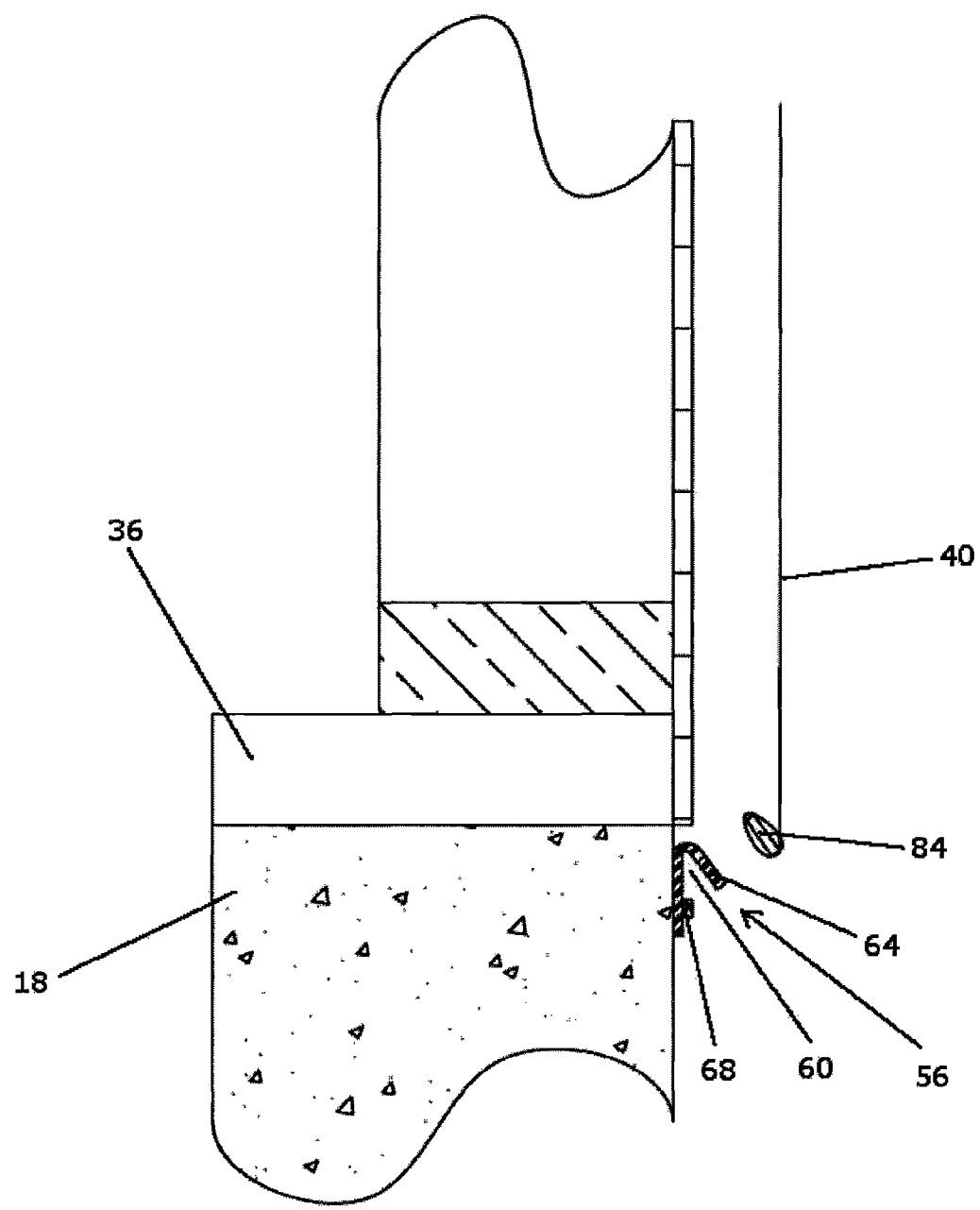
FIG. 39 is a view of lower rail.

FIG. 39 is an example of lower rail in which the orientation of the slot 60 and the connector housing 56 can be reversed by securing the attachment plate of a connector housing 56 below the downwardly oriented slot 60 opening. This approach can also be implemented when attaching the same embodiment of connector housing to both the upper portion of a wall and the foundation.

Figure 40:
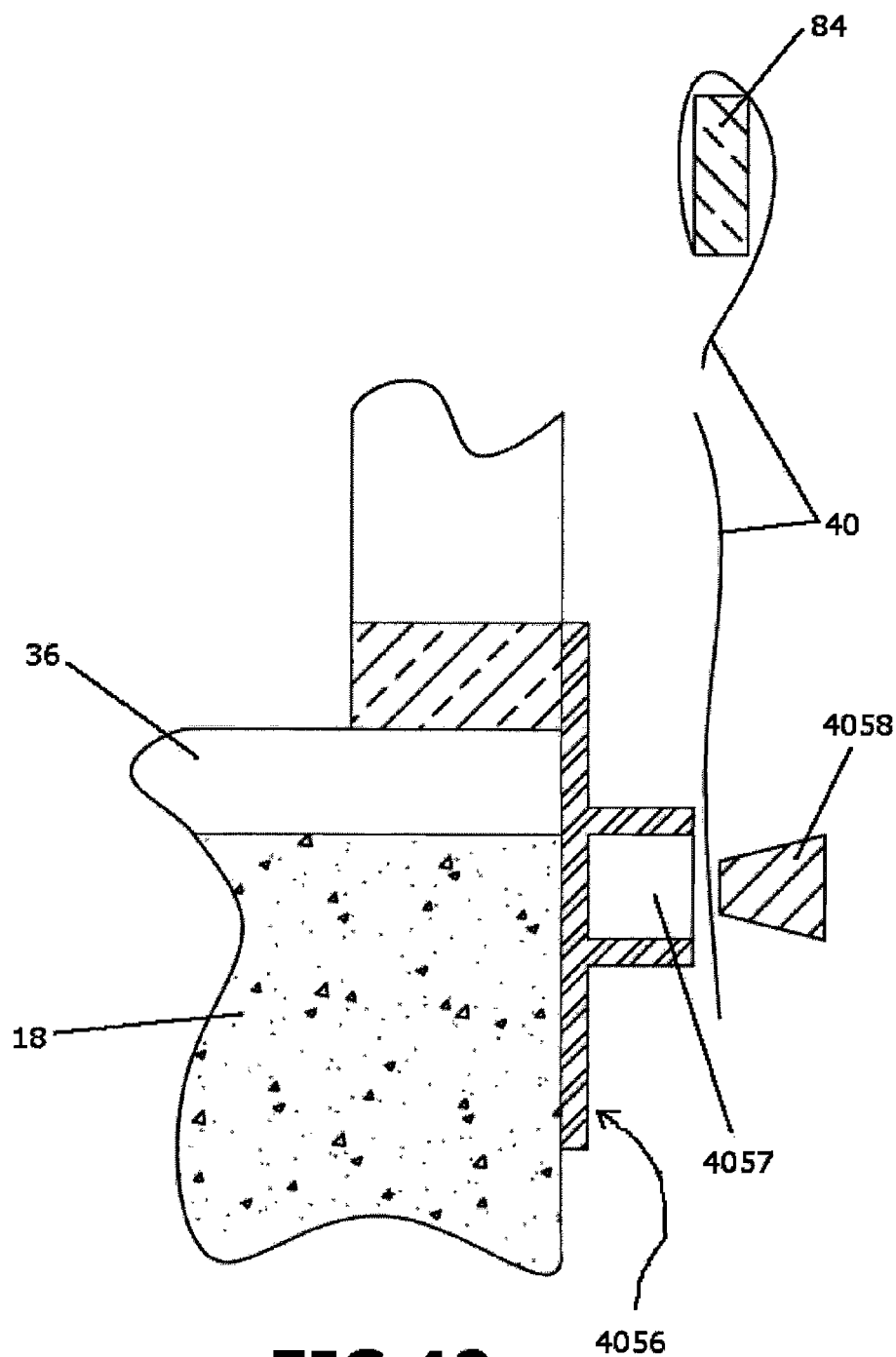
FIG. 40 is a view of a wall system with a top rail.

FIG. 40 is a view of a wall system with a top rail and lower rail.

Figure 41:
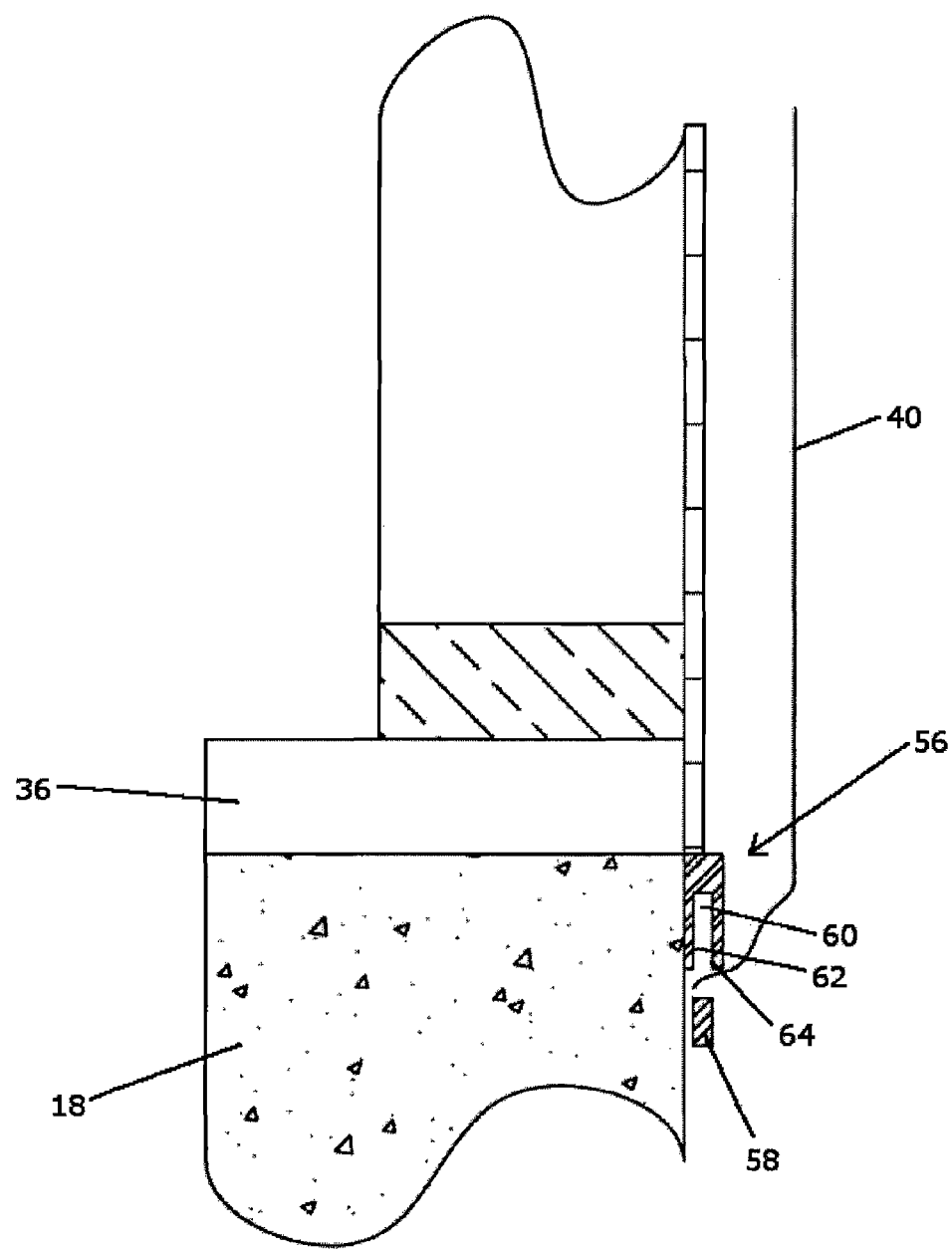
FIG. 41 is a view of a wall system with a lower rail.

FIG. 41 is a view of a wall system with a lower rail described in reference to FIG. 42B.

FIG. 42A shows an embodiment of a lower rail comprising a connector housing 456 and a batten 458. The connector housing comprises an attachment plate having bolt holes to facilitate fastening to a wall or foundation, and a downwardly facing slot formed by the attachment plate and front flange. In this particular embodiment, the attachment plate is sufficiently thin to allow clearance for the bolt head when fastened to a foundation below the wall covering, and the front flange curves outwardly from the attachment plate to form a tapered slot.

FIG. 42B is a view of an alternative connector housing 556 that is a rectangular block having a rectangular slot and preferably a curved lip on the front flange (not shown).

FIGS. 43A-C illustrate another embodiment of a lower rail 4354 attached to a foundation, wherein the connector housing 4356 and connecting member 4358 are matching halves of a clam shell design comparable to the design of the connecting member shown in FIGS. 24-24A. In this embodiment the connector housing 4356 comprises an elongated bar with a convoluted face 4357 and bolt holes 4366 located at intervals along the length of the bar, as shown in FIG. 43A. The connector housing is fastened to the foundation 18 using fasteners, such as anchor bolts, know to those in the art. The connecting member may be attached to the connector housing by an integral flexible hinge 4359 as illustrated, or may be a separate piece (not shown). The connector housing 4356 may further comprises a pre-applied adhesive or double faced tape 4361, or this may be applied during assembly and installation of the apparatus to a structure. The flexible reinforcement material 40 is pulled taut against the face of the connector housing and temporarily held in place by pre-applied adhesive or double faced tape. The flexible material 40 may then be cut to length using a guide notch 4363 located below the adhesive or tape 4361, as shown in FIG. 43B.

The connecting member 4358 is also and elongated bar with a matching convoluted face 4367 that engages the connector housing 4356 and compresses the flexible material within the mating convolutions 4357 to draw the flexible material taut. In this manner, the mating faces function as a series of shallower slots formed by the convolutions 4357, 4367 instead of one larger slot into which a wrapped spline or wedge is inserted. Additional fasteners are then inserted through the connecting member 4358 and connector housing 4356, and fastened to the foundation 18, as shown in FIG. 43C. One advantage of the embodiment shown in FIGS. 43A-C is that the overall profile can be thinner because of the larger amount of surface contact created by the convoluted faces.

Figures 44, 45:
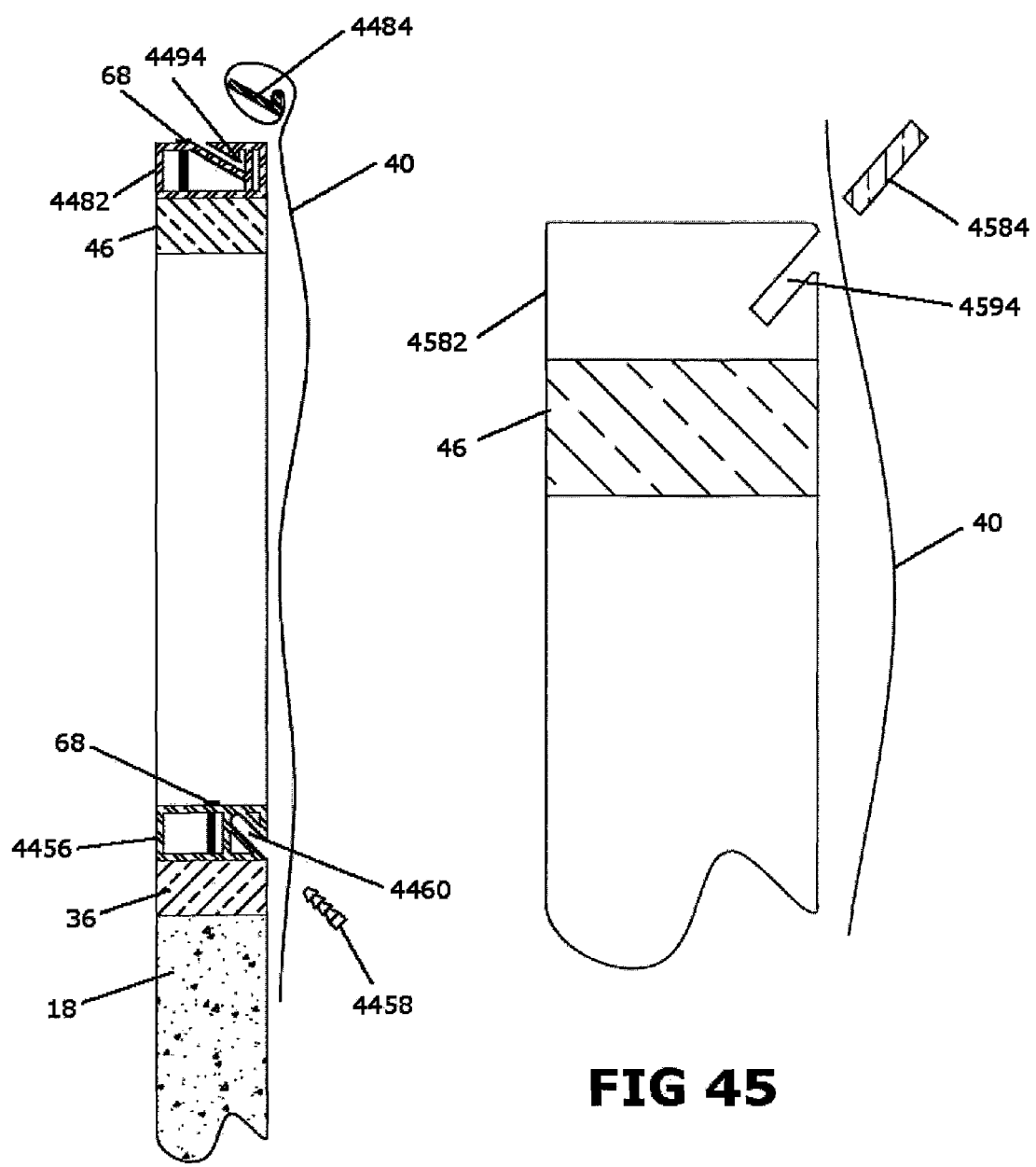
FIG. 44 is a view of another wall system having a lower rail and spline.
FIG. 45 is a view of a top rail with a spline for attaching the fabric.

In another embodiment, shown in FIG. 44 the first connector housing is an elongated rectangular bar configured and dimensioned to be usable as a top plate and the second connector housing is an elongated rectangular bar configured and dimensioned to be usable as a sole plate. The first connector housing 4482 has a slot 4494 formed along in the top face of the bar and angled downward towards the front face with an upward bend at the base of the slot. The slot 4494 is configured and dimensioned to receive an angled connecting member 4484, wherein the angled connecting member 4484 is retained within and operatively associated with the connector housing slot 4494 by the associated shapes and angles, and with the force applied by tension on the connecting member 4484 when the flexible material 40 is tensioned. The second connector housing 4456 has a slot 4460 formed along the front face of the bar and angled upwards towards the top face of the bar. The slot 4460 is configured and dimensioned to receive a spline 4458 that may have barbs or other surface features that allow it to grab the inside face of the slot 4460. The spline 4458 is used to force the flexible reinforcement material 40 into the slot 4460 in the second connector housing 4456. Inserting the spline 4458 applies a tension to the flexible material 40 and retains the flexible material in the slot. The first and second connector housings 4456, 4482 can also comprise openings through the bars such that they can be fastened to the lower top plate 46 or sill plate 36 respectively. The elongated bars can be formed by extruding a polymer material having the required cross-section, as would be known to those skilled in the art of polymer processing and extrusion dies. In this embodiment, the connector housings are integrated as structural components during construction of the frame structure, and installation of the connecting members and flexible fabric does not require the additional steps of separately installing first and second connector housings to the wall and foundation.

FIG. 45 is a view of a top plate 4582 that has an upwardly angled slot 4594 cut into it for attaching the flexible reinforcement material 40 with a spline 4584.

The present invention also related to being made into a kit or kits by assembling and providing a pre-determined selection of the reinforcement apparatus components described above to improve the speed and accuracy of installation on a building structure. The separate components of the kit can be selected based on building codes, design requirements or installation preferences for the particular building.

Particularly in the case of a pre-fabricated building in which the actual wall and roof dimensions are also predetermined, the flexible elongated reinforcement material and upper and lower rails can all be cut or formed to the same predetermined lengths of the different building members and assembled into kits that are packaged and labeled to be easily identified with the corresponding pre-fabricated building sections. The assembled reinforcement apparatus kits can then be unpackaged and installed along with the prefabricated building components.

It is to be understood that some or all of the above described features, components and method steps can be combined in different ways, and other variations and modifications other than those illustrated will be apparent to persons of ordinary skill in the art. In particular, the invention may be implemented with other choices of materials, according to the criteria stated above. Each and every of said permutations and combinations is separately deemed to be an embodiment herein in its own right, and engineering requirements appropriate to the structure, the governing code, the local building community, and the potential high wind or seismic conditions will govern the use and deployment of the said embodiments and establish separate embodiments herein such that each and everyone is its own embodiment. It is therefore intended that all of these embodiments, examples, variations and modifications thereon are meant to be encompassed within the spirit and scope of the present invention as set forth in the following claims.

What is claimed is:

1. A structural reinforcement apparatus comprising:
   flexible elongated reinforcement material having first and second ends;
   a first connecting member associated with the first end of the flexible reinforcement material;
   a second connecting member associated with the second end of the flexible reinforcement material, wherein the reinforcement material is wrapped around the second connecting member;
   first engaging means for engaging the first connecting member; and
   second engaging means for engaging the second connecting member, the second engaging means comprises a connector housing comprising a slot having an open end facing away from the first connecting member and first end of the flexible reinforcement material, with the second connecting member and reinforcement material received in the slot,
   wherein the first and second connecting members and first and second engaging means are configured, dimensioned and operatively associated to provide tension to flexible elongated reinforcing material.

2. The structural reinforcement apparatus of claim 1, wherein the first connecting member is associated with the first edge portion of the flexible elongated reinforcement material, and the first engaging means comprises a connector housing that includes a slot having an open end facing away from the second connecting member and second end of the flexible reinforcement material, with the first connecting member and reinforcement material received in the slot.

3. The structural reinforcement apparatus of claim 2, wherein the first connector housing further comprises means for securing one or more roofing members to the first connector housing, and wherein the first connector housing comprises an attachment plate for securing the second engaging means to a frame structure.

4. The structural reinforcement apparatus of claim 3, wherein the means for securing one or more roofing members to the first or second connector housing comprises:
   a horizontal flange extending approximately perpendicularly from the connector housing attachment plate and has access holes along the length of the flange; and
   a roof member tie-down.

5. The structural reinforcement apparatus of claim 4, wherein the horizontal flange is a hollow boss with the hollow opening configured and dimensioned to receive an elongated clip having access holes with the same spacing as the horizontal flange access holes and a slot configured and dimensioned to grip a tension rod and thereby secure roof members to the connector housing.

6. The structural reinforcement apparatus of claim 3, wherein the means for securing one or more roofing members to the first connector housing comprises a T-slot extending along the length of the upper portion of the first connector housing; and
a roof member tie-down, which comprises:
a securing block;
a T-slot coupling, which is configured and dimensioned to fit within the connector housing T-slot, extending from the back face of the securing block;
a gear rack strap extending from an edge of the securing block; and
a ratchet case positioned along an edge of the securing block opposite the gear rack strap, wherein the roof member tie-down is coupled to the connector housing by the T-slot coupling and the gear rack strap can be looped over a roof member and secured in the receiving case.

7. The structural reinforcement apparatus of claim 3, wherein the first engaging means comprises a batten housing configured and dimensioned to hold a wrapped batten; and
wherein the first connector housing further comprises a downwardly oriented slot formed by an attachment plate configured and dimensioned to receive the batten housing, and
a retainer clip extending partially into the downwardly oriented slot opening from the front face opposite the attachment plate that prevents the batten housing from being withdrawn from the slot once it has been inserted.

8. The structural reinforcement apparatus of claim 1, wherein the first connector housing is a rectangular bar configured and dimensioned to be usable as a top plate and the second connector housing is a rectangular bar configured and dimensioned to be usable as a sill plate.

9. A structural reinforcement apparatus comprising:
flexible elongated reinforcement material having first and second ends;
a first connecting member associated with the first end of the flexible reinforcement material;
a second connecting member associated with the second end of the flexible reinforcement material;
first engaging means for engaging the first connecting member; and
second engaging means for engaging the second connecting member,
wherein the first connector housing further comprises means for securing one or more roofing members to the first connector housing, and wherein the first connector housing comprises an attachment plate for securing the second engaging means to a frame structure,
wherein the means for securing one or more roofing members to the first connector housing comprises an upper vertical flange extending approximately parallel from the upper portion of the connector housing attachment plate having one or more openings configured and dimensioned to accept a roof member tie-down, and
wherein the first and second connecting members and first and second engaging means are configured, dimensioned and operatively associated to provide tension to flexible elongated reinforcing material.

10. The structural reinforcement apparatus of claim 9, wherein a tension rod is inserted through an opening in a strap portion on either side of the first connector housing and is locked in an access hole in the vertical flange.

11. A frame structure having at least a roofing member and one or more wall members erected upon a foundation, the structure comprising:
a structural reinforcement apparatus according to claim 1, for providing a continuous tensile load path between the roofing member and the structure's foundation, wherein:
the flexible reinforcement material is attached to the first and second connecting members along a first and second edge respectively;
the first means for engaging the first connecting member is affixed to an upper portion of a wall member;
the first connecting member is operatively associated with first engaging means;
the second means for engaging the second connecting member is affixed to the foundation of the frame structure;
the second connecting member is operatively associated with the second engaging means;
the roofing member is secured to the first engaging means with a roof member tie-down; and
the second engaging means is operatively associated with the first engaging means by the flexible reinforcement material attached to the first and second connecting members to form a continuous tensile load path from the roof member to the structure's foundation.

12. The frame structure of claim 11, wherein the flexible reinforcement material is a high strength material that also imparts resistance to seismic events, explosive blasts, and projectiles fired from small arms weapons.

13. A frame structure having at least a roofing member and one or more wall members erected upon a foundation, the structure comprising:
a structural reinforcement apparatus according to claim 3, for providing a continuous tensile load path between the roofing member and the structure's foundation, wherein:
the first means for engaging the first connecting member is affixed to the upper portion of a wall member;
the second means for engaging the second connecting member is affixed to the foundation of the frame structure;
the flexible reinforcement material is attached to the first and second connecting members along a first and second edge respectively;
the first connecting member is connectively associated with first engaging means;
the second connecting member is operatively associated with the second engaging means;
the roofing member is secured to the securing means of the first engaging means with a roof member tie-down to form a continuous tensile load path from the roof member to the structure's foundation; and
the first engaging means is operatively associated with the second engaging means by the flexible reinforcement material attached to the first and second connecting members to form a continuous tensile load path from upper portion of the wall member to the structure's foundation.

14. The frame structure of claim 13, wherein the roof member tie-down includes tension rods, which are inserted into access holes in the securing means of the first engaging means.

15. The building structure of claim 14, wherein the second connecting member comprises two webs, with each tapering to a tension rod.

16. A frame structure having at least a roofing member and one or more wall members erected upon a foundation, the structure comprising:
- a structural reinforcement apparatus for providing a continuous tensile load path between the roofing member and the structure's foundation, wherein:
- the structural reinforcement apparatus comprises:
    - flexible elongated reinforcement material having first and second ends;
    - a first connecting member associated with the first end of the flexible reinforcement material;
    - a second connecting member associated with the second end of the flexible reinforcement material;
    - first engaging means for engaging the first connecting member; and
    - second engaging means for engaging the second connecting member, and further wherein:
    - the first connector housing is used as a top plate attached to a wall member;
    - the second connector housing is used as a sill plate attached to the same wall member as the first connector housing;
    - the first connecting member is received by the first connector housing;
    - the second connecting member is received by the second connector housing; and
    - the second connector housing is thereby operatively associated with the first connector housing by the flexible reinforcement material attached to the first and second connecting members to form a continuous tensile load path from the roof member to the structure's foundation.

17. A frame structure having at least a roofing member and one or more wall members erected upon a foundation, the structure comprising:
- a structural reinforcement apparatus according to claim 2, for providing a continuous tensile load path between the roofing member and the structure's foundation, wherein:
    - the first connector housing is used as a top plate;
    - the second connector housing is used as a sill plate;
    - the first connecting member is received by the first connector housing;
    - the second connecting member is received by the second connector housing; and
    - the second connector housing is thereby operatively associated with the first connector housing by the flexible reinforcement material attached to the first and second connecting members to form a continuous tensile load path from the roof member to the structure's foundation.

18. A frame structure having at least a roofing member and one or more wall members erected upon a foundation, the structure comprising:
- a structural reinforcement apparatus according to claim 4, for providing a continuous tensile load path between the roofing member and the structure's foundation, wherein:
    - the first connector housing is used as a top plate;
    - the second connector housing is used as a sill plate;
    - the first connecting member is received by the first connector housing;
    - the second connecting member is received by the second connector housing; and
    - the second connector housing is thereby operatively associated with the first connector housing by the flexible reinforcement material attached to the first and second connecting members to form a continuous tensile load path from the roof member to the structure's foundation.

19. A frame structure having at least a roofing member and one or more wall members erected upon a foundation, the structure comprising:
- a structural reinforcement apparatus according to claim 9, for providing a continuous tensile load path between the roofing member and the structure's foundation, wherein:
    - the first connector housing is used as a top plate;
    - the second connector housing is used as a sill plate;
    - the first connecting member is received by the first connector housing;
    - the second connecting member is received by the second connector housing; and
    - the second connector housing is thereby operatively associated with the first connector housing by the flexible reinforcement material attached to the first and second connecting members to form a continuous tensile load path from the roof member to the structure's foundation.

20. A frame structure having at least a roofing member and one or more wall members erected upon a foundation, the structure comprising:
- a structural reinforcement apparatus according to claim 7, for providing a continuous tensile load path between the roofing member and the structure's foundation, wherein:
    - the first connector housing is used as a top plate;
    - the second connector housing is used as a sill plate;
    - the first connecting member is received by the first connector housing;
    - the second connecting member is received by the second connector housing; and
    - the second connector housing is thereby operatively associated with the first connector housing by the flexible reinforcement material attached to the first and second connecting members to form a continuous tensile load path from the roof member to the structure's foundation.

* * * * *